US007613150B2

(12) United States Patent
Nagarajan et al.

(10) Patent No.: US 7,613,150 B2
(45) Date of Patent: Nov. 3, 2009

(54) HITLESS RESTART MECHANISM FOR NON-STOP DATA-FORWARDING IN THE EVENT OF L3-MOBILITY CONTROL-PLANE FAILURE IN A WIRELESS SWITCH

(75) Inventors: Ramakrishnan Nagarajan, Sunnyvale, CA (US); Udayan Borkar, Sunnyvale, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 649 days.

(21) Appl. No.: 11/490,298

(22) Filed: Jul. 20, 2006

(65) Prior Publication Data

US 2008/0019302 A1 Jan. 24, 2008

(51) Int. Cl.
*H04W 4/00* (2009.01)
(52) U.S. Cl. .................. 370/331; 370/328; 370/338; 370/321; 370/220; 455/436
(58) Field of Classification Search .................. 370/331
See application file for complete search history.

(56) References Cited

U.S. PATENT DOCUMENTS

| | | | |
|---|---|---|---|
| 6,055,433 A | 4/2000 | Yuan et al. | |
| 6,404,772 B1 | 6/2002 | Beach et al. | |
| 6,795,701 B1 | 9/2004 | Baker et al. | |
| 6,901,270 B1 | 5/2005 | Beach | |
| 6,928,282 B2 | 8/2005 | Taniguchi | |
| 7,113,498 B2 | 9/2006 | Bajic | |
| 7,171,224 B2 * | 1/2007 | Sarkkinen et al. ........... | 455/502 |
| 7,173,922 B2 | 2/2007 | Beach | |
| 7,173,923 B2 | 2/2007 | Beach | |
| 7,257,105 B2 * | 8/2007 | Molteni et al. .............. | 370/338 |

(Continued)

FOREIGN PATENT DOCUMENTS

EP 1117222 7/2001

(Continued)

OTHER PUBLICATIONS

International Searching Authority, Annex to Form PCT/ISA/206 Communication Relating to the Results of the Partial International Search for International Application No. PCT/US2007/072556, mailed Dec. 28, 2007.

(Continued)

*Primary Examiner*—Nick Corsaro
*Assistant Examiner*—Isaak R Jama

(57) ABSTRACT

Techniques and technologies are provided for restarting a first wireless switch when the first wireless switch fails. For example, after the first wireless switch fails, the first wireless switch transmits a restart message to its peer wireless switches to begin re-establishing peering sessions with peer wireless switches. The first wireless switch resets its home wireless client database (HWCDb) with information from its data plane wireless client database (KWCDb), and transmits the updated information in its HWCDb to its peer wireless switches. The peer wireless switches store this information in their respective control plane wireless client databases (CP-WCDbs), and initially mark the wireless client devices in the respective CPWCDbs as stale entries. Each of the wireless switches then exchanges information from their respective HWCDbs with the first wireless switch (and other peer wireless switches) so that each wireless switch eventually has a wireless client database (WCDb) comprising each of the wireless client devices in the mobility domain.

20 Claims, 26 Drawing Sheets

U.S. PATENT DOCUMENTS

| | | | |
|---|---|---|---|
| 7,411,925 B2* | 8/2008 | Nain et al. | 370/329 |
| 2001/0021175 A1 | 9/2001 | Haverihen | |
| 2002/0021689 A1 | 2/2002 | Robbins et al. | |
| 2002/0067704 A1 | 6/2002 | Ton | |
| 2002/0136226 A1 | 9/2002 | Christoffel et al. | |
| 2002/0176387 A1 | 11/2002 | Wilmer et al. | |
| 2003/0104814 A1 | 6/2003 | Gwon et al. | |
| 2003/0128689 A1 | 7/2003 | Peirce, Jr. et al. | |
| 2003/0135626 A1 | 7/2003 | Ray et al. | |
| 2003/0179742 A1 | 9/2003 | Ogier et al. | |
| 2003/0224788 A1 | 12/2003 | Leung et al. | |
| 2004/0006708 A1 | 1/2004 | Mukherjee et al. | |
| 2004/0047320 A1 | 3/2004 | Eglin | |
| 2004/0066757 A1* | 4/2004 | Molteni et al. | 370/329 |
| 2004/0095932 A1 | 5/2004 | Astarabadi et al. | |
| 2004/0103282 A1 | 5/2004 | Meier et al. | |
| 2004/0122976 A1 | 6/2004 | Ashutosh et al. | |
| 2004/0214576 A1 | 10/2004 | Myers et al. | |
| 2004/0221042 A1 | 11/2004 | Meier | |
| 2005/0047420 A1 | 3/2005 | Shiro et al. | |
| 2005/0074015 A1 | 4/2005 | Chari et al. | |
| 2005/0130660 A1* | 6/2005 | Park et al. | 455/436 |
| 2005/0213582 A1 | 9/2005 | Wakumoto et al. | |
| 2005/0237962 A1 | 10/2005 | Upp et al. | |
| 2006/0018294 A1* | 1/2006 | Kynaslahti et al. | 370/338 |
| 2006/0045069 A1 | 3/2006 | Zehavi et al. | |
| 2006/0179307 A1 | 8/2006 | Stieglitz et al. | |
| 2007/0121565 A1 | 5/2007 | Halasz et al. | |

FOREIGN PATENT DOCUMENTS

| | | |
|---|---|---|
| EP | 1401151 | 3/2004 |
| EP | 1408653 | 4/2004 |
| EP | 1528747 | 5/2005 |
| WO | 0163943 | 8/2001 |
| WO | 0243348 | 5/2002 |
| WO | 03077429 | 9/2003 |
| WO | 03093951 | 11/2003 |
| WO | 03101131 | 12/2003 |
| WO | 2004017172 | 2/2004 |
| WO | 2004098143 | 11/2004 |
| WO | 2006066007 A | 6/2006 |

OTHER PUBLICATIONS

Annex to Form PCT/ISA/206, Communication Relating to the Results of the Partial International Search for International Application No. PCT/SU2007/073917, mailed Jan. 29, 2008.

Leary, Jonathan et al. "Wireless LAN Fundamentals Mobility," CISCO Press article, Jan. 9, 2004, pp. 1-8.

Symbol Technologies, Inc. "ES 3000 Ethernet Switch, Designed for Enterprise Wireless Networking Wireless Switch Environments," Oct. 2004.

Symbol Technologies, Inc. "What is a Wireless Switch and the Value of the Overlay Architecture?" Technical White Paper, Jan. 2005.

Symbol Technologies, Inc. "Deutsch Messe AG Chooses the Wireless Switch System from Symbol Technologies to Power World's Largest Hotspot at CeBIT 2003," Oct. 2003.

The Tolly Group "Wireless TCO: the Value of An Overlay Network," White Paper, Jun. 2004.

International Search Report for International Application No. PCT/US2006/014075 mailed Oct. 6, 2006.

International Search Report for International Application No. PCT/US2006/013888 mailed Nov. 8, 2006.

International Search Report for International Application No. PCT/US2006/014074 mailed Sep. 8, 2006.

International Search Report for International Application No. PCT/US2006/014076 mailed Sep. 18, 2006.

International Search Report for International Application No. PCT/US2006/020216 mailed Oct. 30, 2006.

International Search Report for International Application No. PCT/US2006/020880 mailed Oct. 20, 2006.

International Search Report for International Application No. PCT/US2006/025356 mailed Nov. 30, 2006.

Dmitry Olshansky: "JPF Usage Tutorial (Demo application explained)" Internet Article, [Online] Mar. 9, 2005, pp. 1-7, XP002400718, JPF Homepage, Retrieved from the Internet: URL:http://web.archive.org/web/20050309192800/jpf.sourceforge.net/tutorial.html>, [retrieved on Sep. 27, 2006], p. 2, section "Preparing parameters to start up plug-in manager", paragraph 1-paragraph 3, p. 4, whole page.

Anonymous: "Welcome to Eclipse" Internet Article, [Online] 2004, XP002400727, Eclipse Homepage, Retrieved from the Internet: URL:http://www.eclipse.org/documentation/pdf/org.eclipse.platform.doc.isv_3.0.1.pdf> [retrieved on Sep. 27, 2006], p. 9, paragraph 1-paragraph 6; p. 10, table on bottom of page; p. 11, paragraph 2-paragraph 3; p. 12, paragraph 1-paragraph 3; p. 13, paragraph 1-paragraph 3; p. 78, paragraph 1-paragraph 2; p. 79, section "Hello world view", whole section; p. 85, figure; p. 92, section Installing examples via the.

Azad Bolour: "Notes on the Eclipse Plug-in Architecture" Internet Article, [Online] Jul. 10, 2003, pp. 1-26, XP002400728, Eclipse Homepage, Retrieved from the Internet: URL:http://web.archive.org/web/20030710042641/http://eclipse.org/articles/ Article-Plug-in-architecture/plugin_architecture. html> [retrieved on Sep. 27, 2006], p. 1, section "Introduction", paragraph 1-paragraph 2; p. 2, paragraph 1-paragraph 3; p. 3 section 2.3, paragraph 1-p. 4, paragraph 7.

David Flanagan: "Java Foundation Classes in a Nutshell" Sep. 1999, O'Reilly & Associates, Inc., 101 Morris Street, Sebastopol, CA 95472, U.S.A., XP002400745, section 7.2.1, whole section.

Dmitry Olshansky: "Class StandardPathResolver" Internet Article, Mar. 9, 2005, XP002400737, JPF Homepage, section "resolvePath", whole section.

Dromb Bucknell University R, "Dynamic Host Configuration Protocol," IETF Standard, Internet Engineering Task Force, ITEF, CH, Mar. 1997.

S. Glass, Sun Microsystems, Mobile IP Agents as DHCP Proxies, IETF Standard-Working-Draft, Internet Engineering Task Force, IETF, Ch. No. 1, Mar. 2, 2003 [abstract].

International Searching Authority, Annex to Form PCT/ISA/206 Communication Relating to the Results of the Partial International Search for International Application No. PCT/US2007/072350, mailed Nov. 22, 2007.

Ogier SRI International F. Templin Nokia M. Lewis SRI International R: "Topology Dissemination Based on Reverse-Path Forwarding (TBRPF); rfc3684.txt;" IETF Standard, Internet Engineernig Task Force, IETF, CH, Feb. 2004, XP015009465; ISSN: 0000-0003; abstract; Chapters 5.1 and 7.

\* cited by examiner

HITLESS RESTART MECHANISM FOR NON-STOP DATA-FORWARDING IN THE EVENT OF L3-MOBILITY CONTROL-PLANE FAILURE IN A WIRELESS SWITCH

TECHNICAL FIELD

The present invention generally relates to computer networks and, more particularly, to methods, systems and apparatus for restarting a wireless switch in a Wireless Local Area Network (WLAN).

BACKGROUND

A wireless local area network (WLAN) generally includes one or more Access Points (APs), and several wireless client devices. Such networks work well in small office or home office (SOHO) environments where the number of APs is relatively small. As the number of APs increases, the network becomes unwieldy and difficult to manage. To help alleviate this problem a master controller sometimes referred to as a "wireless switch" can be added to the network. A wireless switch controls some or all of the APs in the network, and data going to or from the APs flow through the wireless switch. Large WLANs can be subdivided into multiple IP (layer 3) subnets. Subdividing a WLAN into multiple subnets has several advantages (e.g., containment of broadcast traffic to a single subnet, limiting the effect of failure of network elements to a small network segment, etc.).

SUMMARY

According to one embodiment, techniques and technologies are provided for restarting a first wireless switch when the first wireless switch fails. For example, after the first wireless switch fails, a control plane L3 mobility module restarts and the first wireless switch transmits a restart message to its peer wireless switches to begin re-establishing peering sessions with peer wireless switches. The first wireless switch resets its home wireless client database (HWCDb) with the information from its data plane wireless client database (KWCDb). The first wireless switch can then transmit a first message to its peer wireless switches which comprises the updated information in its HWCDb. The peer wireless switches store the information from the HWCDb in their respective control plane wireless client databases (CPWCDbs), and initially mark the wireless client devices in the respective CPWCDbs as stale entries. Each of the wireless switches then exchanges information from their respective HWCDbs with the first wireless switch (and other peer wireless switches) so that each wireless switch eventually has a wireless client database (WCDb) comprising each of the wireless client devices in the mobility domain. The first wireless switch refreshes its CPWCDb and its KWCDb with updated information about each of the wireless client devices in the mobility domain such that its CPWCDb and KWCDb are synchronized with information from the respective HWCDbs of the peer wireless switches. The first wireless switch transmits its updated HWCDb to the peer wireless switches. The peer wireless switches can then use the updated information from the updated HWCDb of the first wireless switch to refresh at least some of the stale entries in their respective CPWCDbs. At this point, the respective CPWCDb and the respective KWCDb of each peer wireless switch are synchronized with the updated HWCDb of the first wireless switch.

BRIEF DESCRIPTION OF THE DRAWINGS

The present invention will be described in conjunction with the following drawing figures, wherein like numerals denote like elements.

DETAILED DESCRIPTION

Figure 1:
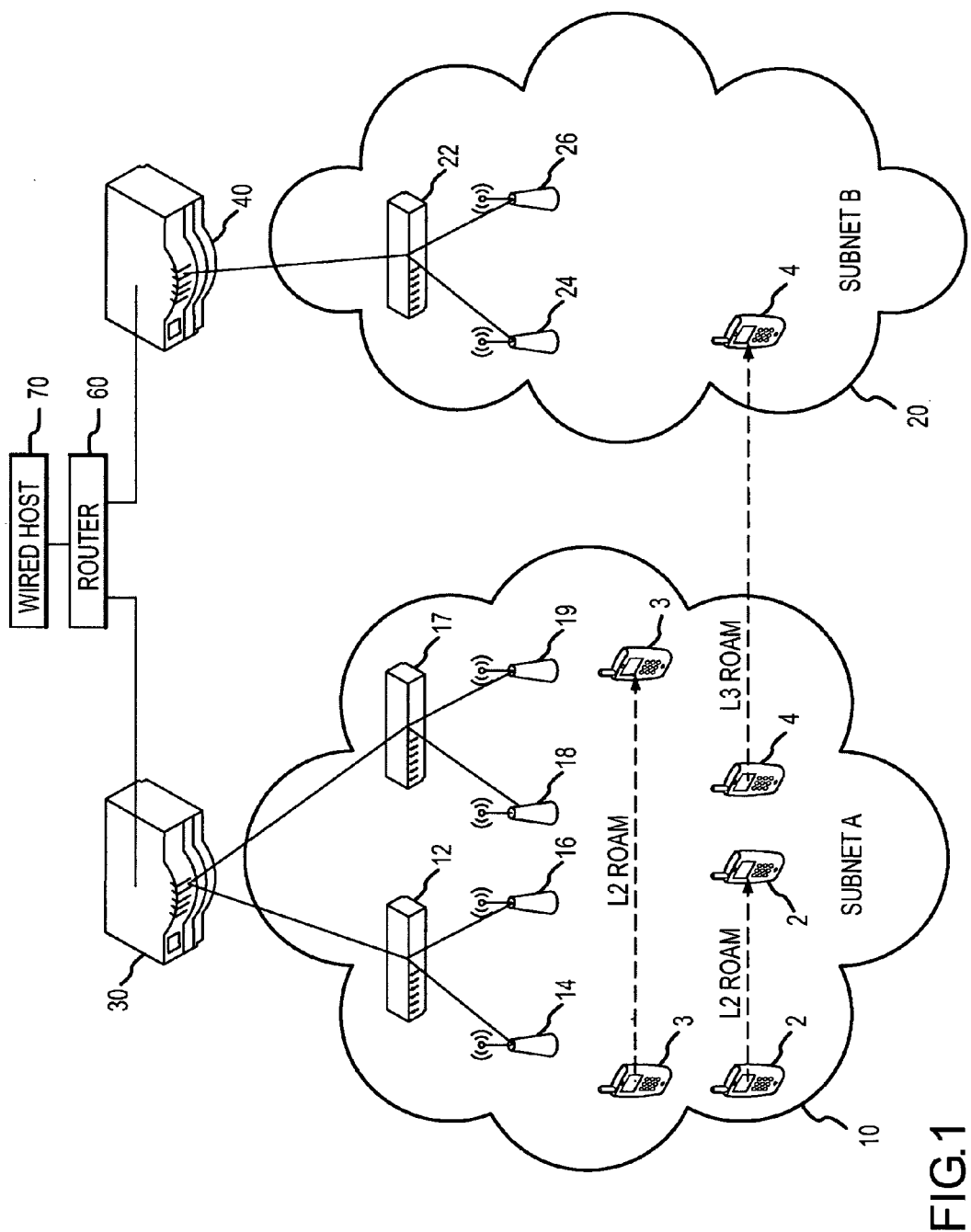
FIG. 1 is a simplified block diagram of a wireless local area network (WLAN)

The following detailed description is merely exemplary in nature and is not intended to limit the invention or the application and uses of the invention. Furthermore, there is no intention to be bound by any expressed or implied theory presented in the preceding technical field, background, or brief summary.

Terminology

As used herein, the word "exemplary" means "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As used herein, the terms "access point (AP)" or "access port (AP)" refer to a device connected to a local area network (LAN) that enables remote wireless stations to communicate with the LAN. An AP is a network-capable device containing a transceiver and antenna for transmitting signals to and receiving signals from the remote stations. The AP thus provides a "point of access" to the wired network for the remote stations. APs allow wireless stations to be quickly and easily connected to a wired LAN. An AP connects users to other users within the network and also can serve as the point of interconnection between the WLAN and a fixed wire network. Each AP can serve multiple users within a defined network area. As a client moves beyond the range of one AP, the client can be automatically handed over to the next AP. A WLAN may only require a single AP. The number of APs in a given subnet generally increases with the number of network users and the physical size of the network.

As used herein, a "client" is a mobile device in a WLAN. The term "wireless client device" or "mobile device" can generally refer to a wireless communication device or other hardware with which an access network communicates. At any given time a mobile device may be mobile or stationary and can include devices that communicate through a wireless channel or through a wired channel. A mobile device may further be any of a number of types of mobile computing devices including but not limited to a laptop computer, a PC card, compact flash, external or internal modem, wireless or wireline phone, personal digital assistant (PDA) or mobile telephone handset.

As used herein, the term "Internet Protocol (IP) address" refers to a layer 3 address, and can be a number which identifies each sender or receiver of information packets across the Internet. Each communication from a user on the Internet carries an IP address of the source and destination networks and the particular machine within the network associated with the user or host computer at each end. An IP address generally comprises an identifier of a particular network on the Internet and an identifier of the particular device (which can be a server or a workstation) within that network. In one implementation, the IP address is a 32-bit address comprising one part identifies the network with a network number and another part which identifies the specific machine or host within the network with a host number. Some of the bits in the machine or host part of the address can be used to identify a specific subnet. In this case, the IP address then contains three parts: the network number, the subnet number, and the machine number.

As used herein, the term "Transmission Control Protocol (TCP)" refers a standard defined in the Request For Comment (RFC) standards document number 793 by the Internet Engineering Task Force (IETF), and performs the task of the transport layer in the simplified OSI model of computer networks. Using TCP, applications on networked hosts can create reliable pipe-like connections to one another, over which they can exchange data or packets. The protocol guarantees reliable and in-order delivery of sender to receiver data. TCP also distinguishes data for multiple, concurrent applications (e.g. Web server and e-mail server) running on the same host.

As used herein, the term "Generic Routing Encapsulation (GRE)-over-Internet Protocol (IP)" refers to a tunneling protocol designed for encapsulation of arbitrary kinds of network layer packets inside arbitrary kinds of network layer packets. GRE can encapsulate a wide variety of protocol packet types inside IP tunnels. The original packet is the payload for the final packet. GRE tunnels are designed to be completely stateless, which means that each tunnel end-point does not keep any information about the state or availability of the remote tunnel end-point. This feature helps the service providers to provide for IP tunnels to its clients, who are not concerned about the internal tunneling architecture at the service providers end. This gives the users (the clients of service providers) flexibility to configure or reconfigure their IP architecture without being concerned about the connectivity issues, creating a virtual point-to-point link to routers at remote points over an IP internetwork. GRE uses IP protocol 47.

As used herein, the term "packet" refers to a unit of data that is routed between an origin and a destination on a packet-switched network such as the Internet. When any file is sent from one place to another on the Internet, the Transmission Control Protocol (TCP) layer divides the file into "chunks" of an efficient size for routing. Each of these packets is separately numbered and includes the Internet address of the destination. The individual packets for a given file may travel different routes through the Internet. When they have all arrived, they are reassembled into the original file by the TCP layer at the receiving end. In the context of the User Datagram Protocol (UDP), it should be appreciated that the term "datagram" has a similar meaning to the term "packet."

As used herein, the term sub-network or "subnet" refers to an identifiably separate part of a network. Typically, a subnet may represent all the machines at one geographic location, in one building, or on the same wireless local area network (WLAN). One standard procedure for creating and identifying subnets is described in Internet Request for Comments (RFC) 950.

As used herein, the term "wireless switch (WS)" refers to a device that channels incoming data from any of multiple input ports to the specific output port that will take the data toward its intended destination. A switch typically performs the data-link or layer 2 function and determines, from the MAC address in each packet, which output port to use for the next part of its trip to the intended destination. In some embodiments, the switch can function as an IP switch which may also perform network or layer 3 routing functions.

As used herein, the term "home switch (HS)" refers to a wireless switch on the wireless client's home subnet that ensures connectivity of the wireless client to the home network irrespective of the actual location of the client. When a wireless client device enters a mobility domain by associating with a WS, it is first assigned a "home switch." The HS is then responsible for assigning a VLAN for the wireless client device and also communicating the wireless client device's L3-mobility-related parameters to the other WSs in the mobility domain. The HS does not change for the remainder of the wireless client device's presence in the mobility domain. All data packets transmitted/received by the wireless client device including DHCP and ARP are tunneled through the HS. The IP address for the wireless client device is assigned from the VLAN to which the wireless client device belongs, as determined by the HS.

As used herein, the term "current switch (CS)" refers to a wireless switch that a wireless client device is currently associated with. The current wireless switch for the wireless client device is the switch in the mobility domain to which it is currently associated to, and keeps changing as the wireless client device continues to roam between different WSs. The CS is also responsible for delivering data packets from the wireless client device to its HS and vice-versa.

As used herein, the term "mobility domain (MD)" refers to a network of wireless switches (WSs) among which a wireless client device can roam seamlessly without changing its IP address. All the WSs in a particular mobility domain are configured to be part of that same mobility domain using a mobility domain string identifier (MDSI). Wireless client devices roaming between switches in the same mobility domain can retain their L3 address and thus maintain application-layer connectivity.

As used herein, the term "tunneling" refers to the process of allowing two disparate networks to connect directly to one another when they normally would not or when they are physically disjointed. A "tunneling protocol" is a network protocol which encapsulates one protocol or session inside another. Protocol A is encapsulated within protocol B, such that A treats B as though it were a data link layer. Tunneling may be used to transport a network protocol through a network which would not otherwise support it. Tunneling may also be used to provide various types of VPN functionality such as private addressing. Tunneling is synonymous with encapsulation, and is generally done by encapsulating private network data and protocol information within public network transmission units so that the private network protocol information appears to the public network as data. A tunnel requires an entry point and an exit point. The entry point encapsulates the tunneled packets within another IP header. The new IP header might include some other parameters, but the basic function of the encapsulation header is to direct the packet to the tunnel endpoint. A packet received by the tunnel endpoint is stripped of the encapsulation header and forwarded to the client.

As used herein, the term "Wireless Local Area Network (WLAN)" refers to a network in which a mobile user can connect to a local area network (LAN) through a wireless (radio) connection. The IEEE 802.11 standard specifies some features of exemplary wireless LANs.

As used herein, the term "Virtual Local Area Network (VLAN)" refers to group of ports on an Ethernet switch that behaves like a separate network segment VLANs allow networks to be segmented logically without having to be physically rewired. Instead of having all ports on a switch be equal and belong to the same network, ports can be segregated into groups, each belonging to a separate logical network. Virtual LANs subdivide a physical local area network into multiple virtual local area networks or multiple smaller broadcast domains without needing additional network devices, such as routers, to do this. One switch may have several VLANs defined on it. A VLAN is identified using a special identification number called a VLAN ID. Stations attached to switch ports having the same VLAN ID act and function as though they are all on the same physical network segment. The VLAN ID is transmitted in every packet associated with that VLAN. For more information see the IEEE 802.1Q standard on VLANs.

Exemplary Network Architecture

FIG. 1 is a simplified block diagram of a wireless local area network (WLAN). The WLAN of FIG. 1 includes wireless client devices 2, 3, 4, a first subnet (A) 10, wireless switches 12, 17 coupled to access points (APs) 14, 16 and APs 18, 19, respectively, a second subnet (B) 20, a wireless switch 22 coupled to access points (APs) 24, 26, layer 2 (L2) switches 30, 40 coupled to wireless switches 12, 17 and wireless switch 22, respectively, and a layer 3 (l3) router 50 coupled to the L2 switches 30, 40.

The L2 switch 30 is coupled to the wireless switches 12, 17. The wireless switch 12 supports the first subnet (A) 10 and is coupled to the access points (APs) 14, 16, and the wireless switch 17 supports the first subnet (A) 10 and is coupled to the access points (APs) 18, 19.

The L2 switch 40 is coupled to the wireless switch 20. The wireless switch 22 supports the second subnet (B) 20 and is coupled to the access points (APs) 24, 26.

The wireless switches 12, 17, 22 communicate with the wireless client devices 2, 3, 4 via the access points 14, 16, 18, 19, 24, 26. The wireless client clients 2, 3, 4 physically move around the WLAN, and communicate with an IP network via the access points (APs) 14, 16, 18, 19, 24, 26.

The L3 router 60 provides connectivity to the rest of the network. Each interface on the router is associated with an independent IP subnet (e.g. subnet A, subnet B) as shown in FIG. 1. Traffic that goes between interfaces (i.e. between IP subnets) is routed using standard rules of IP.

Mobility is a key driver in the deployment of wireless networks. WLANs can give wireless client devices the ability to "roam" or physically move from place to place without being connected by wires. In the context of WLANs the term "roaming" generally describes the physically movement of a wireless client device between APs. When a wireless client device roams from one AP to another within the same IP subnet, the transition is handled by 802.11 and the layer 2 network. When the wireless client device re-associates with the new AP, a data packet sent from the wireless client device informs the network of the new location of the wireless client device. "Switching tables" of layer 2 (L2) switches on the path to the wireless client device are updated appropriately. By contrast, layer 3 (L3) tables are not affected. If a network implements a "wireless switch," it will update its internal tables to indicate that the wireless client device is now with the new AP.

FIG. 1 illustrates the concept of wireless client device 2 performing a layer 2 roaming and the concept of wireless client device 4 performing layer 3 roaming in the WLAN. A layer 2 (L2) network is defined as a single IP subnet and broadcast domain, such as the first subnet (A) 10, while a layer 3 (L3) network is defined as the combination of multiple IP subnets and broadcast domains, such as the first subnet (A) 10 and the second subnet (B) 20.

Layer 2 (L2) refers to the data link layer of the Open Systems Interconnection (OSI) communication model. The data link layer is concerned with moving data across the physical links in the network. In a network, the switch is a device that redirects data messages at the layer 2 level, using the destination Media Access Control (MAC) address to determine where to direct the message. In the context of the IEEE-802 LAN standards, the data link layer contains two sublayers called the Media Access Control (MAC) sublayer and the Logical Link Control (LLC) sublayer. The data link layer ensures that an initial connection has been set up, divides output data into data frames, and handles the acknowledgements from a receiver that the data arrived successfully. The data link layer also ensures that incoming data has been received successfully by analyzing bit patterns at special places in the frames. In a local area network (LAN) or other network, the Media Access Control (MAC) address is a host computer's unique hardware number, and on an Ethernet LAN the MAC address is an Ethernet address. When a computer or other host connects to the Internet, a correspondence table relates the hosts IP address to the host's physical (MAC) address on the LAN. The MAC address is used by the Media Access Control sublayer of the Data-Link Layer (DLC) of telecommunication protocols. There is a different MAC sublayer for each physical device type.

As shown in FIG. 1, layer 2 (L2) roaming occurs when a client 2 moves far enough away from its AP 14 such that its radio associates with a different AP 16 in the same subnet. The client 2 disconnects from AP 14 and re-connects to another AP 16 in the same subnet (broadcast domain) where several APs use the same Service Set Identifier (SSID). Similarly, L2 roaming also occurs when a client 3 moves far enough away from its AP 14 such that its radio associates with a different AP 19 in the same subnet (even though on a different wireless switch 17). The client 3 disconnects from AP 14 and re-connects to another AP 19 in the same subnet (broadcast domain) where several APs use the same Service Set Identifier (SSID) An SSID is a sequence of alphanumeric characters (letters or numbers) which specify the name of a wireless local area network (WLAN). All wireless devices on a WLAN must employ the same SSID in order to communicate with each other. The SSID on wireless client devices can be set either manually, by entering the SSID into the client network settings, or automatically, by leaving the SSID unspecified or blank. Generally, there are two types of SSIDs. A Basic Service Set Identification (BSSID) is the identifying name of an ad-hoc wireless network with no access points. An Extended Service Set Identification (ESSID) is used in infrastructured wireless networks, which include access points, as the identifying name of a wireless network. The ESSID is the identifying name of a wireless access point. It allows one wireless network to be clearly distinguishable from another. A client 2 continuously listens to nearby APs and can decide to roam if it finds an AP with the same SSID and a stronger signal or is experiencing too much loss with the current AP 14. To initiate a roam, the client 2 sends an associate (or reassociate) request to the new AP 16. It may disassociate from the old AP 14, or the old AP 14 may notice the client 2 is no longer there. Wireless client device 3 can use a similar process to roam from AP 14 to AP 19.

IEEE's 802.11(f) Inter Access Point Protocol (IAPP) addresses roaming between Access Points (APs) inside client's home subnet and assures constant IP-connectivity in this case. With layer 2 (L2) roaming, APs inside a given subnet share the same Extended Service Set (ESS), and although the physical point of attachment (the AP) changes, the client 2 is still served by the same Access Router. Because the original and the new AP offer coverage for the same IP subnet, the device's IP address is still valid after the roam and can remain unchanged. For example, when the wireless client device 2 roams within the first subnet (A) 10, the IP address of the wireless client device 2 will remain the same.

After the wireless client devices 2, 3 successfully roam, LAN traffic for the wireless client device 2, 3 can be relayed through the new AP. However, because the scalability of subnets is limited by the number of APs and clients that can be supported within a given subnet, in some situations the client roams to a new AP in a different or foreign subnet supported by another wireless switch.

Layer 3 (L3) refers to the network layer of the Open Systems Interconnection (OSI) multilayered communication model. The network layer is concerned with knowing the address of the neighboring nodes in the network, selecting routes and quality of service, and recognizing and forwarding to the transport layer incoming messages for local host domains.

Layer 3 (L3) roaming occurs when a wireless client device 4 moves from an AP within its home IP subnet, such as the first subnet (A) 10, to a new AP within a foreign IP subnet, such as the second subnet (B) 20. This foreign IP subnet has a different Basic Service Set (BSS) than the home IP subnet. The client 4 disconnects from one AP and reconnects or re-associates with another foreign AP in a foreign IP subnet outside its home IP subnet. In this re-association, the client 4 is supposed to be served by a different access router (through the foreign AP), which bares a different IP address, while the client 4 itself preserves its original IP address. Within a single IP subnet traffic is Ethernet (layer 2) switched. The IEEE 802.11 standard operates completely at layer 2 (L2) and is independent of a layer 3 (L3) protocol. As such, the client 4 would no longer have an IP address and default gateway that are valid within the foreign IP subnet. Packets originating from a remote host destined for this wireless client device are still forwarded to the IP router attached to the first IP subnet. As a result transport layer connectivity with the wireless client device is lost and applications are interrupted or stopped. Therefore, if no other protocol is implemented to address an L3 roam, the client 4 will not able to send/receive IP packets from/to its current location. As a result, active IP sessions can be dropped because IP-connectivity is lost.

With the emerging usage of real time multimedia applications such as voice over IP (VoIP) telephony, these same WLAN networks can also be used as infrastructure for enabling such applications. One issue in the area of WLANs relates to the ability to maintain an IP-connection while roaming. For example, when the wireless client device roams from a first IP subnet to a new IP subnet, since Internet Routing Tables are not changed, there is no way to tell the rest of the network that the wireless client device is now in a new IP subnet. Because the wireless client device cannot be identified by its original home IP address anymore, a new IP address is required for the routing the client's IP data. Consequently, without some mechanism for seamlessly obtaining a new IP address which is valid in the subnet, any on-going connections can be disrupted and IP connectivity can be lost. In order to reestablish connectivity the wireless client device will have to be assigned a new IP address in the new subnet. IEEE 802.1X and 802.11 does not specify a mechanism for IP address assignment. In a typical WLAN, a layer 3 or IP device provides an IP addressing service and assigns IP addresses to the clients. For example, for each wireless switch in the WLAN, an external DHCP server can be provided which supports a single IP subnet associated with a particular wireless switch. This external DHCP server receives all DHCP requests broadcasted on a given subnet, and assigns IP addresses to all clients of that given subnet. This behavior is highly undesirable for many applications. For applications like wireless VoIP phones or streaming applications, this is not acceptable. For instance, in the context of a Voice-over-IP application, a Voice-over-IP phone will lose calls. Thus, it would be desirable to provide techniques and technologies which can allow wireless client devices to retain their IP addresses when roaming across IP subnets. Such techniques would allow wireless client devices to retain application layer connectivity and make roaming as transparent as possible to the user.

To prevent existing data sessions or voice calls from failing because the remote client can no longer reach the local client, processes called "IP handoff" or "L3 handover" can be used to preserve the IP traffic to/from the client 4 after such re-association with the foreign AP. This process is not addressed by current IEEE 802.11 standards.

Nevertheless, some vendors of WLANs have developed solutions which can allow layer 3 roaming to occur by providing mechanisms for a client to obtain a new IP address. For instance, if the client roams across a boundary between the first subnet (A) 10 and the second subnet (B) 20 and a Dynamic Host Configuration Protocol (DHCP) is enabled on the client, then the client can use DHCP to obtain a new IP address of the second subnet (B) 20. As used herein, the "Dynamic Host Configuration Protocol (DHCP)" refers to a protocol for assigning dynamic IP addresses to devices on a network. DHCP typically sends a new IP address when a computer is plugged into a different place in the network. This protocol allows a device to have a different IP address every time it connects to the network, and the device's IP address can even change while it is still connected. DHCP can also support a mix of static and dynamic IP addresses. DHCP uses the concept of a "lease" or amount of time that a given IP address will be valid for a computer. Using very short leases, DHCP can dynamically reconfigure networks in which there are more computers than there are available IP addresses.

However, layer 3 traffic re-routing requires more than updating MAC address tables and ARP caches. Many applications require persistent connections and drop their sessions as a result of inter-subnet roaming. Network layer devices such as routers and layer 3 switches must somehow be told to forward IP packets to the client's new subnet. To provide session persistence, mechanisms are needed to allow a client to maintain the same Layer 3 address while roaming throughout a multi-subnet network. Otherwise, many applications will timeout trying to reach the client's old IP address and must be reconnect with the client's new IP address.

One way to support layer 3 roaming in WLANs is via an open IETF standard called Mobile IP. Mobile IP provides one solution for handling the L3 movements of clients regardless of the underlying layer 2 technology.

In the context of Mobile IP, the client is referred to as a mobile node (MN). In the description that follows, these terms are used interchangeably. Mobile IP uses a Home Agent (HA) to forward IP packets to a Foreign Agent (FA) in the client's new subnet. The HA and FA advertise themselves using the ICMP Router Discovery Protocol (IRDP). The Foreign Agent periodically advertises its presence wirelessly and waits for a solicitation message from a roaming MN. When a mobile node roams to a new subnet, it must discover and register itself with a nearby FA. The registration process for such a node is triggered by a wireless registration request (after the 802.11 association is completed) issued by the MN. The FA forwards that request to that client's original HA. Wired messages can then be exchanged between the HA and the FA as well as with binding table updates. An acknowledgment can then be sent wirelessly to the MN.

If the request is accepted, a tunnel is established between the HA and FA to relay incoming packets sent to the client's original IP address. The HA serves as the anchor point for communication with the wireless client device. It tunnels packets from Corresponding Nodes (CNs) towards the current address of the MN and vise versa. Outbound packets are routed back through the tunnel from the FA to HA, and then on to their destination.

Although Mobile IP preserves subnet connectivity for roaming clients, it can result in sub-optimal routing and longer roaming delay. As noted above, the wireless client device must first regain over the air connectivity with its new FA before the Agent Discovery Phase is launched. This can result in considerable reconnection time which increased latency. Furthermore, the registration process involves wire line and wireless communication. The amount of packet loss and the significant delay introduced during these procedures make the method unsuitable for many WLAN applications, such as VoIP over 802.11 or streaming over 802.11. Moreover, all mobile nodes require additional software to be Mobile-IP enabled. Wireless client devices are manufactured by several different vendors. To ensure multi-vendor interoperability, it would be desirable to provide L3 roaming techniques do not require any changes to wireless client devices (e.g., additional software on the wireless client devices).

Notwithstanding these advances, as new applications emerge and are implemented, such as VoIP over 802.11, changes to the WLAN deployment are required. For example, coverage-oriented deployments must move to capacity-oriented deployments characterized by low user to AP ratio and more APs in a given coverage area. The move to capacity-oriented deployments emphasizes the need for techniques that allow clients to roam across subnets and roaming domains.

There is a need for layer 3 roaming techniques which can allow a client to roam across different IP subnets of a WLAN while preserving the client's original IP-connection and original IP address. It would be desirable if such techniques could allow the client to perform a seamless and smooth L3 handoff between APs of different IP subnets, while maintaining an active session without losing IP connectivity. It would be desirable if such techniques could enable routing of IP data to/from the client's current foreign subnet to their original IP address and home subnet even though the client is currently in the foreign subnet.

Overview

Techniques and technologies are provided for restarting a first wireless switch when the first wireless switch fails. The first wireless switch comprises a control plane comprising a control plane layer 3 (L3) mobility module and a control plane wireless client database (CPWCDb), and a data plane comprising a data-forwarder module and a data plane wireless client database (KWCDb). The CPWCDd and the KWCDb are separated from each other and function independently of each other so that failure of one does not affect the other. As a result, the failure of one module does not affect the other.

The KWCDb comprises information for each of the wireless client devices for which the first wireless switch was either the home wireless switch and/or the current wireless switch before failing. The KWCDb includes entries for wireless client devices indexed by their MAC address. The information about each particular wireless client device comprises mobility related parameters that can be used to distinguish between new wireless client devices entering the mobility domain and existing wireless client devices roaming within the mobility domain. The mobility related parameters for each particular wireless client device comprise: a MAC address of the particular wireless client device, an IP-address of the particular wireless client device, an IP address of the home wireless switch (HS) for the particular wireless client device, an IP address of the current wireless switch (CS) for the particular wireless client device, and a VLAN identifier of the home wireless switch (HS) for the particular wireless client device.

According to one implementation of these techniques, after the first wireless switch fails, the control plane L3 mobility module restarts and the first wireless switch transmits a restart message to peer wireless switches of the first wireless switch to announce that the first wireless switch has restarted and to begin re-establishing peering sessions with peer wireless switches. When the control plane L3 mobility module restarts, the first wireless switch resets its home wireless client database (HWCDb) with the information from the KWCDb. The first wireless switch can reset its home wireless client database (HWCDb) with the information from its data plane wireless client database (KWCDb) by scanning the KWCDb, discarding entries in its CPWCDb, and updating its HWCDb with the information from its KWCDb. The first wireless switch can then transmit a first message which comprises the updated information in its HWCDb to its peer wireless switches. The first message indicates that the first wireless switch has restarted and comprises the updated information in its HWCDb thereby allowing information to/from wireless client devices and to/from a wired network to continue to flow through the first wireless switch.

Prior to the first wireless switch failing, each wireless switch in the first mobility domain exchanges a hitless-restart capability message when the wireless switches originally begin a peering session. The hitless-restart capability message indicates capability to perform hitless-restart. Every wireless switch in the network also sends a timer which specifies its restart period to each of its peer wireless switches when it first establishes peering sessions. For example, the first wireless switch can specify a restart period of the first wireless switch. This restart period starts whenever the peer wireless switches receive a restart message from the first wireless switch. During the restart period, the first wireless switch and the peer wireless switches continue to retain the information about the wireless client devices. If a session with the first wireless switch can not be re-established within the restart period, then the peer wireless switches can discard the information about the wireless client devices.

When the peer wireless switches receive a restart message, the peer wireless switches behave as if there was no change in the peering state (e.g., peer wireless switches act as if the peering session never went down and then came back up). When the peer wireless switches receive the information in the HWCDb of the first wireless switch, the peer wireless switches store the information from the HWCDb in respective CPWCDbs of the peer wireless switches, and initially mark the wireless client devices in the respective CPWCDbs as stale entries.

Each of the wireless switches then exchanges information from respective home wireless client databases (HWCDbs) with the first wireless switch (and other peer wireless switches) as a peering session is established between the first wireless switch and that peer wireless switch. Each respective HWCDb comprises the set of wireless client devices for which the particular peer wireless switch is the home wireless switch. As such, each wireless switch eventually has a wireless client database (WCDb) comprising each of the wireless client devices in the mobility domain.

The first wireless switch refreshes its CPWCDb and its KWCDb with updated information about each of the wireless client devices in the mobility domain such that its CPWCDb and KWCDb are synchronized with information from the respective HWCDbs of the peer wireless switches. For instance, in one implementation, the first wireless switch receives the information about wireless client devices from the respective HWCDbs of the peer wireless switches, and updates its CPWCDd with the information about each of the wireless client devices in the mobility domain. The first wireless switch also updates its KWCDb with the information from its CPWCDd, and determines ones of the stale entries in the KWCDd which are updated with information in the respective HWCDbs of the peer wireless switches. The first wireless switch replaces the ones of the stale entries in the KWCDb with the updated information from the respective HWCDbs of the peer wireless switches, and removes any remaining stale entries from the KWCDb of the first wireless switch. The first wireless switch transmits its updated HWCDb to the peer wireless switches.

The peer wireless switches can then use the updated information from the updated HWCDb of the first wireless switch to refresh at least some of the stale entries in their respective CPWCDbs. For example, the peer wireless switches can remove remaining stale entries from their respective CPWCDds and KWCDbs. The remaining stale wireless client devices comprise ones of the stale entries originally learned by the peer wireless switches from the first wireless switch and not re-learned again from the first wireless switch after the peering sessions are re-established between the first wireless switch and the peer wireless switches. At this point, the respective CPWCDb and the respective KWCDb of each peer wireless switch are synchronized with the updated HWCDb of the first wireless switch.

In addition, the data-forwarder module uses the MAC addresses of the wireless client devices to forward packets to/from the wireless client devices. Notably, the data-forwarder module continues to forward information to/from the wireless client devices while the first wireless switch is in the process of re-establishing peering sessions between the first peer wireless switch and the peer wireless switches of the first wireless switch. Similarly, the data-forwarder module continues to receive information from the wireless client devices while the first wireless switch is in the process of re-establishing peering sessions between the first peer wireless switch and the peer wireless switches of the first wireless switch. The data-forwarder module continues forwarding information to/from the wireless client devices until the CPWCDd and the KWCDb are synchronized.

Exemplary Embodiments

Figure 2:
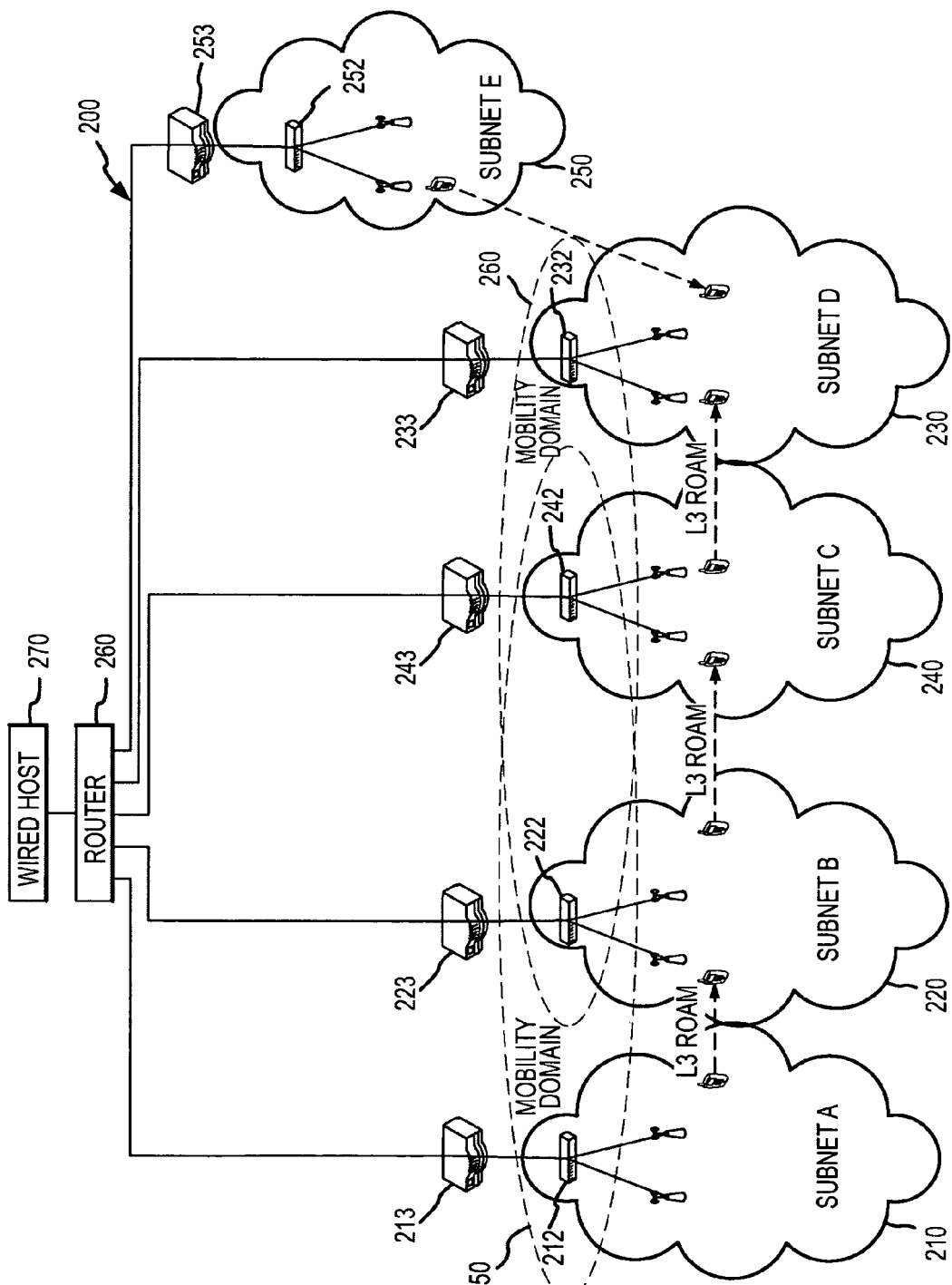
FIG. 2 is a simplified block diagram of a WLAN showing the concept of mobility domains.

FIG. 2 is a simplified block diagram of a WLAN 200 showing the concept of mobility domains 250, 260. The WLAN 200 shown in FIG. 2 comprises a number of wireless client devices 202, 204, 206, wireless switches 212, 222, 232, 242, 252 coupled to APs, L2 switches 213, 223, 233, 243, 253, a L3 router 260 coupled to each of the L2 switches 213, 223, 233, 243, 253, and a wired host 270 coupled to the L3 router 260. For sake of simplicity, in FIG. 2 each of the wireless switches 212, 222, 232, 242, 252 is shown as having two APs associated therewith. However, it will be appreciated that, while not shown in FIG. 2, each of the wireless switches can have more than less than two APs or more than two APs associated therewith. In FIG. 2, wireless switches 212, 222, 242 are part of a first mobility domain 250, while wireless switches 222, 232, 242 are part of a second mobility domain 260 and wireless switch 252 is not part of any mobility domain.

A mobility domain refers to a network of wireless switches (WSs) among which a wireless client device can roam seamlessly without changing its IP address. Wireless client devices roaming between switches in the same mobility domain can retain their L3 address and thus maintain application-layer connectivity. All the WSs in a particular mobility domain are configured to be part of that same mobility domain using a mobility domain string identifier (MDSI).

Thus, in FIG. 2, when wireless client device 202 moves or roams from wireless switch/AP 212 to wireless switch/AP 222, wireless client device 202 can retain its L3 address and application-layer connectivity because wireless switches 212 and 222 are part of a common mobility domain (e.g., wireless switches 212 and 222 share a common mobility domain string identifier (MDSI)). By contrast, when wireless client device 206 moves or roams from wireless switch/AP 252 to wireless switch/AP 232, wireless client device 206 can not retain its L3 address and thus loses application-layer connectivity because wireless switches 252 and 232 are not part of a common mobility domain (e.g., wireless switches 252 and 232 do not share a common mobility domain string identifier (MDSI)). Wireless client device 206 would need to change its IP address to reconnect or re-establish application-layer connectivity. By contrast, when wireless client device 204 moves or roams from wireless switch/AP 242 to wireless switch/AP 232, wireless client device 204 can retain its L3 address and thus maintains application-layer connectivity because wireless switches 242 and 232 are part of a common mobility domain 260 (e.g., wireless switches 242 and 232 share a common mobility domain string identifier (MDSI)).

Overview: L3 Mobility Protocol

According to one embodiment, a layer 3 (L3) mobility protocol for a wireless local area network (WLAN) is provided.

Figure 3:
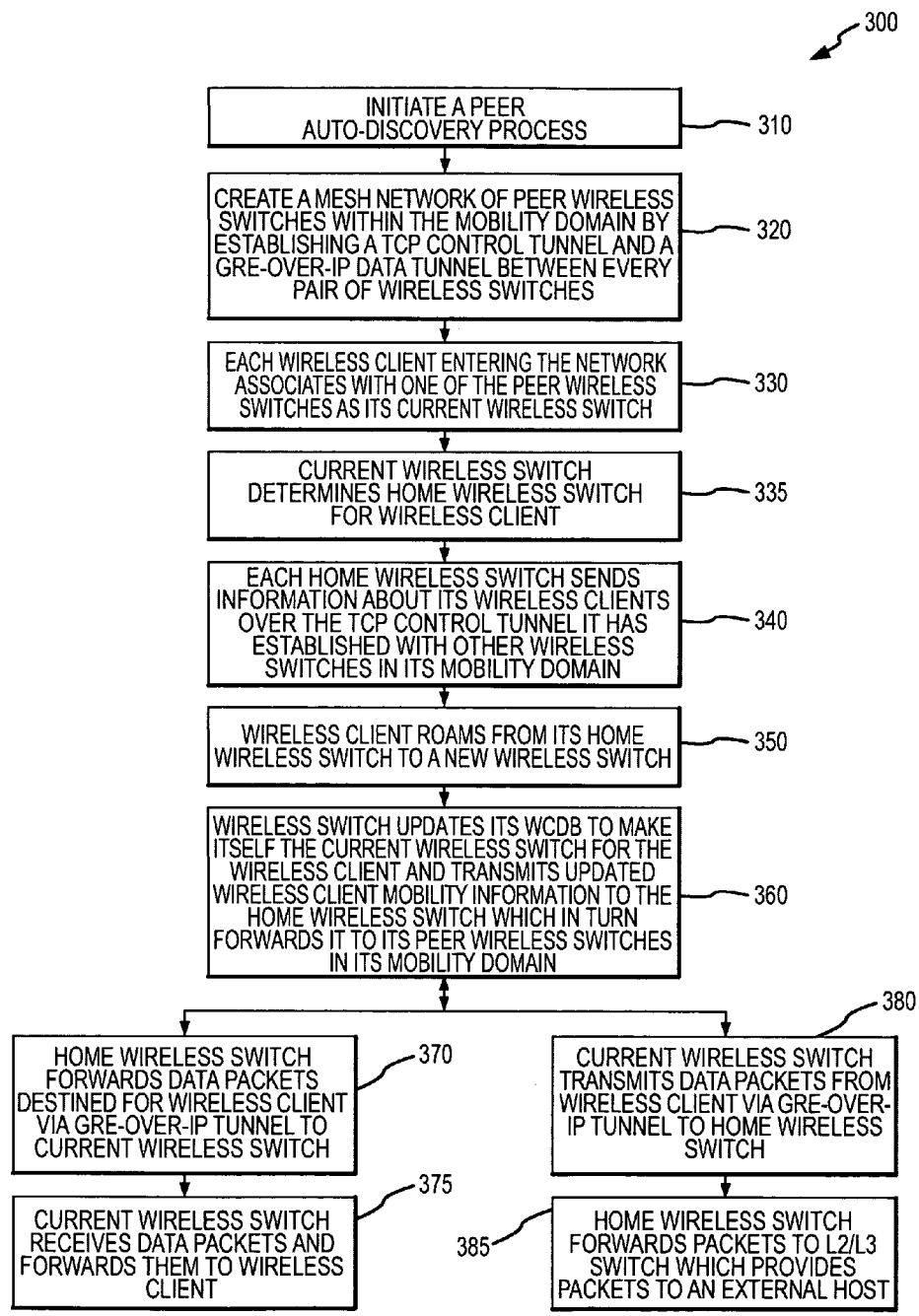
FIG. 3 is a flow chart showing a layer 3 (L3) mobility protocol according to one exemplary implementation.

FIG. 3 is a flow chart showing a layer 3 (L3) mobility protocol 300 according to one exemplary implementation. For purposes of illustrating how this layer 3 (L3) mobility protocol 300 could apply to one exemplary non-limiting network configuration, the description of FIG. 3 will be provided with reference to the simplified WLAN shown in FIG. 1. It will be appreciated, however, that this layer L 3 (L L3) mobility protocol 300 could be applied in other types of networks having different configurations.

When the wireless switches having L 3 mobility functionality are deployed and power-up in the network, at step 310, the wireless switches initiate a peer auto-discovery process. During the initiation phase of the peer auto-discovery process each wireless switch attempts to discover or locate other wireless switches in the WLAN.

During the next phase of the peer auto-discovery process, at step 320, a mesh network of peer wireless switches is created within the mobility domain. Each wireless switch establishes a peering session with all of the other switches (within its own mobility domain) to exchange mobility related control plane information. The peer auto-discovery service enables WSs in a network to establish peering sessions automatically without any operator intervention. To establish peering session between switches, control connections and data tunnels are created between each of the wireless switches. These tunnels effectively create a mesh network of peer wireless switches which allows for the layer 3 (L3) mobility protocol 300 to be implemented.

For example, each of the wireless switches can establish a control connection with the other wireless switches (within its own mobility domain) which operates using the transmission control protocol (TCP). These control connections are used for reliable communication or "transfer" of mobility control information including wireless client device mobility information, and other control information. Peering sessions use TCP as the transport layer protocol to carry mobility update messages since TCP has characteristics such as: TCP retransmits lost messages thereby providing reliable connectivity, TCP ensures in-order delivery of messages using sequence numbers, and TCP has a built-in keep-alive mechanism which helps detect loss of connectivity to the peer or peer failure.

In addition, the every switch establishes a data tunnel to every other switch using GRE-over-IP. In GRE-over-IP any lost data packets are not retransmitted. The entire Layer-2 packet is tunneled (i.e., not just the IP packet) so information in Layer-2 header is available at the destination of the tunnel. As will be described in greater detail below, this is particularly useful for handling multicast, broadcast packets as well as non-IP packets.

After the tunnels are established between each of the wireless switches the mesh of peer wireless switches has been established. At step 330, each wireless client device entering the network associates with one of the peer wireless switches as its current wireless switch. For example, in one implementation, when a particular wireless client device enters a network, it associates with a wireless switch which becomes the "current" wireless switch for that particular wireless client device.

At step 335, this current wireless switch can then initiate a home wireless switch selection process to determine a home wireless switch for that particular wireless client device. The home wireless switch selection process can consider a number of factors to select a particular wireless switch as the home wireless switch for that particular wireless client device. A particular wireless switch can be assigned as a HS for a wireless client device based on a variety of factors (or a combination of such factors), including, but not limited to number of wireless client devices homed on the wireless switch, number of wireless client devices associated with the wireless switch, data throughput on the wireless switch, propensity of the wireless client device to stay in the vicinity of that wireless switch, etc. For example, in the network configuration shown in FIG. 1, both wireless client devices 2, 4 initially select wireless switch 12 as their "home switches."

At step 340, each home wireless switch 12 sends information about its wireless client devices 2, 4 over the control connection it has established with wireless switch 20 and any other wireless switches in its mobility domain. For example, the wireless switches can exchange wireless client device mobility information which can include, for example, the IP address, MAC address, HS IP address, CS IP address and HS-VLAN-id of all the wireless client devices in the mobility-domain.

At step 350, a wireless client device roams from its home wireless switch to another "new" wireless switch. For instance, in the exemplary network configuration shown in FIG. 1, wireless client device 4 roams from its home wireless switch 12 to wireless switch 22. Wireless switch 22 receives, via AP 24, an 802.11 association or reassociation request from wireless client device 4.

At step 360, each of the wireless switches update their respective wireless client databases (WCDbs) to make itself the current wireless switch for the wireless client, and transmit updated wireless client mobility information to the home wireless switch which in turn forwards it to its peer wireless switches in its mobility domain. For instance in FIG. 1, wireless switch 22 locates wireless client device 4 in its wireless client database (WCDb), discovers that wireless switch 12 is the "home switch" of wireless client device 4, updates its WCDb to make itself the "current switch" (CS) for wireless client device 4, and transmits its updated wireless client device mobility information for wireless client device 4 to the original "home" wireless switch 12 (and any other wireless switches in the mobility domain of wireless switch 22).

When wireless switch 12 receives the updated wireless client device mobility information for wireless client device 4 from current wireless switch 22, at step 370, the home wireless switch 12 forwards data packets destined for wireless client device 4 (which it receives from the L2/L3 switch 34) over the GRE-over-IP tunnel it shares with current wireless switch 22 to current wireless switch 22. At step 375, current wireless switch 22 receives these data packets (over the GRE-over-IP tunnel) and forwards these data packets to wireless client device 4.

Conversely, when packets originating from wireless client device 4 are received by current wireless switch 22 (via AP 24), at step 380, the current wireless switch 22 transmits those data packets over the GRE-over-IP tunnel to the original "home" wireless switch 12. At step 385, the original "home" wireless switch 12 then forwards the data packets to the router 60 which provides the data packets to an external host. To the external host it still appears that wireless client device 4 is on subnet A, and the external host continues to forward traffic to the router 60 and on to wireless switch 12. As such, layer 3 (L3) routing tables are not changed.

It will be appreciated that while these techniques and technologies have been described with reference to IP traffic, because these techniques and technologies operate at a layer 2 (L2) level, these techniques and technologies work for non-IP traffic as well. As such, the wireless client devices can be running IP, IPX or other protocols. In addition, in comparison to other techniques (e.g., Mobile IP [RFC 3344]), it will be appreciated that these techniques do not require any changes to the wireless client devices (e.g., special functionality or software on the wireless client devices). This can reduce and possibly eliminate inter-working problems which can arise when working with wireless client devices from different vendors/legacy devices.

As will be described below, other embodiments are provided for handling multicast traffic, broadcast traffic, roaming to a different wireless switch within the same L3 subnet, loss or reestablishment of connectivity between peer switches, etc.

Peer Auto-Discovery Techniques

The peer auto-discovery process which is used can vary depending on the network implementation. For example, advanced enterprise networks provide the ability to multicast IP messages to a group of hosts or switches. Older networks usually do not have this ability. In order for IP multicast to work correctly, all switches in the network must be IP multicast capable. Sometimes, network administrators may deliberately disallow IP multicast. Therefore, two alternative techniques for peer auto-discovery will now be described. One such technique, referred to as peer auto discovery using IP multicast, can be used if IP multicast is enabled. Another such technique, referred to as peer auto discovery using Discovery Agent, can be used if IP multicast is not available.

Peer Auto-Discovery Using IP Multicast

Peer auto discovery using IP multicast takes advantage of existing IP multicast networks to locate and identify peers within a particular mobility domain. To use this technique 400, IP Multicast routing must be enabled on the network for peer-discovery to work across L3 subnets. IP multicast allows a sender wireless switch to transmit a single packet to multiple wireless switches belonging to an IP multicast group. The sender wireless switch does not require prior knowledge of the location of the other member wireless switches belonging to the IP multicast group, or the number of the member wireless switches belonging to the IP multicast group. Intermediate wireless switches on the path make additional copies of the packet to send the packet to other IP multicast group member wireless switches.

Figure 4:
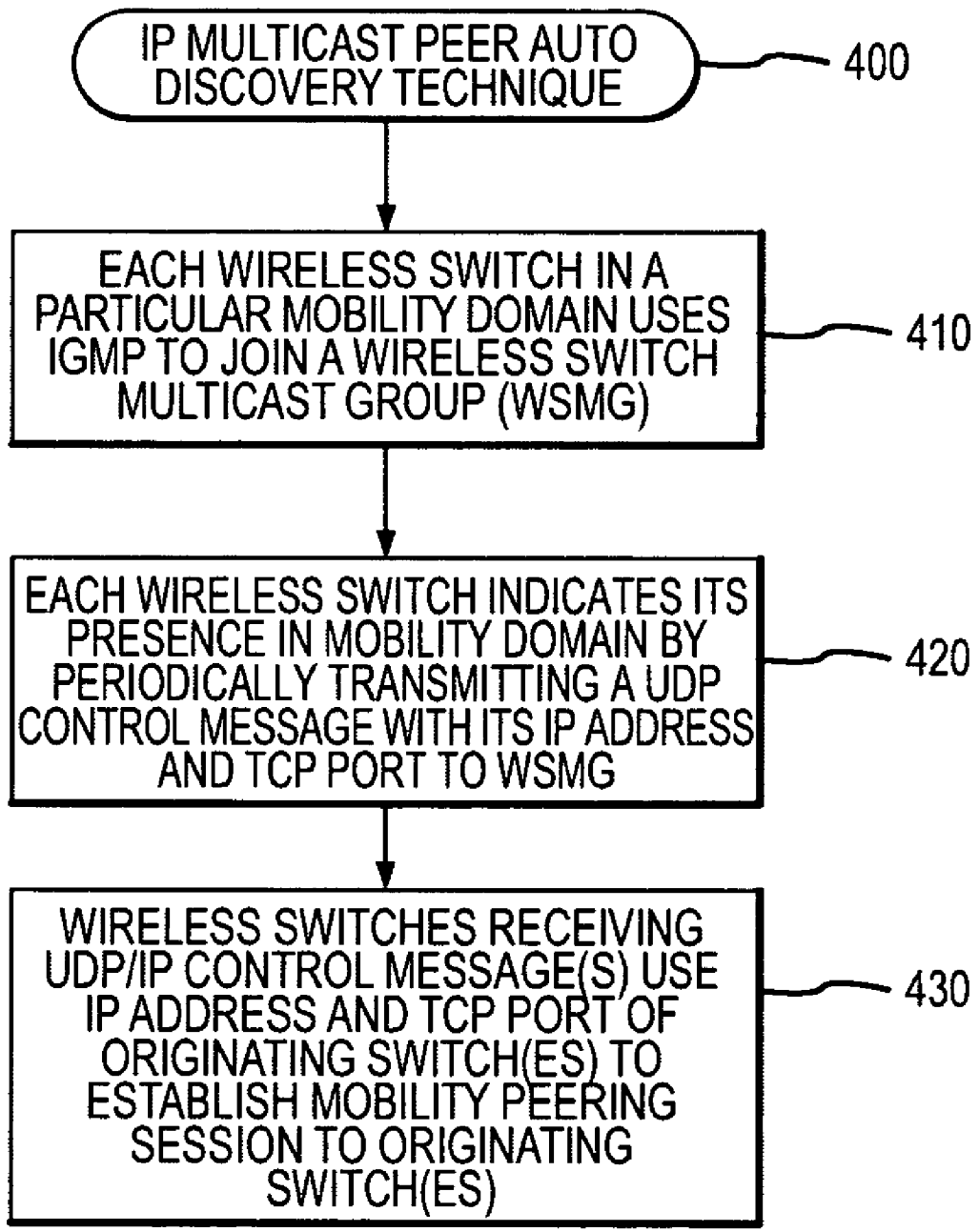
FIG. 4 is a flow chart showing an IP multicast peer auto discovery technique according to one exemplary implementation

FIG. 4 is a flow chart showing an IP multicast peer auto discovery technique 400 according to one exemplary implementation.

At step 410, each of the wireless switches in a particular mobility domain use an Internet Group Management Protocol (IGMP) to initially "join" a Wireless Switch Multicast Group (WSMG). The Internet Group Management Protocol (IGMP) is an Internet protocol that provides a way for an Internet computer to report its multicast group membership to adjacent routers. Multicasting allows one computer on the Internet to send content to multiple other computers that have identified themselves as interested in receiving the originating computer's content. IGMP is formally described in the Internet Engineering Task Force (IETF) Request for Comments (RFC) 2236.

At step 420, each wireless switch indicates its presence in mobility domain by periodically transmitting a UDP control message with its IP address and TCP port to WSMG. Each wireless switch in the WSMG can periodically transmits a UDP control message to the WSMG on a specific UDP port. The control message comprises information which identifies an IP address and TCP port number of the originating switch.

When other switches receive this message, at step 430, the receiver wireless switches can use the IP address and TCP port of the originating switch to establish mobility peering session to the originating switch.

Peer Auto-Discovery Using Discovery Agent

Figure 5:
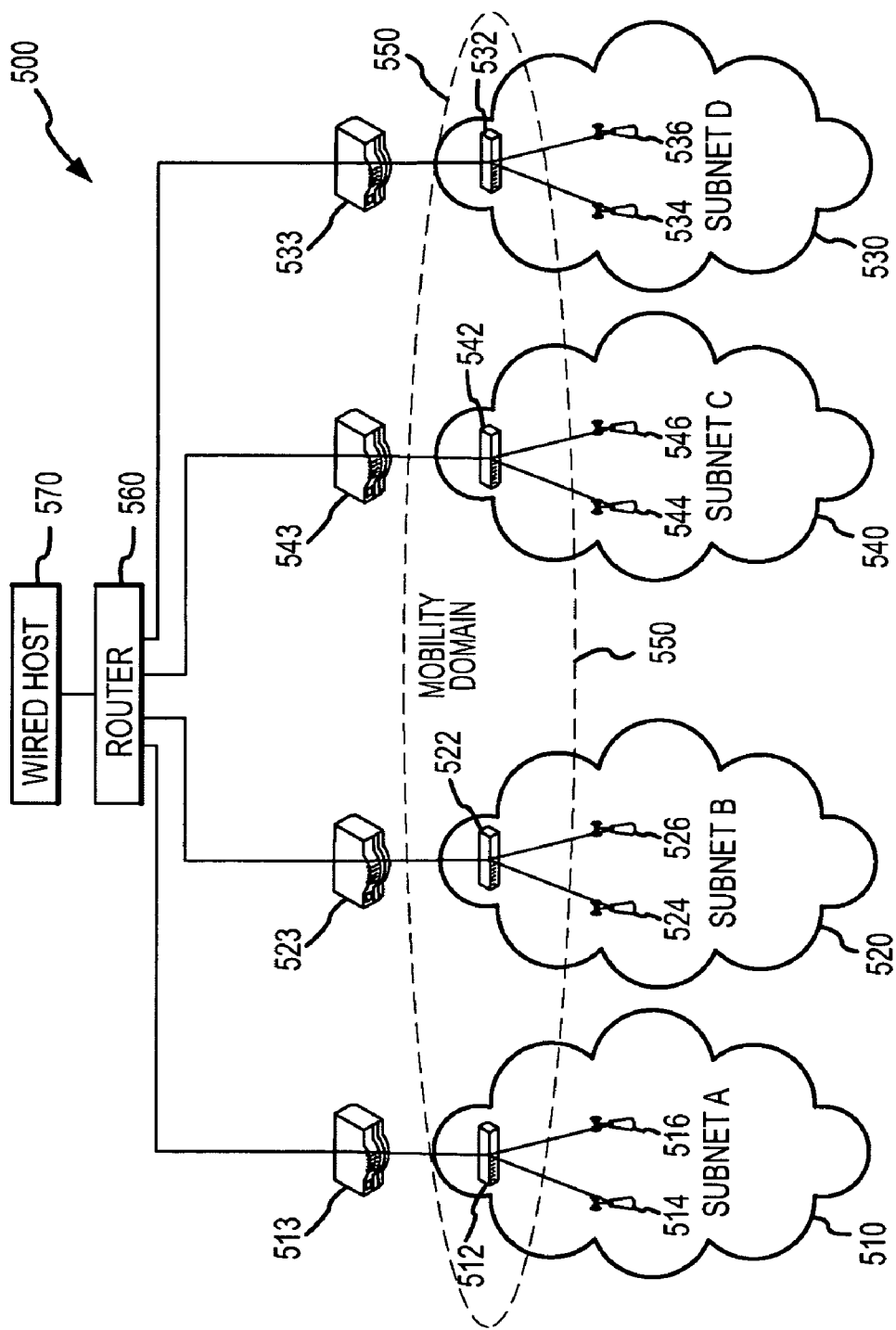
FIG. 5 is a simplified block diagram of a WLAN implementing a Discover Agent (DA) wireless switch that can be used to implement a peer auto discovery technique when IP multicast capability is not available according to one exemplary implementation.

FIG. 5 is a simplified block diagram of a WLAN 500 implementing a Discover Agent (DA) wireless switch 532 that can be used to implement a peer auto discovery technique when IP multicast capability is not available according to one exemplary implementation. The basic network architecture has been described in detail above and for sake of brevity will not be repeated. It will be appreciated that while four wireless switches including one DA are shown in this example, the same concepts could be applied in a WLAN 500 including any number of wireless switches and any number of DAs, including redundant DAs (e.g., at least one backup DA) within the mobility domain 550. Typically, a smaller number of DAs serve a larger number of wireless switches.

In this exemplary implementation, the WLAN 500 comprises four wireless switches 512-532 that are shown as being part of a mobility domain 550, where wireless switch 532 has been designated as a primary DA that is used to allow each of the wireless switches 512-542 in the mobility domain 550 to discover one another. Every wireless switch in the WLAN 500 is configured with the IP address of the primary DA 532. The primary DA 532 maintains a database of all the mobility peers and their associated configuration parameters. The primary DA 532 dynamically builds this database as wireless switches 512-542 register and de-register with the primary DA 532. The use of the primary DA 532 in a peer auto discovery technique will now be described with reference to FIG. 6.

Figure 6:
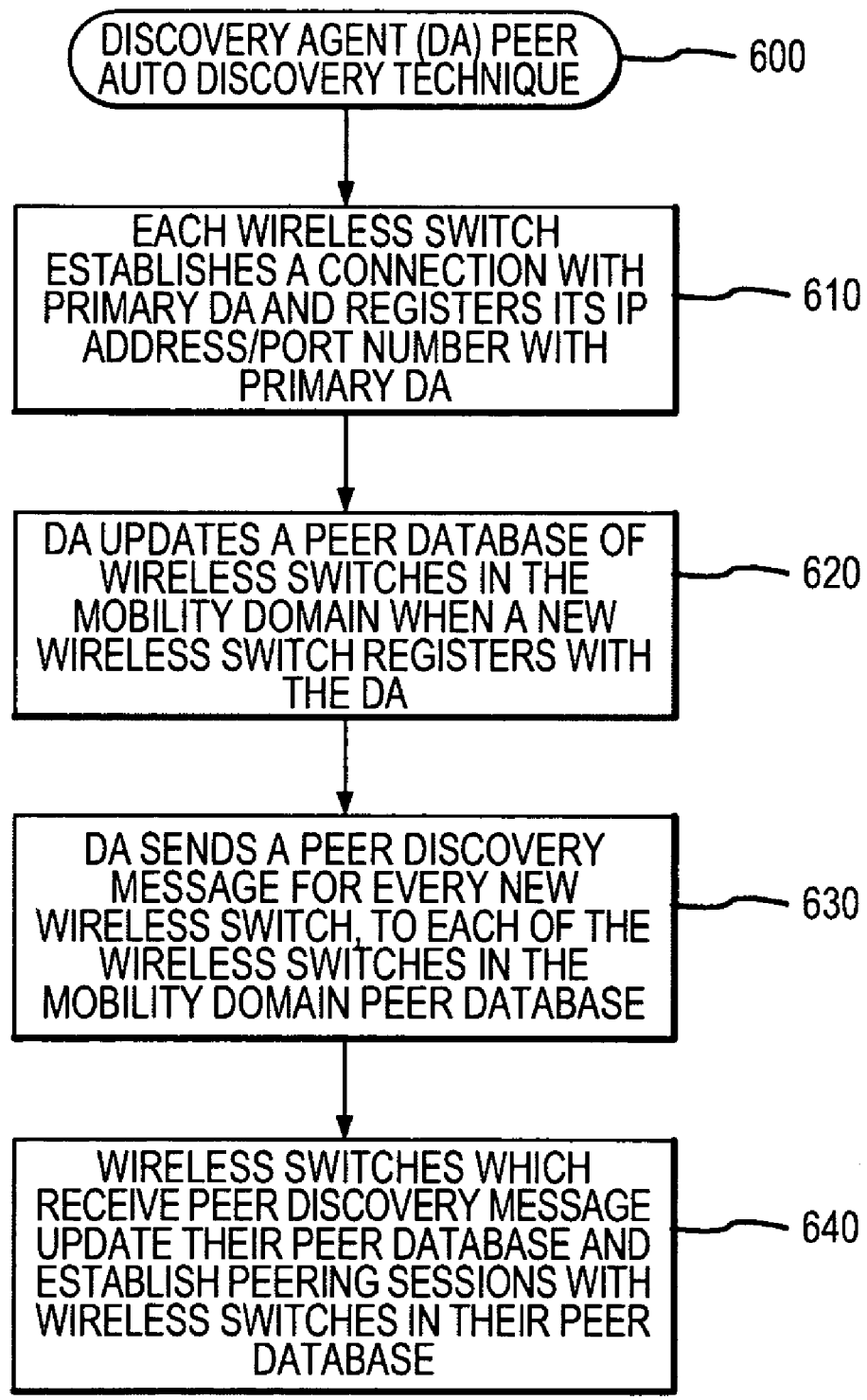
FIG. 6 is a flow chart showing a peer auto discovery technique using a Discovery Agent (DA) to discover peer wireless switches within a mobility domain according to one exemplary implementation.

FIG. 6 is a flow chart showing a peer auto discovery technique 600 using a Discovery Agent (DA) to discover peer wireless switches within a mobility domain according to one exemplary implementation.

After the wireless switch 512 powers up, at step 610, the wireless switch 512 establishes a connection with the primary DA 532 and transmits a registration message to the primary DA 532 to register its IP address/port number with the primary DA 532. The registration message also comprises a mobility-domain identifier of the wireless switch 512 which can be used by the primary DA 532 to determine whether wireless switch 512 is a member of the configured mobility-domain 550. Each of the other wireless switches 522-542 will also implement step 610. Although not shown in FIG. 6, it will be appreciated that if the primary DA 532 is unavailable for some reason, and if a backup DA 532 exists, the wireless switch 512 will try and connect to the backup DA.

At step 620, the DA 532 updates a peer database of wireless switches in the mobility domain 550 using the information provided in the registration messages it has received from the wireless switches 512-542 whenever a new wireless switch registers with the DA 532.

At step 630, the DA 532 sends a peer discovery message including registration information for each of the new wireless switches to each of the wireless switches in its mobility domain peer database (e.g., wireless switches 512-542 and any other wireless switches in the mobility domain 550 that have registered with the DA 532). This registration information includes IP addresses/port numbers for each of the wireless switches 512-532 (as well as any other wireless switches in the mobility domain 550 that registered with the DA 532).

After the wireless switches 512-542 (and any other wireless switches in the mobility domain 550) receive the peer discovery message from the DA 532, then at step 640 those wireless switches message update their peer database and establish peering sessions with wireless switches in their respective peer databases. For instance, in one implementation, the wireless switches establish TCP connections over a well known TCP port and exchange "Config" messages that would include the Mobility Domain Identifier (MDI), Mobility Area ID (MAID), whether the switch has been configured as a designated wireless switch (DS), and provisioned WLAN-to-VLAN mappings. For example, in FIG. 5, after the wireless switch 512 receives the peer discovery message from the DA 532, the wireless switch 512 updates its peer database and then establishes mobility peering sessions with all the other wireless switches in the peer database. Each of the other wireless switches 522-542 will also perform the same process.

Exemplary Wireless Switch

Figure 7:
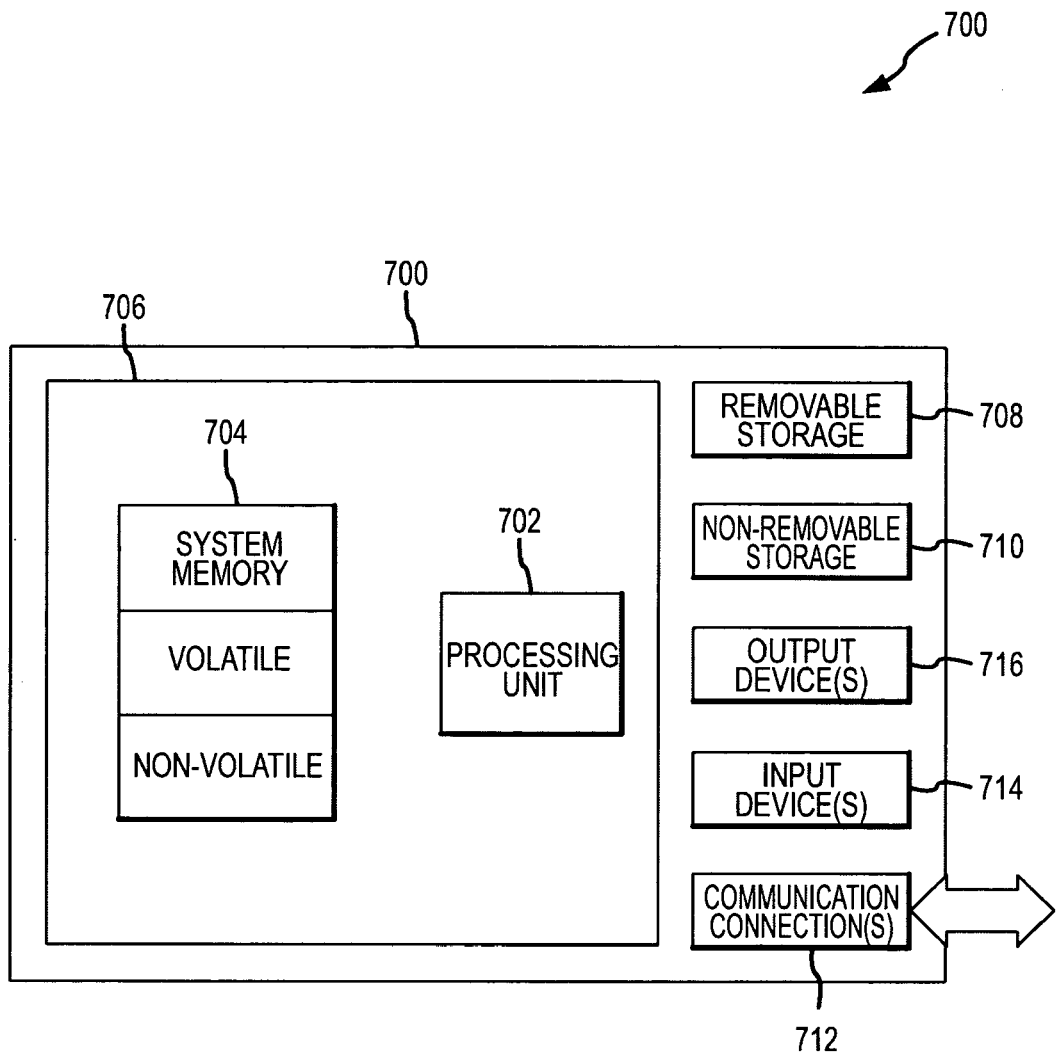
FIG. 7 is a simplified block diagram of an exemplary wireless switch.

FIG. 7 is a simplified block diagram of an exemplary wireless switch 700. Wireless switch 700 is only one example of a suitable wireless switch and is not intended to suggest any limitation as to the scope of use or functionality of the invention. Other well known configurations that may be suitable for use with the invention include, but are not limited to, personal computers, server computers, multiprocessor systems, microprocessor-based systems, programmable consumer electronics, network PCs, minicomputers, mainframe computers, distributed computing environments that include any of the above systems or devices, and the like.

Wireless switch 700 and certain aspects of embodiments of the invention may be described in the general context of computer-executable instructions, such as program modules, executed by one or more computers or other devices. Generally, program modules include routines, programs, objects, components, data structures, and/or other elements that perform particular tasks or implement particular abstract data types. Typically, the functionality of the program modules may be combined or distributed as desired in various embodiments.

Wireless switch 700 typically includes at least some form of computer readable media. Computer readable media can be any available media that can be accessed by wireless switch 700 and/or by applications executed by wireless switch 700. By way of example, and not limitation, computer readable media may comprise computer storage media and communication media. Computer storage media includes volatile, nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by wireless switch 700. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Referring again to FIG. 7, in its most basic configuration, wireless switch 700 typically includes at least one processing unit 702 and a suitable amount of memory 704. Depending on the exact configuration and type of computing system 700, memory 704 may be volatile (such as RAM), non-volatile (such as ROM, flash memory, etc.) or some combination of the two. This most basic configuration is identified in FIG. 7 by reference number 706. Additionally, wireless switch 700 may also have additional features/functionality. For example, wireless switch 700 may also include additional storage (removable and/or non-removable) including, but not limited to, magnetic or optical disks or tape. Such additional storage is illustrated in FIG. 7 by removable storage 708 and non-removable storage 710. Memory 704, removable storage 708, and non-removable storage 710 are all examples of computer storage media as defined above.

Wireless switch 700 may also contain communications connection(s) 712 that allow the system to communicate with other devices. Communications connection(s) 712 may be associated with the handling of communication media as defined above.

Wireless switch 700 may also include or communicate with input device(s) 714 such as a keyboard, mouse or other pointing device, pen, voice input device, touch input device, etc. In the example embodiment described below, input device(s) includes a standard pointing device (e.g., a mouse, a trackball device, a joystick device, a touchpad device, or any type of pointing device) that generates standard pointing device messages for processing by wireless switch 700. Wireless switch 700 may also include or communicate with output device(s) 716. All of these devices are well know in the art and need not be discussed at length here.

Wireless Client Database

Figure 8:
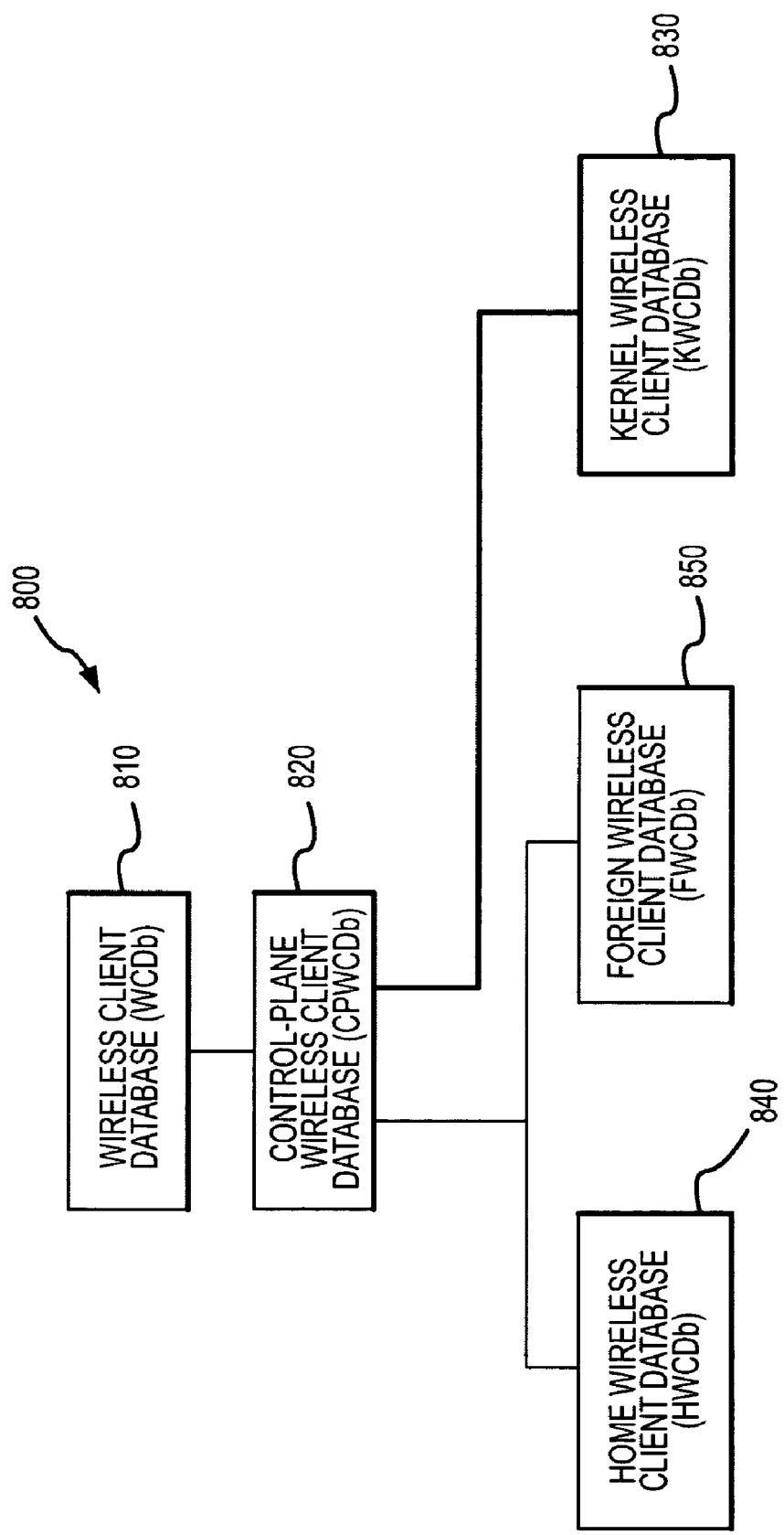
FIG. 8 is a structural diagram showing the relationship between various parts of a wireless client database (WCDb) maintained by each wireless switch in a mobility domain.

FIG. 8 is a structural diagram showing the relationship between various parts of a wireless client database (WCDb) 810 maintained by each wireless switch in a mobility domain.

Each wireless switch maintains a wireless client database (WCDb) 810 which comprises a control-plane wireless client database (CPWCDb) 820. The WCDb 810 can be maintained in any form of computer-readable media in the wireless switch.

Every wireless switch in a particular mobility domain needs to be aware of all the wireless client devices and their L3-mobility related parameters to distinguish between new wireless client devices entering the network and existing wireless client devices roaming within the mobility domain. The CPWCDb 820 comprises a complete set of all the wireless client devices currently associated with wireless switches in a particular mobility domain, and L3-mobility related parameters associated with each of those wireless client devices. For a particular wireless client device, the L3-mobility related parameters comprise MAC address of the particular wireless client device, an IP-address of the particular wireless client device, an IP address of the home wireless switch (HS) for the particular wireless client device, an IP address of the current wireless switch (CS) for the particular wireless client device, and a VLAN identifier of the home wireless switch (HS) for the particular wireless client device.

This CPWCDb 820 within a particular wireless switch comprises: a kernel wireless client database (KWCDb) 830, a home wireless client database (HWCDb) 840 and a foreign wireless client database (FWCDb) 850.

The kernel wireless client database (KWCDb) 830 is provided in the data-plane. The KWCDb 830 is a subset of the CPWCDb 820 that gets downloaded to a data-forwarder for packet forwarding purposes. The data forwarder may comprise modules (either software or hardware) present in the switch that are responsible for inspecting incoming data packets, performing lookups based on the destination MAC/IP address and transmitting the packet out on the appropriate port.

The KWCDb 830 comprises wireless client devices for which a particular wireless switch is either the HS (HWCDb: includes the case where the wireless switch can be both HS and CS) or just the CS (a subset of the FWCDb). Forwarding plane lookups used to obtain the state of the wireless client device (as part of a Data plane state machine) is done on this wireless client database. The lookups are used to determine the CS and/or HS and the Home-switch VLAN of the wireless client to forward data packets appropriately.

The HWCDb 840 comprises the set of wireless client devices for which the particular wireless switch is the home wireless switch. As soon as a peering session is established between two wireless switches, the wireless switches can synchronize their WCDbs by sending their HWCDbs 840 to one another. The protocol does not require periodic refresh of the entire WCDb and subsequently only incremental updates are sent when the WCDb changes. By contrast, the FWCDb 850 comprises a set of wireless client devices for which this particular wireless switch is not the home wireless switch. These wireless client devices are learned from other peers in the mobility domain via mobility update messages.

Wireless Client Device Roaming

When a wireless client device roams in a WLAN, the wireless client device and wireless switches can utilize certain mobility messages which allow wireless switches in the WLAN to determine mobility of the wireless client device. These wireless client device mobility messages comprise a join message (referred to hereafter as "JOIN"), a leave message (referred to hereafter as "LEAVE"), a layer 3 (L3) roam message (referred to hereafter as "L3-ROAM"), and a layer 2 (L2) roam message (referred to hereafter as "L3-ROAM"). These wireless client device mobility messages will now be described since they will be referred to throughout the remainder of this description.

A JOIN message originates from the current wireless switch of a particular wireless client device to advertise the presence of that particular wireless client device when the particular wireless client device enters the WLAN for the first time. For example, when a wireless client device that is currently not present in the wireless client database (WCDb) associates with a particular wireless switch, the particular wireless switch sends a JOIN message to the home wireless switch of the wireless client device. The home wireless switch (HS) for the particular wireless client device then forwards the JOIN message to all its peer wireless switches, except the one from which it received the original message. The JOIN message comprises a MAC address of the particular wireless client device, an IP address of the home wireless switch (HS) for the particular wireless client device, an IP address of the current wireless switch (CS) for the particular wireless client device, and a VLAN identifier of the home wireless switch (HS) for the particular wireless client device.

A current wireless switch sends a LEAVE message when the wireless switch determines that a particular wireless client device, that was originally present in the wireless client database (WCDb) of the wireless switch, is no longer present in the mobility domain of the wireless switch. The current wireless switch sends the LEAVE message (which includes the particular wireless client device's MAC address information) to the home wireless switch of the particular wireless client device. The home wireless switch of the particular wireless client device eventually forwards the LEAVE message to all of its peer wireless switches in its mobility domain. The criterion to determine that the particular wireless client device has actually left the mobility domain of the current wireless switch is implementation specific.

When a particular wireless client device roams to a new current wireless switch that is on a different L3 network (e.g., the particular wireless client device is mapped to a different VLAN ID), the new current wireless switch sends a L3-ROAM message to the client device's home switch. The L3-ROAM message comprises an IP address of the new current wireless switch. The home wireless switch of the particular wireless client device then forwards this L3-ROAM message to all other peer wireless switches in its mobility domain.

When a particular wireless client device roams to a new current wireless switch that is on the same L3 subnet as an old current wireless switch of the particular wireless client device (e.g., the SSID to which the client device is associated on the new current wireless switch is mapped to the same VLAN ID), the new current wireless switch sends a L2-ROAM message to the client device's home switch. The L2-ROAM message sent to the old home wireless switch comprises an IP address of the new home wireless switch and an IP address of the current wireless switch. The old home wireless switch of the particular wireless client device then forwards this L2-ROAM message to all other peer wireless switches in its mobility domain.

L3 Roam Operation

Figure 9:
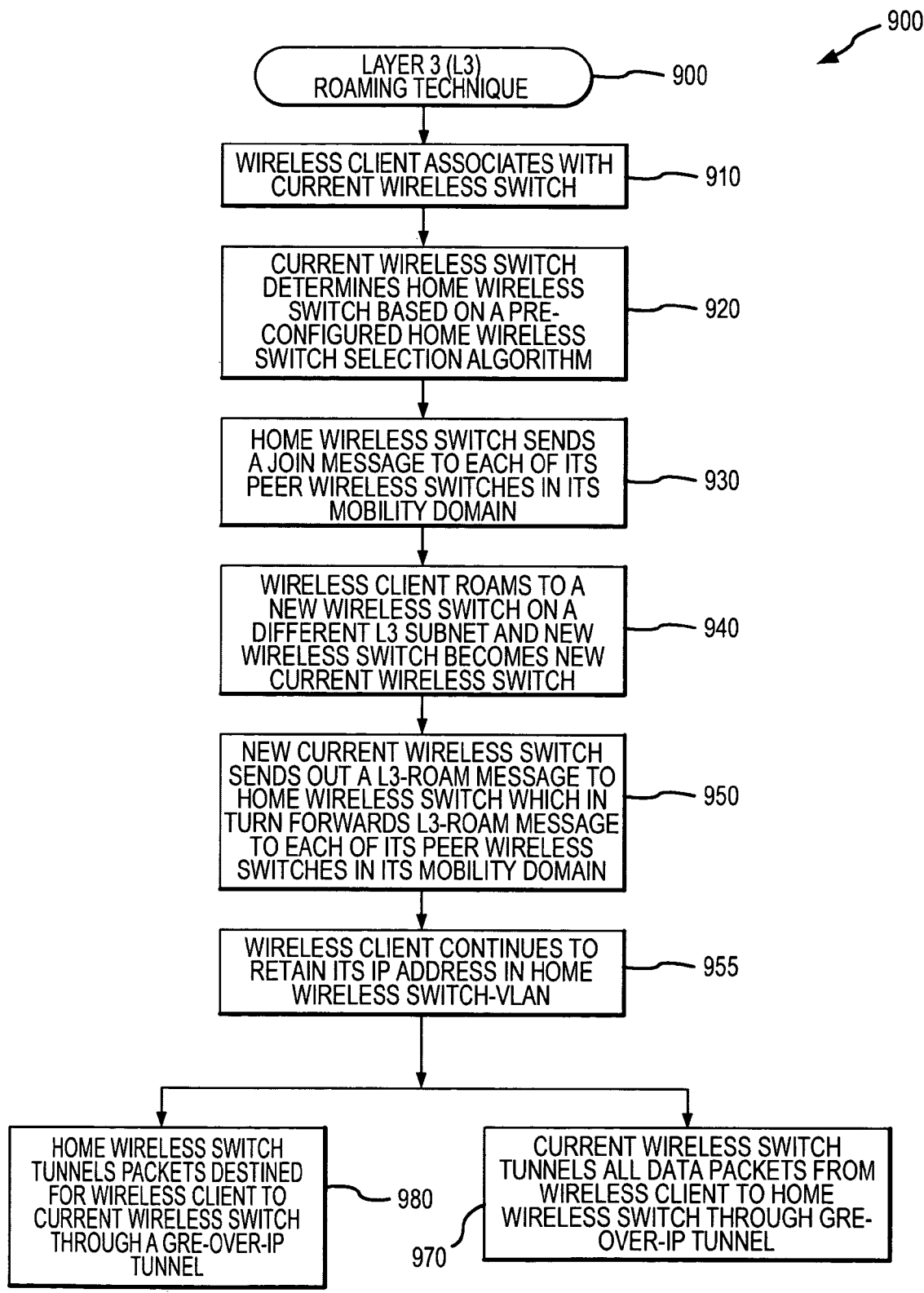
FIG. 9 is a flow chart showing a layer 3 (L3) roaming technique for use when a wireless client device roams within a mobility domain according to one exemplary implementation.

FIG. 9 is a flow chart showing a layer 3 (L3) roaming technique 900 for use when a wireless client device roams within a mobility domain according to one exemplary implementation.

At step 910, the wireless client device associates with a particular wireless switch in the mobility domain. This particular wireless switch then becomes the current wireless switch or "current switch" (CS) for the wireless client device.

At step 920, the current wireless switch then determines the wireless client device's home wireless switch based on a pre-configured home wireless switch selection algorithm. The home wireless switch selection algorithm varies depending upon the implementation. In one implementation, the home wireless switch selection algorithm can simply be that the current wireless switch itself becomes the home wireless switch for the wireless client device. In one implementation, the home wireless switch selection algorithm can be based on a load-balancing scheme like a Round Robin selection algorithm, a Weighted Round Robin selection algorithm, a Random selection algorithm, etc.

At step 930, the home wireless switch sends a JOIN message with wireless client device's MAC-address, IP-address and home wireless switch-VLAN information to each of its peer wireless switches in its mobility domain.

At step 940, when the wireless client device roams to a wireless switch on a different L3 subnet, this new wireless switch becomes the new current wireless switch for the wireless client device.

At step 950, the new current wireless switch sends out a L3-ROAM message to the home wireless switch. The home wireless switch then forwards or relays the L3-ROAM message to each of its peer wireless switches in its mobility domain.

As step 955, the wireless client device continues to retain its IP address in Home Wireless Switch-VLAN.

At step 970, the new current wireless switch tunnels all data packets (including DHCP and ARP) transmitted by the wireless client device through a GRE-over-IP tunnel to the home wireless switch of the wireless client device.

At step 980, the home wireless switch tunnels data packets destined for the wireless client device to the current wireless switch through a GRE-over-IP tunnel between the home wireless switch and the current wireless switch.

Aggressive Roaming and Conflict Resolution

In some scenarios wireless switches in the network may have an inconsistent view of the wireless client device state. For example, such scenarios can arise when wireless client devices roam aggressively between wireless switches. This can cause control messages to arrive out-of-order. A wireless switch can detect conflicting or inconsistent view of the wireless client device state. For example, a wireless switch can detect a conflict when a control-plane state-machine identifies certain control messages as incorrect given the state of the wireless client device. Alternatively, a wireless switch can detect a conflict when the same control message (JOIN, LEAVE, L2 ROAM or L3ROAM) for a wireless client device are received from different peer wireless switches within a pre-configured interval of time.

When a wireless switch detects such conflicts, these conflicts can be resolved by forcing the wireless client device to actually dissociate from its current wireless switch, exit from the mobility domain and re-associate back with a current wireless switch (without continuing to roam aggressively).

Figure 10A:
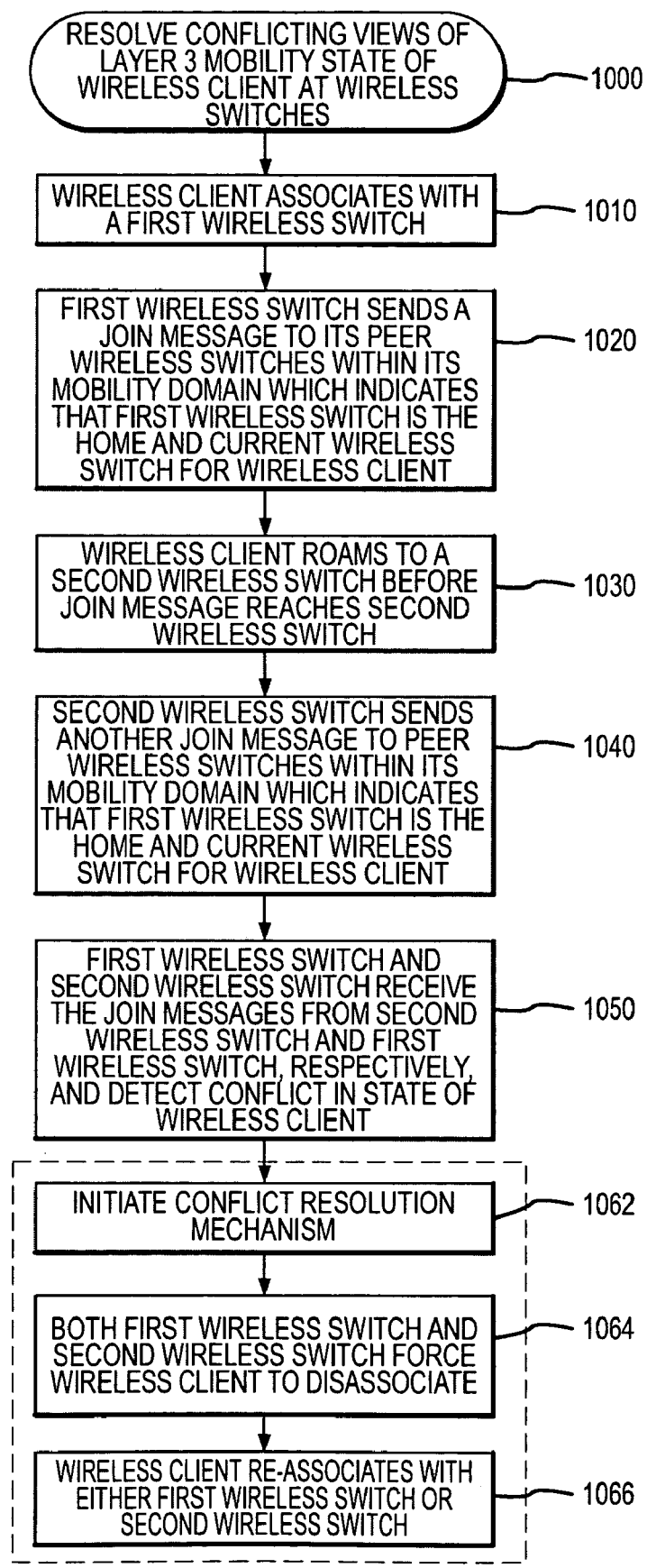
FIG. 10A is a flow chart showing a technique for resolving conflicting or inconsistent views of the wireless client device state amongst wireless switches in a mobility domain according to one exemplary implementation.

FIG. 10A is a flow chart showing a technique 1000 for resolving conflicting or inconsistent views of a layer 3 (L3) mobility state of a wireless client device at or "amongst" wireless switches according to one exemplary implementation. For purposes of illustrating how this technique 1000 could apply to one exemplary non-limiting network configuration, the description of FIG. 10A will be provided with reference to the simplified WLAN shown in FIG. 1. It will be appreciated, however, that this technique 1000 could be applied in other types of networks having different configurations.

At step 1010, a wireless client device 2 associates with a first wireless switch 12.

At step 1020, assuming first wireless switch 12 chooses itself as the home wireless switch for wireless client device 2, then the first wireless switch 12 sends a JOIN message to peer wireless switches within its mobility domain to inform those wireless switches about its status as being both the home and the current wireless switch of the wireless client device 2. The JOIN message indicates that the first wireless switch 12 is the both the home and the current wireless switch of the wireless client device 2.

At step 1030, the wireless client device 2 roams to a second wireless switch 22 before the JOIN message from first wireless switch 12 reaches second wireless switch 22.

At step 1040, assuming second wireless switch 22 chooses itself as the home wireless switch for wireless client device 2, then the second wireless switch 22 sends another JOIN message to peer wireless switches within its mobility domain including the first wireless switch 12. As above, the JOIN message indicates that the second wireless switch 22 is the both the home and the current wireless switch of the wireless client device 2. At this point, both the first wireless switch 12 and the second wireless switch 22 think that they are the current wireless switch for the wireless client device 2.

At step 1050, the first wireless switch 12 and the second wireless switch 22 receive the JOIN messages from the second wireless switch 22 and the first wireless switch 12, respectively.

At step 1062, a conflict resolution mechanism is initiated by at least one of the first wireless switch 12 and the second wireless switch 22. At step 1064, the conflict resolution mechanism causes or forces the wireless client device 2 to dissociate from both the first wireless switch 12 and the second wireless switch 22. For example, both the first wireless switch 12 and the second wireless switch 22 can send an IEEE 802.11 de-authentication message to cause the wireless client device 2 to dissociate from both the first wireless switch 12 and the second wireless switch 22. At step 1066, the wireless client device 2 re-associates back with one of first wireless switch 12 and the second wireless switch 22.

Figure 10B:
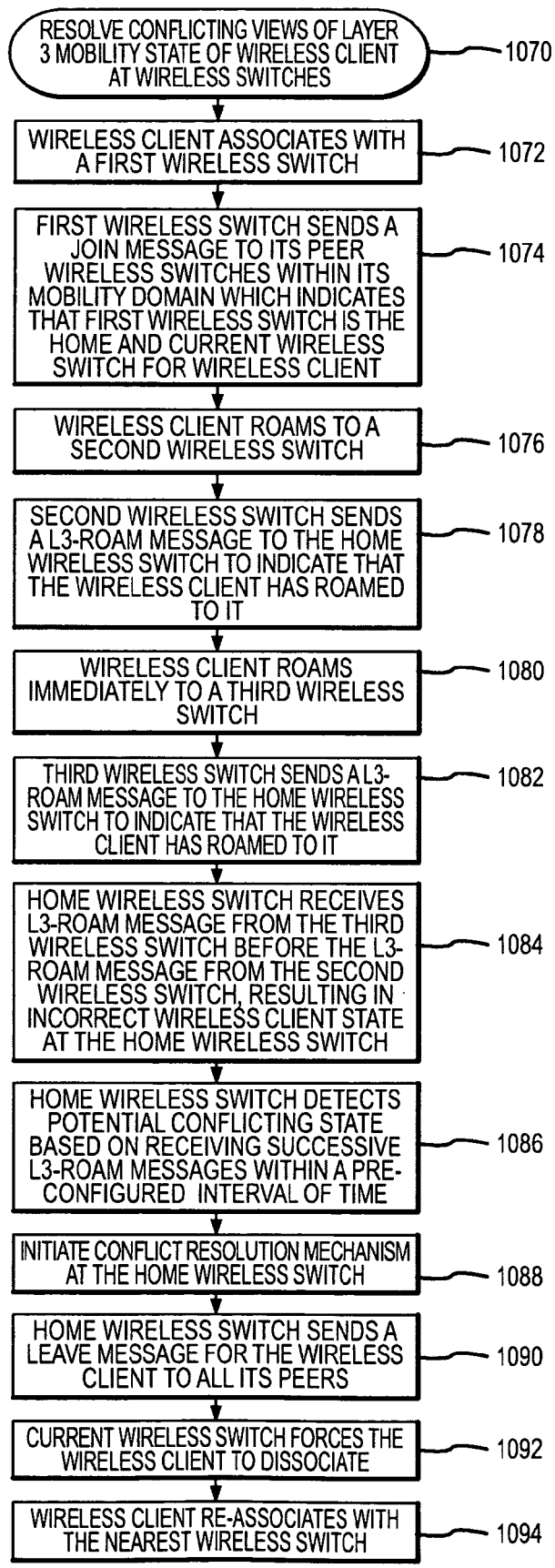
FIG. 10B is a flow chart showing a technique for resolving conflicting or inconsistent views of the wireless client device state amongst wireless switches in a mobility domain according to one exemplary implementation.

FIG. 10B is a flow chart showing a technique 1070 for resolving conflicting or inconsistent views of the wireless client device state amongst wireless switches in a mobility domain according to one exemplary implementation.

At step 1072, a wireless client device associates with a first wireless switch. At step 1074, assuming first wireless switch chooses itself as the home wireless switch for wireless client device, then the first wireless switch sends a JOIN message to peer wireless switches within its mobility domain to inform those wireless switches about its status as being both the home and the current wireless switch of the wireless client device. The JOIN message indicates that the first wireless switch is the both the home and the current wireless switch of the wireless client device. At step 1076, the wireless client device roams to a second wireless switch. At step 1078, the second wireless switch sends a L3-ROAM message to the home wireless switch to indicate that the wireless client device has roamed to the second wireless switch.

At step 1080, the wireless client roams immediately to a third wireless switch, and at step 1082, the third wireless switch sends a L3-ROAM message to the home wireless switch to indicate that the wireless client device has roamed to it. At step 1084, the home wireless switch receives L3-ROAM message from the third wireless switch before the L3-ROAM message from the second wireless switch, resulting in incorrect wireless client state at the home wireless switch.

At step 1086, the home wireless switch detects potential conflicting state based on receiving successive L3-ROAM messages within a pre-configured interval of time. At step 1088, a conflict resolution mechanism can be initiated at the home wireless switch. At step 1090, the home wireless switch sends a LEAVE message for the wireless client to all its peers wireless switches in the mobility domain.

At step 1092, the conflict resolution mechanism causes or forces the wireless client device to dissociate from both the first wireless switch and the second wireless switch. For example, both the first wireless switch and the second wireless switch can send an IEEE 802.11 de-authentication message to cause the wireless client device to dissociate from both the first wireless switch and the second wireless switch. At step 1094, the wireless client device re-associates back with the nearest wireless switch.

Figure 11:
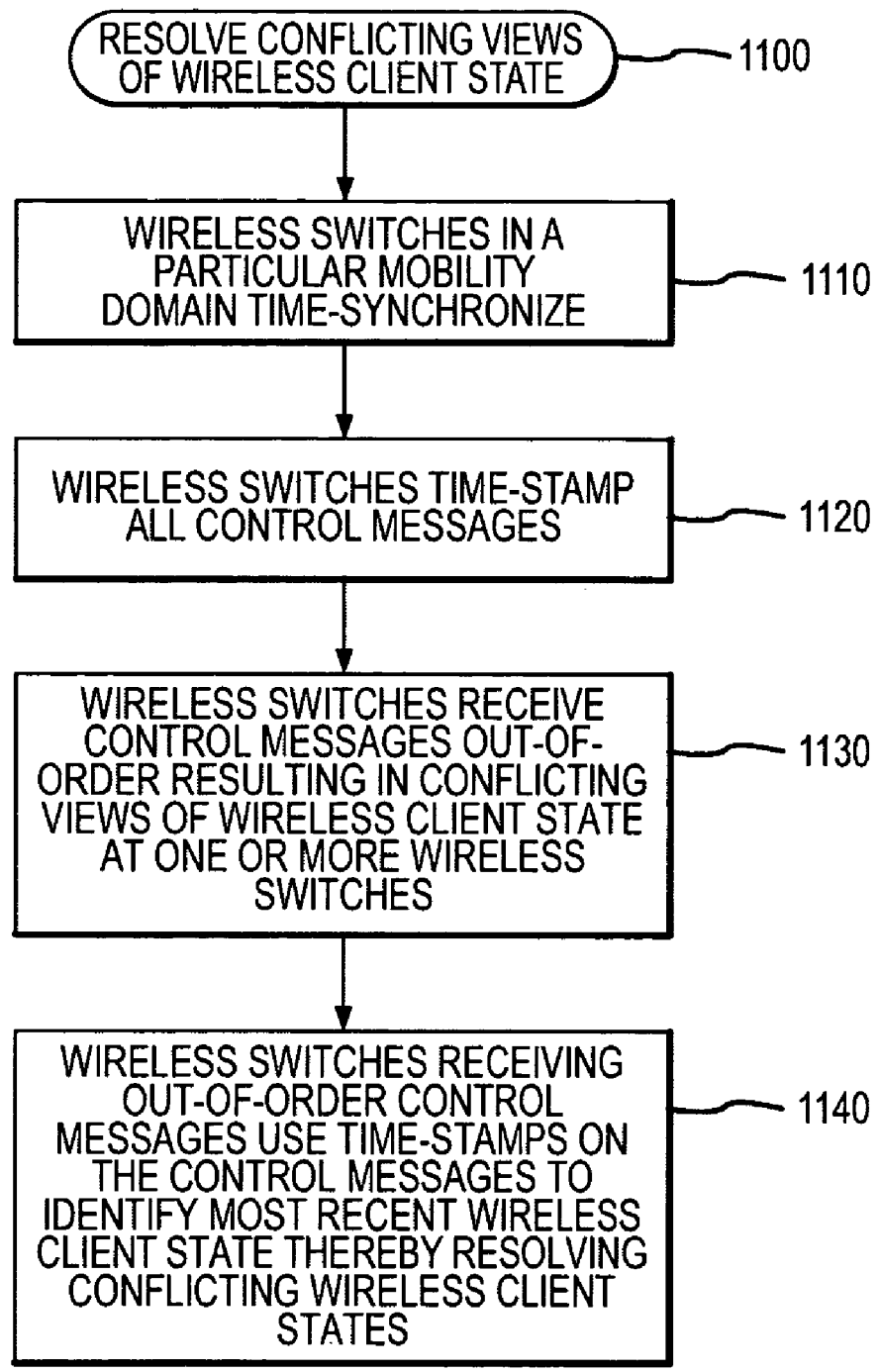
FIG. 11 is a flow chart showing a technique for resolving conflicting or inconsistent views of the wireless client device state according to one exemplary implementation.

FIG. 11 is a flow chart showing a technique 1100 for resolving conflicting or inconsistent views of the wireless client device state amongst wireless switches in a mobility domain according to one exemplary implementation.

At step 1110, all of the wireless switches in a particular mobility domain time-synchronize using, for example, the Network Time Protocol (NTP) or the Simple Network Time Protocol (SNTP). NTP is a protocol for synchronizing the clocks of computer systems over packet-switched, variable-latency data networks. NTP uses UDP port 123 as its transport layer. It is designed particularly to resist the effects of variable latency. The operational details of NTP are illustrated in RFC 778, RFC 891, RFC 956, RFC 958, and RFC 1305. The current version is NTP version 4; however, as of 2005, only NTP up to version 3 has been documented in RFCs. The IETF NTP Working Group has formed to standardize the work of the NTP community since RFC 1305 et al. A less complex form of NTP that does not require storing information about previous communications is known as the Simple Network Time Protocol (SNTP). SNTP is used in some embedded devices and in applications where high accuracy timing is not required. See RFC 1361, RFC 1769, RFC 2030 and RFC 4330.

At step 1120, the wireless switches time-stamp all control messages before sending the control messages to other peer wireless switches in the mobility domain.

At step 1130, one or more wireless switches receive control messages out-of-order. This results in conflicting views of wireless client device state at one or more wireless switches.

At step 1140, the wireless switches receiving out-of-order control messages can use the time-stamps in the control messages to identify the most recent wireless client device state thereby resolving conflicting wireless client states. Thus, even is control messages are received out-of-order, this wireless switch can correctly identify the most recent wireless client device state. The wireless switches can use the most recent wireless client device state (e.g., current wireless switch, home wireless switch, backup wireless switch, etc.).

L2 Roaming

Figure 12:
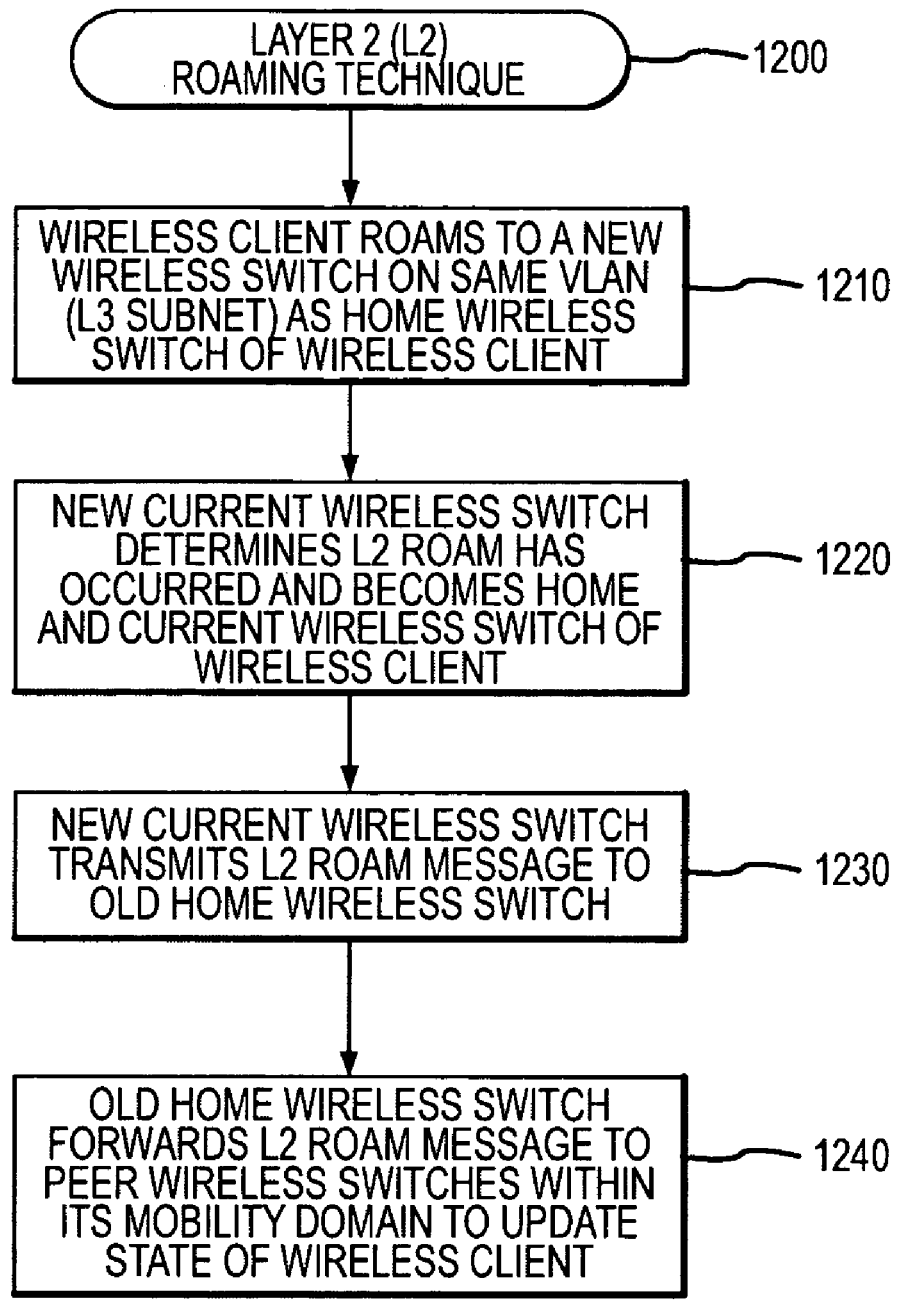
FIG. 12 is a flow chart showing a layer 2 (L2) roaming technique for use when a wireless client device roams within a mobility domain according to one exemplary implementation.

FIG. 12 is a flow chart showing a layer 2 (L2) roaming technique 1200 for use when a wireless client device roams within a mobility domain according to one exemplary implementation.

At step 1210, a wireless client roams to a new wireless switch on the same VLAN (L3 subnet) as the home wireless switch (home wireless switch VLAN) (e.g., wireless client device is mapped to the same VLAN ID).

At step 1220, the new current wireless switch determines that this is a L2 roam and "re-homes" the wireless client to itself. In other words, the new current wireless switch assumes the role of the home wireless switch as well as the current wireless switch for this wireless client.

At step 1230, the new current wireless switch sends a L2-ROAM message to the old home wireless switch. The L2-ROAM message indicates that the wireless client device has roamed within the same VLAN. The L2-ROAM message comprises an IP address of the home wireless switch and an IP address of the new current wireless switch.

At step 1240, the old home wireless switch forwards the L2-ROAM message to all its peer wireless switches within its mobility domain to update the wireless client's state at each of the peer wireless switches of the old home wireless switch.

At this point, the wireless client device is basically re-homed to the new current wireless switch, but gets to keep its IP address. This approach avoids the overhead of an extra hop across the GRE tunnel to the home wireless switch for data traffic. In an overlapping VLAN scenario, even if the new current wireless switch is on a different L3 subnet the same process can be used. In this case, the wireless client device uses the same VLAN ID, sends a new DHCP request and obtains a new IP address.

L3 Mobility Data-Forwarding

As noted above with respect to FIG. 3, as part of peer establishment between switches in the mobility domain, a full mesh of GRE tunnels is created between wireless switches in a particular mobility domain.

Data packet forwarding to and from a roamed wireless client device can be accomplished by tunneling the entire Layer 2 packet in a GRE tunnel between the current wireless switch and home wireless switch with a proprietary protocol code-point. The proprietary L3 mobility protocol code-point. A code-point is used to identify and demultiplex different types of packets received over a GRE tunnel. The GRE standard defines code-points for IPV4, IPV6, etc. The new code-point is used to identify all L3 mobility data packets tunneled over GRE.

Exemplary data forwarding scenarios will now be described below in FIGS. 14 through 18 with reference to the network topology described in FIG. 13. These exemplary data forwarding scenarios cover scenarios including Wired-to-Wireless port, Wireless-to-Wired port, as well as data forwarding between Roamed-Wireless switches.

Unicast Data Forwarding Scenarios

Figure 13:
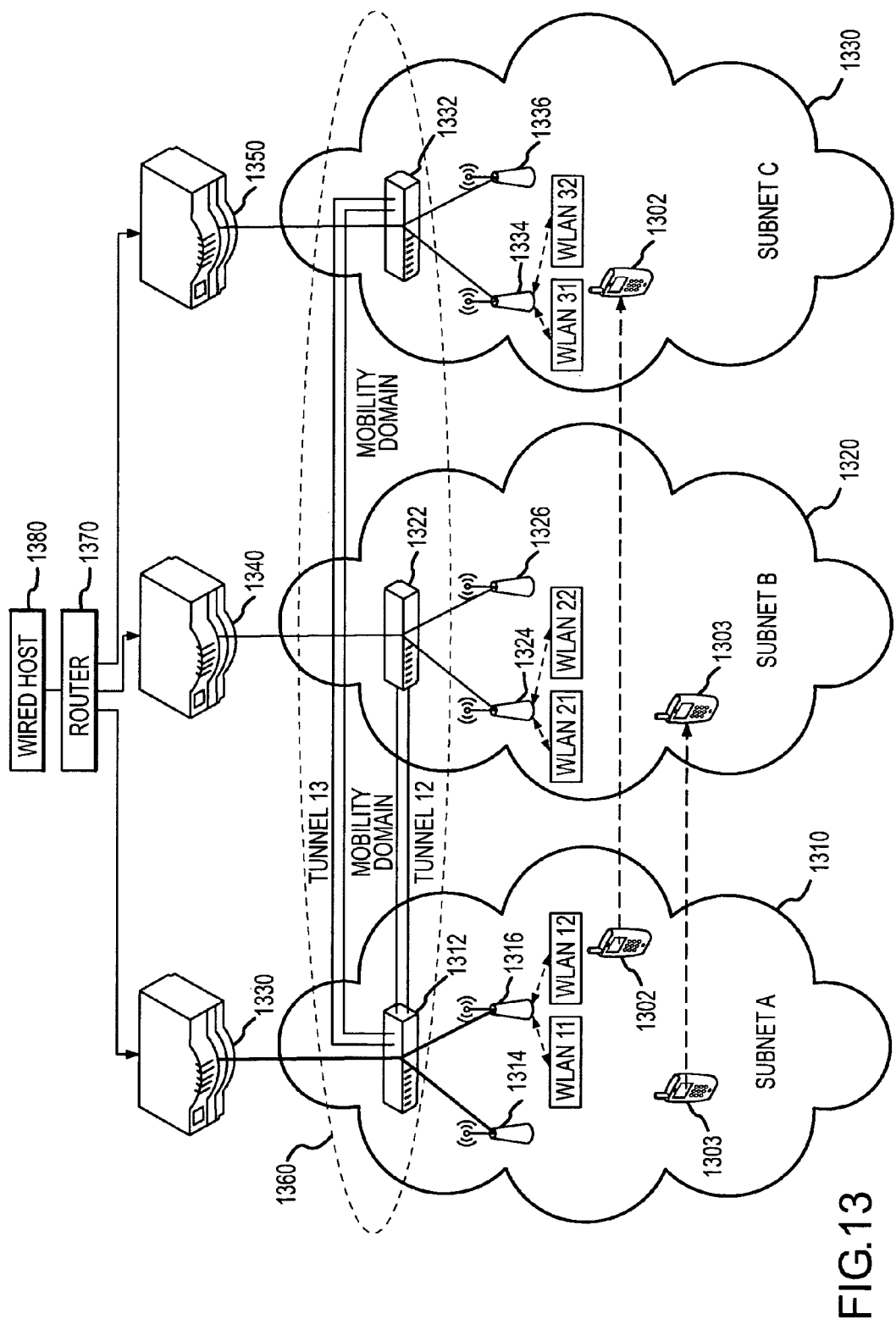
FIG. 13 is a simplified block diagram of a WLAN according to one exemplary implementation.

FIG. 13 is a simplified block diagram of a WLAN according to one exemplary implementation. The basic network architecture has been described in detail above and for sake of brevity will not be repeated. It will be appreciated that while two wireless switches are shown in this example, the same concepts could be applied in a WLAN including any number of wireless switches within the mobility domain 1350.

In the following description of FIGS. 14-16, wireless client device 1302 and wireless client device 1304 are initially homed with wireless switch 1312 (e.g., wireless switch 1312 is both the home wireless switch and the initial current wireless switch for wireless client devices 1302, 1304). Both wireless client device 1302 and wireless client device 1304 roam to a new current wireless switch 1322.

Figure 14:
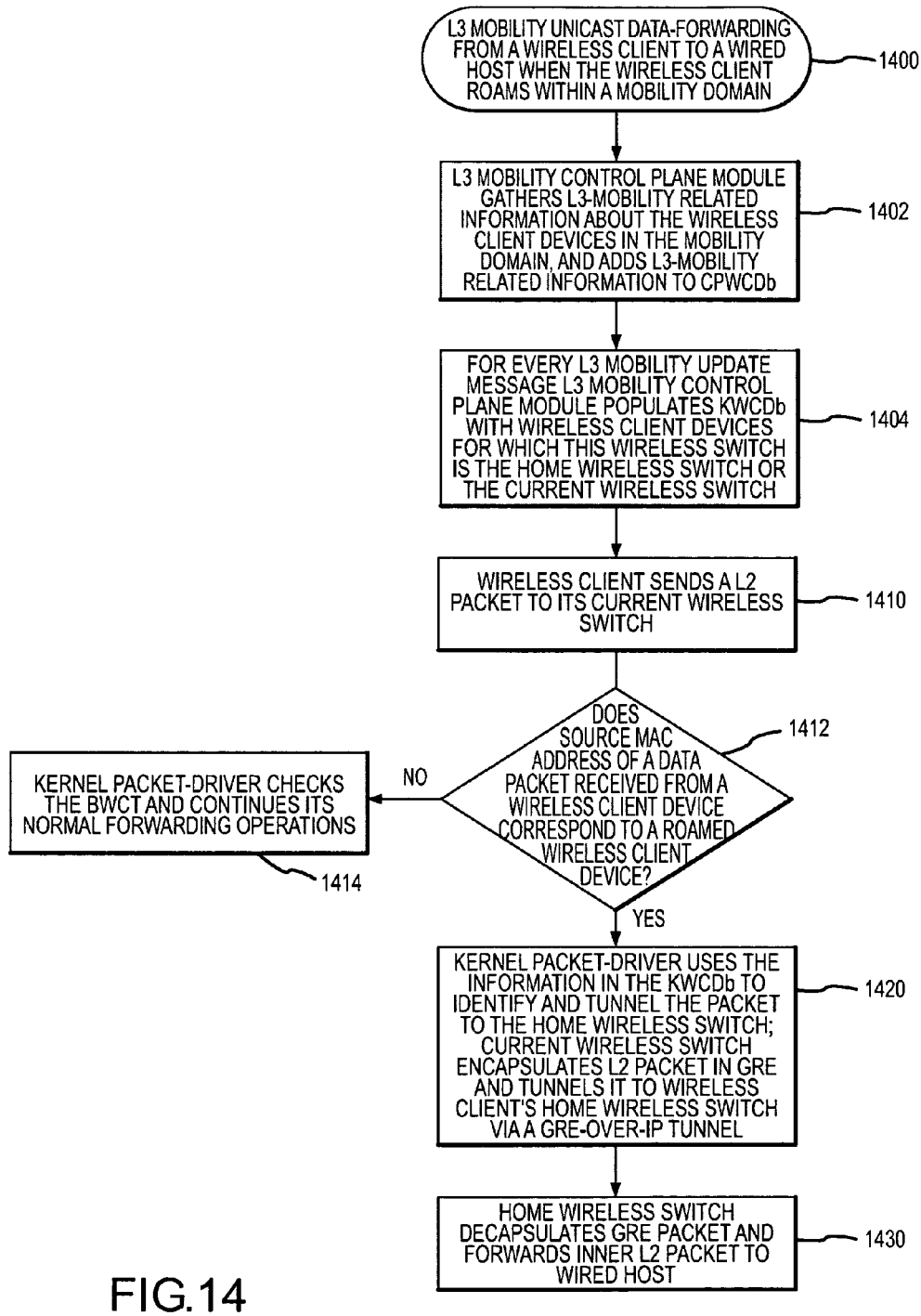
FIG. 14 is a flow chart showing a unicast data forwarding scenario for forwarding unicast data from a wireless client device to a wired host in the network when the wireless client device roams within a mobility domain according to one exemplary implementation.

FIG. 14 is a flow chart 1400 showing a L3 mobility data forwarding scenario for forwarding unicast data from a wireless client device 1304 to a wired host 1370 in the network when the wireless client device 1304 roams within a mobility domain according to one exemplary implementation. The data packet forwarding process 1400 helps ensure that a kernel wireless client database (KWCDb) has the most accurate and up-to-date information for data-forwarding purposes.

At step 1402, a L3 mobility control plane module gathers L3-mobility related information about the wireless client devices in the mobility domain via L3 mobility messages, and adds L3-mobility related information to the control plane wireless client database (CPWCDb).

At step 1404, for every L3 mobility update message, the L3 mobility control plane module populates the KWCDb with a subset of the wireless client devices in the CPWCDb for which this wireless switch is the home wireless switch or the current wireless switch. This process is done for every L3 mobility update message to ensure that the KWCDb has the most accurate and up-to-date information for data-forwarding purposes.

At step 1410, the wireless client device 1304 sends a L2 packet to its current wireless switch 1322.

When a kernel packet-driver receives a data packet from a wireless client device, at step 1412, the kernel packet-driver first checks the KWCDb to determine if the source MAC of the data packet received from the wireless client device corresponds to a roamed wireless client device. The kernel packet-driver serves to act as the Wireless Switch's software data-forwarder and is responsible for forwarding data packets based on lookups performed on the wireless switch's forwarding databases (e.g., BWCT, KWCDb, CS-Tunnel VMT, CS-WLAN VMT).

If the source MAC of the data packet received from the wireless client device does not corresponds to a roamed wireless client device, then at step 1414, the kernel packet-driver checks the BWCT and continues its normal forwarding operations.

At step 1420, if the source MAC of the data packet received from the wireless client device does corresponds to a roamed wireless client device (i.e., the wireless client device is present in the KWCDb), then the kernel packet-driver uses the information in the KWCDb to identify and tunnel the packet to the home wireless switch. The current wireless switch 1322 encapsulates the L2 packet in GRE and tunnels the GRE packet to the wireless client device's home wireless switch 1312 via a GRE-over-IP tunnel.

At step 1430, the home wireless switch 1312 decapsulates the GRE packet and forwards the inner L2 packet to the router 1360 via Layer 2 switch 1330 which then sends the inner L2 packet to the wired host 1370.

Figure 15:
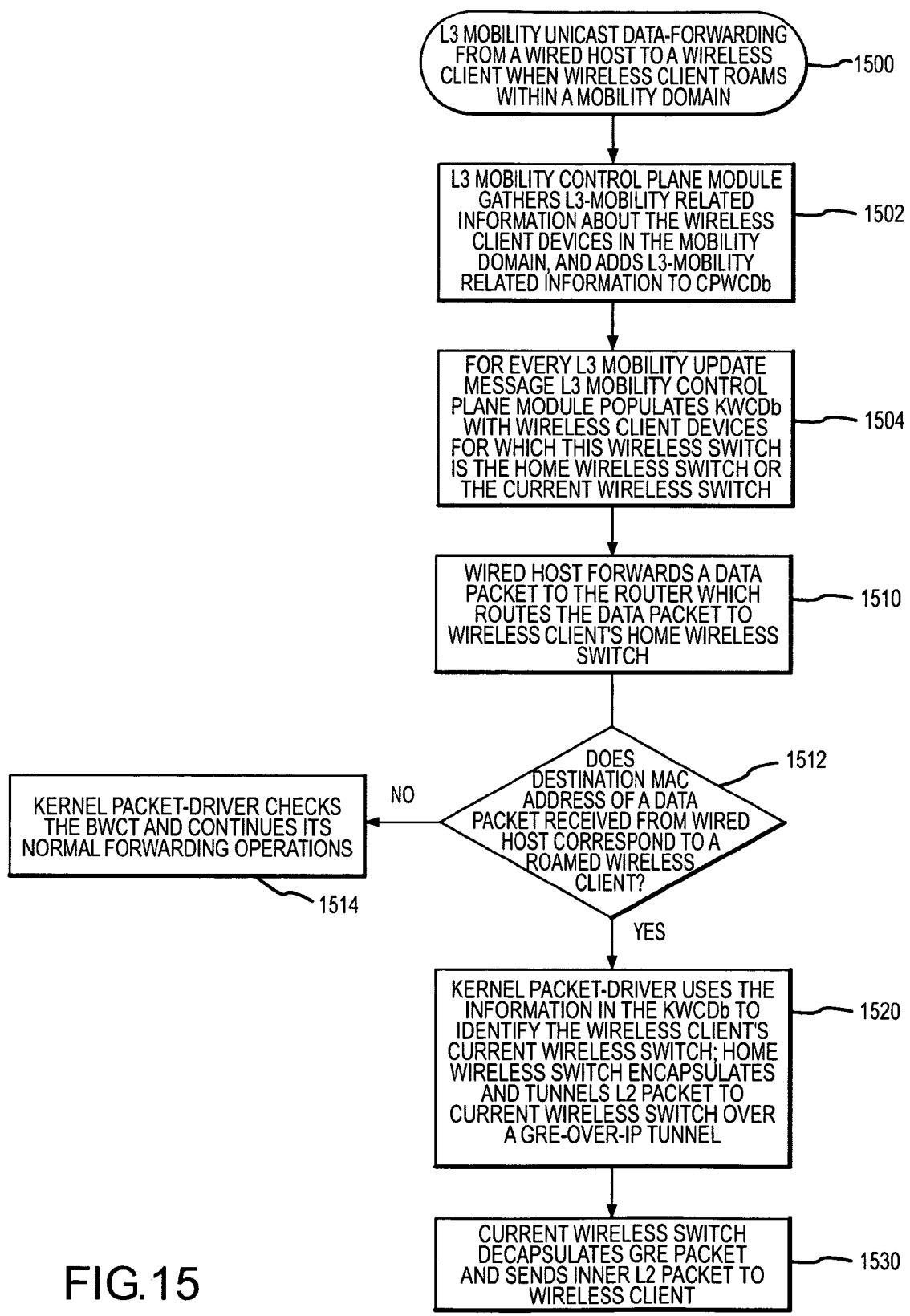
FIG. 15 is a flow chart showing a unicast data forwarding scenario for forwarding unicast data from a wired host to a wireless client device when the wireless client device roams within a mobility domain according to another exemplary implementation.

FIG. 15 is a flow chart 1500 showing a L3 mobility data forwarding scenario for forwarding unicast data from a wired host 1370 to a wireless client device 1304 when the wireless client device 1304 roams within a mobility domain according to another exemplary implementation.

At step 1502, a L3 mobility control plane module gathers L3-mobility related information about the wireless client devices in the mobility domain via L3 mobility messages, and adds L3-mobility related information to the control plane wireless client database (CPWCDb).

At step 1504, for every L3 mobility update message, the L3 mobility control plane module populates the KWCDb with a subset of the wireless client devices in the CPWCDb for which this wireless switch is the home wireless switch or the current wireless switch. This process is done for every L3 mobility update message to ensure that the KWCDb has the most accurate and up-to-date information for data-forwarding purposes.

At step 1510, the wired host 1370 forwards a data packet to the router 1360, which routes the data packet to wireless client device's home wireless switch 1312.

When the kernel packet-driver receives a data packet from a wired host, at step 1512, the kernel packet-driver checks the KWCDb to determine if the destination MAC address of the data packet received from the wired host corresponds to a roamed wireless client device.

If the destination MAC address of the data packet received from the wired host does not correspond to a roamed wireless client device (e.g., wireless client device is not found in the KWCDb), then at step 1514, kernel packet-driver checks the BWCT and continues its normal forwarding operations.

If the destination MAC address of the data packet received from the wired host corresponds to a roamed wireless client device (e.g., the wireless client device is present in the KWCDb), then at step 1520, the kernel packet-driver uses the information in the KWCDb to identify a current wireless switch of the wireless client device. The home wireless switch 1312 encapsulates the L2 packet and tunnels a GRE packet (comprising the L2 packet) to the current wireless switch 1322 via a GRE-over-IP tunnel.

At step 1530, the current wireless switch 1322 decapsulates the GRE packet and sends the original or inner L2 packet to wireless client device 1304.

Figure 16:
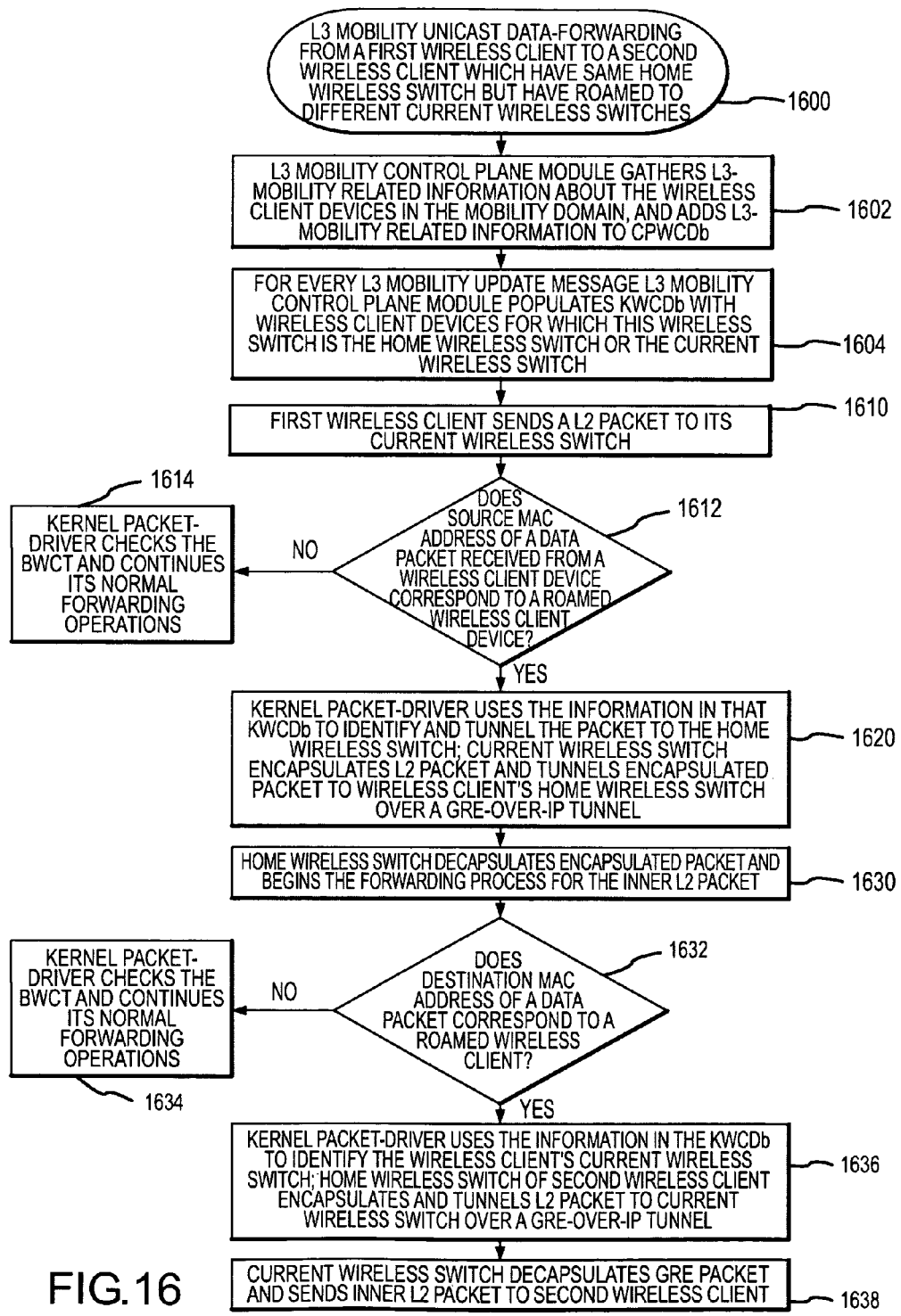
FIG. 16 is a flow chart showing a unicast data forwarding scenario for forwarding unicast data from a wireless client device to another wireless client device in the network when the when the wireless client devices roam within their mobility domain according to another exemplary implementation.

FIG. 16 is a flow chart 1600 showing a L3 data forwarding scenario for forwarding unicast data from a first wireless client device to a second wireless client device in the network when the wireless client devices roam within their mobility domain according to another exemplary implementation. In this exemplary scenario, the first wireless client device and the second wireless client device have the same home wireless switch, but roam to different current wireless switches.

At step 1602, a L3 mobility control plane module gathers L3-mobility related information about the wireless client devices in the mobility domain via L3 mobility messages, and adds L3-mobility related information to the control plane wireless client database (CPWCDb).

At step 1604, for every L3 mobility update message, the L3 mobility control plane module populates the KWCDb with a subset of the wireless client devices in the CPWCDb for which this wireless switch is the home wireless switch or the current wireless switch. This process is done for every L3 mobility update message to ensure that the KWCDb has the most accurate and up-to-date information for data-forwarding purposes.

At step 1610, the first wireless client device sends a L2 packet to its current wireless switch.

When the kernel packet-driver receives a data packet from the first wireless client device, the kernel packet-driver checks the KWCDb to determine if the source MAC address of the data packet corresponds to a roamed wireless client device.

If the source MAC address of the data packet does not correspond to a roamed wireless client device (e.g., the wireless client device is not found in the KWCDb), then at step 1614, kernel packet-driver checks the BWCT and continues its normal forwarding operations.

At step 1620, the source MAC address of the data packet corresponds to a roamed wireless client device (e.g., the wireless client device is present in the KWCDb), then the kernel packet-driver uses the information in the KWCDb to identify and tunnel the packet to the home wireless switch. The current wireless switch 1322 encapsulates the L2 packet and tunnels the encapsulated packet to the home wireless switch 1312 of the wireless client device 1302 over the GRE-over-IP tunnel shared by the home wireless switch 1312 of the wireless client device 1302 and the current wireless switch 1322 of the wireless client device 1304.

At step 1630, the home wireless switch 1312 decapsulates the encapsulated packet and initiates a process for forwarding the inner L2 packet.

When the kernel packet-driver receives the data packet from the wired host, at step 1632, the kernel packet-driver first checks the KWCDb to determine if the destination MAC address of the data packet received from the wired host corresponds to a roamed wireless client device.

If the destination MAC address of the data packet received from the wired host does not correspond to a roamed wireless client device (e.g., the wireless client device is not found in the KWCDb), then at step 1634, the kernel packet-driver checks the BWCT and continues its normal forwarding operations.

If the destination MAC address of the data packet received from the wired host corresponds to a roamed wireless client device (e.g., the wireless client device is present in the KWCDb), then at step 1636, the kernel packet-driver uses the information in the KWCDb to identify a current wireless switch of the wireless client device. The home wireless switch of the second wireless client device encapsulates the L2 packet and tunnels a GRE packet (comprising the L2 packet) to the current wireless switch via a GRE-over-IP tunnel.

At step 1638, the current wireless switch decapsulates the GRE packet and sends the original or inner L2 packet to the second wireless client device.

Broadcast/Multicast (BCMC) Data Forwarding Scenarios

For the purpose of forwarding broadcast/multicast (BCMC) data, each of the wireless switches maintains a Current Switch Tunnel VLAN Member Table (CS-Tunnel-VMT) and a Current Switch WLAN-VLAN Member Table (CS-WLAN-VMT) along with the KWCDb in the data-forwarder (or kernel packet-driver). The Current Switch Tunnel VLAN Member Table (CS-Tunnel-VMT) comprises the subset of CS tunnels to peer switches computed per VLAN on the HS, determined based on whether there is at least one roamed wireless client device belonging to that VLAN. The Current Switch WLAN-VLAN Member Table (CS-WLAN-VMT) comprises the subset of WLANs computed per VLAN on the CS, determined based on whether there is at least one roamed wireless client device on the WLAN belonging to the VLAN. Since this table is computed at the CS, this VLAN is the VLAN ID of the packet received over a GRE tunnel from the HS.

In the following BCMC data forwarding scenarios, the wireless client device 1303 is associated with WLAN 11 on wireless switch 1312, and wireless client device 1302 is associated with WLAN 12 on wireless switch 1312. The wireless switch 1312 is the HS as well as the CS for wireless client device 1303 and wireless client device 1302. Since WLAN 11 and WLAN 12 are mapped to VLAN 10, both wireless client device 1303 and wireless client device 1302 are "homed" on subnet A 1310 (VLAN 10). The wireless client device 1303 roams to WLAN 21 on wireless switch 1322 (making wireless switch 1322 the CS for wireless client device 1303) and wireless client device 1302 roams to WLAN 31 on wireless switch 1332 (making wireless switch 1332 the CS for wireless client device 1302).

All wireless switches update their CPWCDb as well as their KWCDb with both wireless clients' states. Wireless switch 1312, which is the HS for both wireless client devices 1302, 1303, updates its CS-Tunnel-VMT for VLAN 10 with Tunnel 12 and Tunnel 13 since both WSs have at least one roamed wireless client device from VLAN 10. Wireless switch 1322 and wireless switch 1332 also update their CS-WLAN-VMT for VLAN 10 with WLAN 21 and WLAN 31, respectively.

Figure 17:
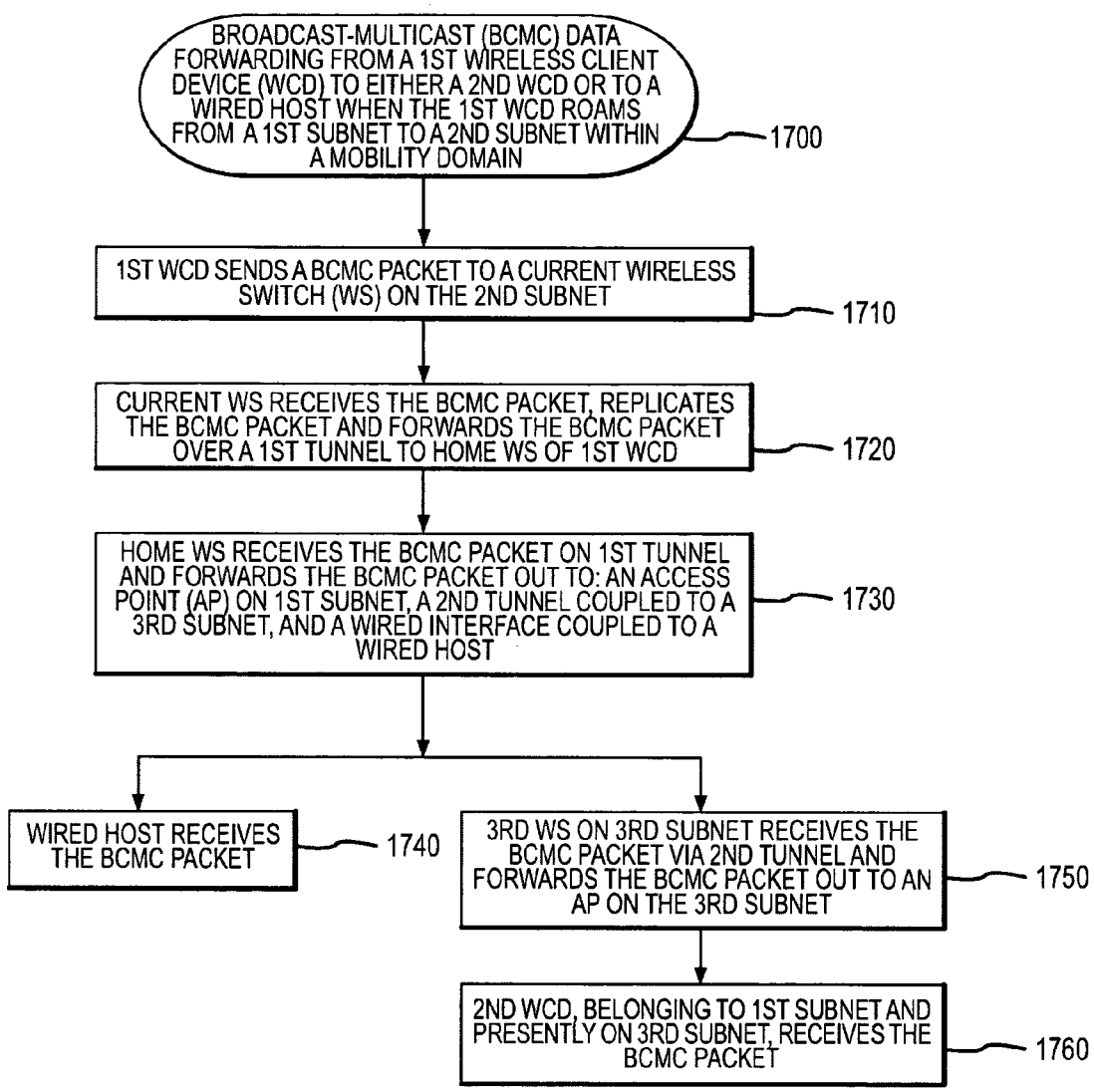
FIG. 17 is a flow chart showing a broadcast-multicast (BCMC) data forwarding scenario for forwarding BCMC data from a wireless client device to either another wireless client device or to a wired host in the network when the wireless client device roams within a mobility domain according to one exemplary implementation.

FIG. 17 is a flow chart 1700 showing a broadcast-multicast (BCMC) data forwarding scenario for forwarding BCMC data from a wireless client device to either another wireless client device or to a wired host in the network when the wireless client device roams within a mobility domain according to one exemplary implementation.

BCMC Data from Wireless Client Device to Wired Host or Another Wireless Client Device At step 1710, the wireless client device 1303 sends a BCMC packet on WLAN 21. At step 1720, the wireless switch 1322 receives the BCMC packet, replicates the BCMC packet and forwards the BCMC packet out on HS Tunnel 12 to wireless switch 1312. At step 1730, the wireless switch 1312 receives the BCMC packet on Tunnel 12 and forwards the BCMC packet out on: WLAN 11 and WLAN 12; the CS-Tunnel-VMT consisting of Tunnel 13 (does not forward on Tunnel 12 since it received the BCMC packet on that tunnel), and the Wired interface. At step 1740, the wired host 1370 receives the BCMC packet which was forwarded on the wired interface. At step 1750, the wireless switch 1332 receives the BCMC packet on Tunnel 13 and forwards the BCMC packet out to CS-WLAN-VMT (which comprises the WLAN 31). At step 1760, all roamed wireless client devices belonging to VLAN 1310 on WLAN 31 including wireless client device 1302 receive the BCMC packet.

Forwarding BCMC Data from Wired Host to Wireless Client Device

Figure 18:
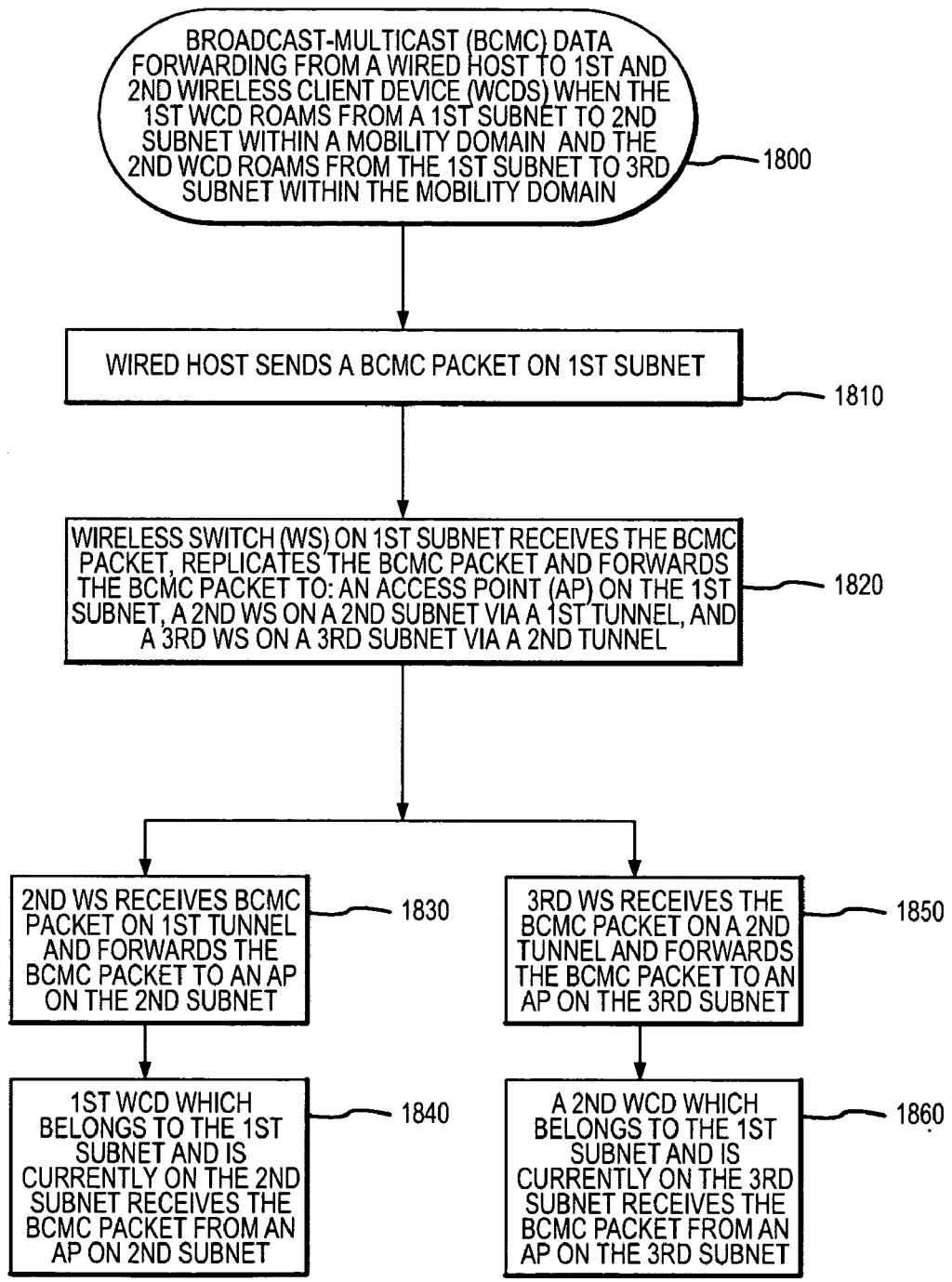
FIG. 18 is a flow chart showing a broadcast-multicast (BCMC) data forwarding scenario for forwarding BCMC data from a wired host to a wireless client device when the wireless client device roams within a mobility domain according to another exemplary implementation.

FIG. 18 is a flow chart showing a broadcast-multicast (BCMC) data forwarding scenario for forwarding BCMC data from a wired host to a wireless client device when the wireless client device roams within a mobility domain according to another exemplary implementation.

At step 1810, the wired host 1370 sends a BCMC packet on VLAN 1310. At step 1820, wireless switch 1312 receives the BCMC packet, replicates the BCMC packet and forwards the BCMC packet out on: WLAN 11 and WLAN 12, and CS-Tunnel-VMT consisting of Tunnel 12 and Tunnel 13. At step 1830, wireless switch 1322 receives the BCMC packet on Tunnel 12 and forwards the BCMC packet out to its CS- WLAN-VMT, which comprises WLAN 21. At step 1840, all roamed wireless client devices belonging to VLAN 1310 on WLAN 21 including wireless client device 1303 receive the BCMC packet. At step 1850, wireless switch 1332 receives the BCMC packet on Tunnel 13 and forwards the BCMC packet out to its CS-WLAN-VMT, which comprises of WLAN 31. At step 1860, all roamed wireless client devices belonging to VLAN 1310 on WLAN 31 including wireless client device 1302 receive the BCMC packet.

Home Switch Selection and Load Balancing

In some deployment scenarios, a WLAN will be deployed in a large area and supports a large number of clients on a number of wireless switches. Due to the location and distribution of the wireless switches, there can be an increased likelihood that one of the wireless switches will be assigned as the home wireless switch to a disproportionately large number or percentage of mobile clients in the WLAN. For example, a WLAN deployed at a park might have a number wireless switches. In this scenario, a first wireless switch might be located, for example, at a park, mall, stadium or other location where a large percentage of the clients will power on their 802.11 devices at the entrance. As a result the first wireless switch can become the home wireless switch of a large percentage of the clients such that it supports a disproportionately large number of the clients. When these clients roam the first wireless switch will remain as the home wireless switch for those clients, and the traffic to and from these clients will be tunneled back to first wireless switch indefinitely regardless of the client's location and proximity to other wireless switches in the WLAN. As a result, it is possible that the first wireless switch will get overloaded while some other wireless switches in the WLAN may be handling a relatively light load.

It would be desirable to provide techniques which allow the first wireless switch to determine that it should no longer remain as the home wireless switch for a certain client or clients when those clients move away from the first wireless switch. Techniques are needed to allow the first wireless switch to determine that it is no longer the best home wireless switch for a particular wireless client device or clients. Techniques are also needed to balance the number of clients assigned to a particular wireless switch such that the load on each of the wireless switches in the WLAN becomes more balanced.

To alleviate this issue, the home wireless switch selection process load-balances the wireless client device's home wireless switch assignment using either static home wireless switch mappings or dynamic load-balancing algorithms.

In one implementation, a home switch can be selected by using "static" home wireless switch mappings refer to a static mapping between the MAC address of a wireless client device and the IP address of that client's home wireless switch. This static home wireless switch mapping is provisioned explicitly on the current wireless switch with which the wireless client device first associates.

In one implementation, a home switch can be selected based on a configured load-balancing algorithm. Examples of load-balancing algorithms include, a "current wireless switch is the home wireless switch" load-balancing algorithm, a random load-balancing algorithm, a round-robin load-balancing algorithm, or a weighted-round-robin load-balancing algorithm.

The current wireless switch is the home wireless switch" load-balancing algorithm is a home wireless switch-selection scheme in which the current wireless switch "homes" a wireless client device that is entering the domain for the first-time to itself, i.e. it becomes the current wireless switch as well as home wireless switch for the wireless client device. Although this is a very simple algorithm to implement, there could be potential problems with this mode of operation in the Campus-gate issue described earlier. The same home wireless switch-selection procedure needs to be provisioned across the mobility domain to achieve optimal load-balancing.

According to one embodiment, when a wireless client associates with a wireless switch in the mobility domain this wireless switch becomes the current wireless switch for the wireless client. The wireless client identifies a candidate set of home wireless switches based on the WLAN-to-VLAN mappings that it learns from other wireless switches in the mobility domain as part of peer establishment. The current wireless switch sends a HS-OFFER message to the candidate home switch. If the candidate home switch accepts the offer, the candidate home switch sends a HS-ACCEPT message back to the current wireless switch. The candidate home switch also sends a JOIN message to all its peer wireless switches indicating that the candidate home switch has become the home switch for the wireless client. If the candidate home switch rejects the offer, the candidate home switch sends a HS-REJECT message to the current wireless switch. This triggers the selection of an alternate home switch by the current wireless switch. The process continues until a home switch is selected. The HS-OFFER, HS-ACCEPT and HS-REJECT messages are exchanged only between the current wireless switch and the candidate home switch.

Figure 19:
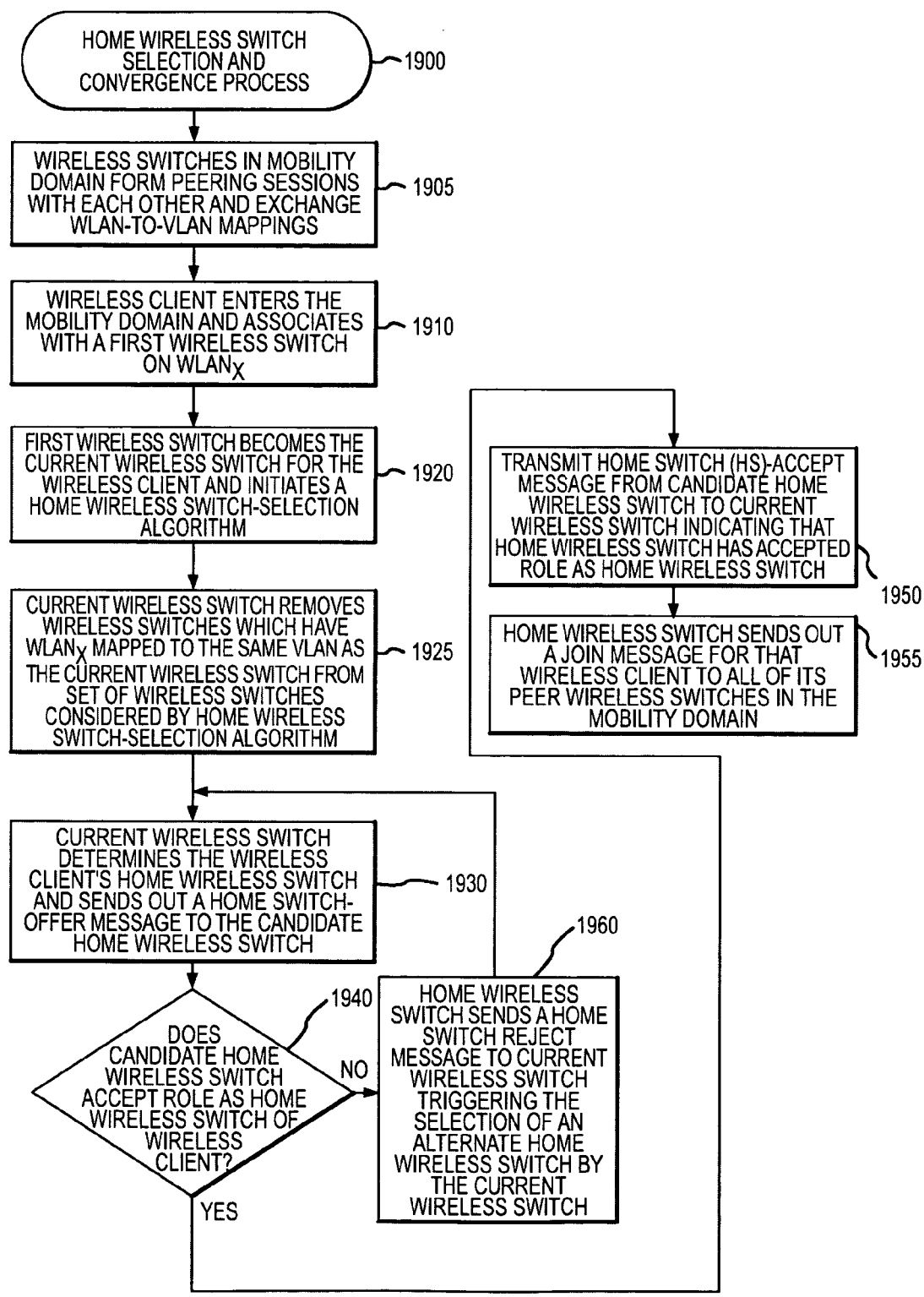
FIG. 19 is a flow chart showing a home wireless switch selection and convergence process according to another exemplary implementation.

FIG. 19 is a flow chart showing a home wireless switch selection and convergence process 1900 according to another exemplary implementation.

At step 1905, wireless switches within the mobility domain form peering sessions and exchange WLAN-to-VLAN mappings. As part of wireless switch peer establishment process, wireless switches in a mobility domain can exchange their WLAN->VLAN mappings for all their roam-capable WLANs (L3 mobility enabled via configuration). Each wireless switch can use these WLAN->VLAN mappings to generate a database of WLAN->VLAN mappings for each of the wireless switches in the mobility domain. Roam capable WLANs are ones that the operator explicitly specifies as capable of supporting the L3 roaming feature. If a WLAN is not configured to be roam-capable, then Layer 3 roaming will not be supported for client devices that roam across wireless switches in this WLAN.

At step 1910, a wireless client device enters the mobility domain and associates with a first wireless switch on $WLAN_x$.

At step 1920, this first wireless switch becomes the current wireless switch for the wireless client device and initiates a localized home wireless switch-selection algorithm.

At step 1925, the current wireless switch removes wireless switches which have $WLAN_x$ mapped to the same VLAN as the current wireless switch from set of wireless switches considered by home wireless switch-selection algorithm. The algorithm only considers a set of candidate switches that have $WLAN_x$ mapped to a different VLAN ($VLAN_y$), where $WLAN_x$ is the SSID to which this wireless client device is associated with on the current wireless switch. Thus, as part of the home switch selection process, the current wireless switch excludes the set of wireless switches that have WLANx mapped to the same VLAN as itself.

At step 1930, the current wireless switch determines the wireless client's home wireless switch and sends out a HS-OFFER message to the candidate home wireless switch.

At step 1940, the candidate home wireless switch decides whether it accepts the role as home wireless switch of the wireless client device.

If the candidate home wireless switch accepts the wireless client device as its "home," then at step 1950, the candidate home wireless switch sends out a HS-ACCEPT message to the current wireless switch indicating that it has accepted the role of home wireless switch. At step 1955, the home wireless switch sends out a JOIN message for that wireless client to its peer wireless switches in the mobility domain.

If the candidate home wireless switch accepts the wireless client device as its "home," then at step 1960, the candidate home wireless switch sends out a HS-REJECT message to the current wireless switch which then triggers the selection of an alternate home wireless switch by the current wireless switch.

Security

Control Plane Security

Some networks require inter-switch traffic to be secured. This may be because the network is shared between a multitude of users some of which cannot be trusted. Large networks may span multiple campuses connected by WAN links.

Given that the control plane communication between wireless switches is contained entirely over wired media it may be desirable to secure the control plane data exchange. Auto-discovery mechanisms (discussed above) and insecure exchange of wireless client database information can open up the network environment to a variety of potential security attacks. Therefore, authentication mechanisms can be incorporated into the L3 mobility protocol so that wireless switches can authenticate peer switches. Moreover, other security measures are provided which allow data traffic to be encrypted and its integrity to be verified on reception to ensure that it has not been modified in transit.

L3 mobility authentication can be "simple" or based on a message digest algorithm such as MD5 or Secure Hash Algorithm-1 (SHA-1). As used herein, the term. "MD5" refers to a hash function algorithm that is used to verify data integrity through the creation of a 128-bit output known as a "message digest" from data input (which may be a message of any length). MD5 is intended for use with digital signature applications, which require that large files must be compressed by a secure method before being encrypted with a secret key, under a public key cryptosystem. MD5 is described in Internet Engineering Task Force (IETF) Request for Comments (RFC) 1321. According to the standard, it is "computationally infeasible" that any two messages that have been input to the MD5 algorithm could have as the output the same message digest, or that a false message could be created through apprehension of the message digest. SHA-1 is an MD-5-like algorithm that was designed to be used with the Digital Signature Standard (DSS). At least four more variants have since been issued, sometimes collectively referred to as SHA-2: SHA-224, SHA-256, SHA-384, and SHA-512.

When authentication mechanisms can be incorporated into the L3 mobility protocol, mobility protocol packet headers can be used which include an authentication-type field and some data for use by the appropriate authentication scheme as determined by the type field.

When simple authentication is used, a password goes in clear-text over the network as part of the packet header. This type of authentication guards against switches joining the mobility domain inadvertently. However, anyone with physical access to the wired network segment could learn the password and compromise the security of the network environment.

When MD5 authentication is used, a shared secret key can be configured on all the switches in a mobility domain. This shared secret key can then be used to generate and verify a message digest that is appended to every protocol packet. Since the shared secret key does not pass over the network, it provides protection against passive attacks.

Data Plane Security

"Internet Protocol Security (IPSec)" is a standard for securing Internet Protocol (IP) communications by encrypting and/or authenticating IP packets. IPSec provides a set of security protocols which operate at layer 3 (L3) of the OSI model commonly referred to as the network layer (or packet processing layer). For example, IPsec can be used for protecting both TCP and UDP-based protocols. IPsec can allow security arrangements to be handled without requiring changes to individual user computers. IPsec provides a set of cryptographic protocols for (1) securing packet flows and (2) key exchange. Of the former, there are two choices of security service: Encapsulating Security Payload (ESP) provides authentication of the sender of data, and encryption for data confidentiality and message integrity; Authentication Header (AH) allows authentication of the sender of data and message integrity, but does not offer confidentiality. The specific information associated with each of these services is inserted into the packet in a header that follows the IP packet header GRE-over-IPSEC can be used to provide secure tunneling of data packets between mobility peers. Secure tunneling needs to be explicitly enabled via configuration between a pair of mobility peer wireless switches and all associated IPSEC parameters would need to be configured.

IPSec is described in the following RFCs: RFC 2367 (PFKEY Interface), RFC 2403 (The Use of HMAC-MD5-96 within ESP and AH), RFC 2405 (The ESP DES-CBC Cipher Algorithm With Explicit IV), RFC 2410 (The NULL Encryption Algorithm and Its Use With Ipsec), RFC 2411 (IP Security Document Roadmap), RFC 2412 (The OAKLEY Key Determination Protocol), RFC 2451 (The ESP CBC-Mode Cipher Algorithms), RFC 2857 (The Use of HMAC-RIP-EMD-160-96 within ESP and AH), RFC 3526 (More Modular Exponential (MODP) Diffie-Hellman groups for Internet Key Exchange (IKE)), RFC 3706 (A Traffic-Based Method of Detecting Dead Internet Key Exchange (IKE) Peers), RFC 3715 (IPsec-Network Address Translation (NAT) Compatibility Requirements), RFC 3947 (Negotiation of NAT-Traversal in the IKE), RFC 3948 (UDP Encapsulation of IPsec ESP Packets), RFC 4301 (Security Architecture for the Internet Protocol), RFC 4302 (IP Authentication Header), RFC 4303 (IP Encapsulating Security Payload (ESP)), RFC 4304 (Extended Sequence Number (ESN) Addendum to IPsec Domain of Interpretation (DOI) for Internet Security Association and Key Management Protocol (ISAKMP)), RFC 4305 (Cryptographic Algorithm Implementation Requirements for Encapsulating Security Payload (ESP) and Authentication Header (AH)), RFC 4306 Internet Key Exchange (IKEv2) Protocol, RFC 4307 Cryptographic Algorithms for Use in the Internet Key Exchange Version 2 (IKEv2), RFC 4308 (Cryptographic Suites for Ipsec), RFC 4309 (Using Advanced Encryption Standard (AES) CCM Mode with IPsec Encapsulating Security Payload (ESP)), etc.

Scalability

The architecture for Layer 3 (L3) mobility described above requires that all wireless switches in a single mobility domain are fully meshed. However this full-mesh requirement presents a scaling problem since the number of peer connections increases exponentially ($n*(n-1)/2$) with the addition of every new switch into the network. It would be desirable to provide techniques which can help alleviate the need for creating a full mesh between wireless switches in a single mobility domain. As will be described below, an approach referred to as the Mobility-Relay model is used to alleviate the need for creating a full mesh between wireless switches in a single mobility domain.

Figure 20:
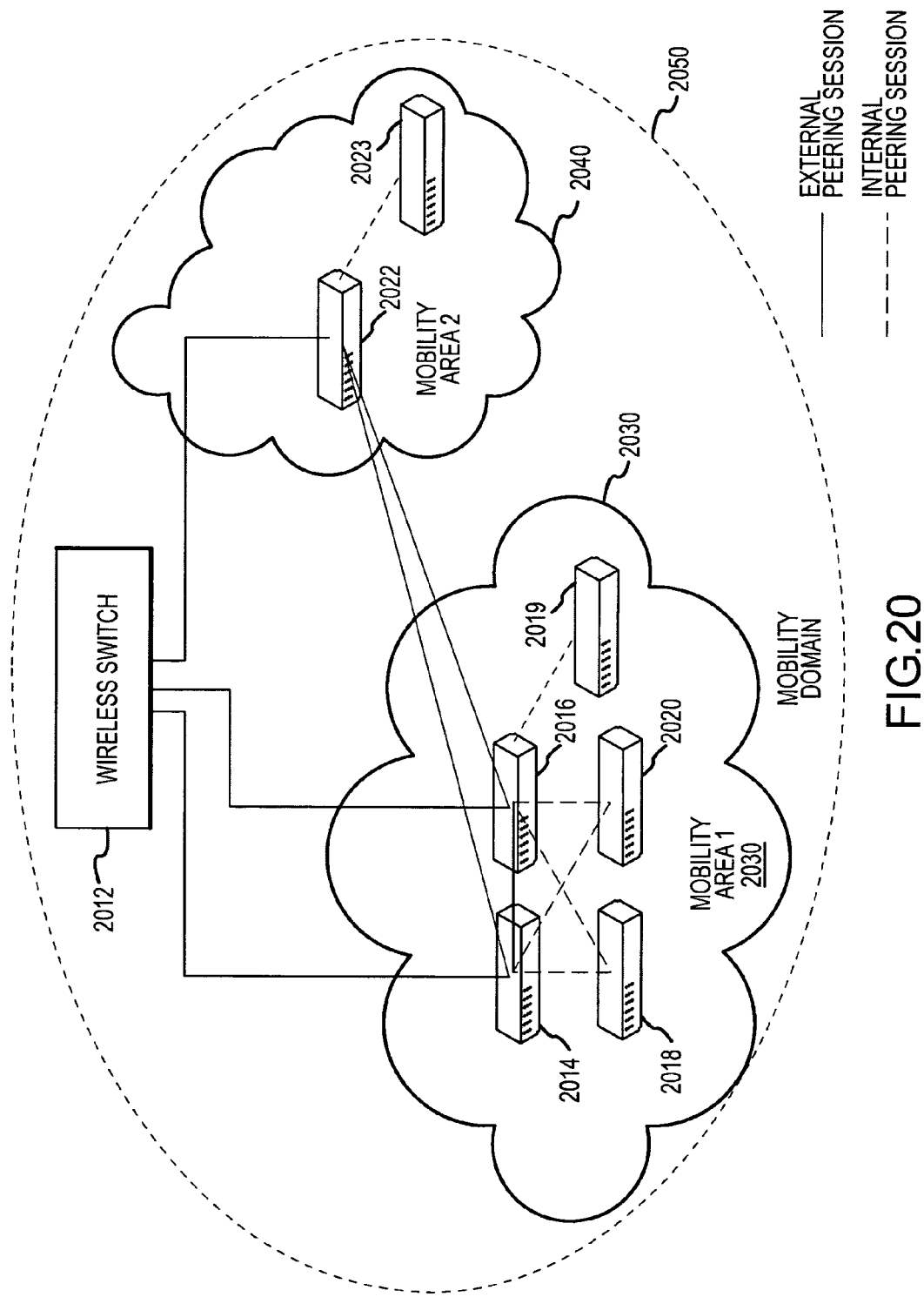
FIG. 20 is a simplified block diagram of a WLAN implementing designated switches (DSs) and client switches (CSs) when dividing a mobility domain into mobility areas according to one exemplary implementation.

FIG. 20 is a simplified block diagram of a WLAN 2000 implementing designated switches (DSs) 2014, 2016, 2022 and client switches (CSs) 2018, 2019, 2020, 2023 when dividing a mobility domain 2050 into mobility areas 2030, 2040 according to one exemplary implementation. According to this network model, a mobility-domain, comprising a number of wireless switches, can be divided into sub-domains called "mobility areas." As used herein, the term "mobility area" refers to a logical collection of wireless-switches comprising one or more designated switches (DS) and its set of client switches (CSs) that have internal peering sessions with the designated switches. A designated switch can be configured to be an internal peer to another designated switch thus forming a hierarchy of mobility-areas. According to one network model, each mobility area has a designated switch and set of internal peers having sessions only with the designated switch. All the designated switches in the mobility domain are fully-meshed. If a mobility area contains only one designated switch, this represents a single point of failure and could potentially affect the operations for the whole mobility area as long as the designated switch is down. To avoid this issue, a highly available network design comprises multiple designated switches in each mobility area with the each of them acting as external peers to another. All designated switches in the mobility area are simultaneously active and continue to send and receive mobility update messages. Duplicate messages received by the peers of redundant designated switches are ignored. When a designated switch goes down, there is practically zero downtime for wireless client devices that do not have the failed designated switch as their home wireless switch or current wireless switch.

The designated switches in a mobility area have external peering sessions with one another and with designated switches in other mobility areas. For example, in FIG. 20, the designated switch 2014 and redundant designated switch 2016 in mobility area 1 2030 have external peering sessions with one another and with designated switch 2022 in mobility area 2 2040.

Client switches have internal peering sessions only with the designated switches in their own mobility area. As such, a full mesh is not required since client switches do not peer with switches in other mobility areas. For example, in FIG. 20, client switches 2018, 2020 have internal peering sessions only with the designated switch 2014 and redundant designated switch 2016 in mobility area 1 2030, but do not peer with each other or externally peer with designated switch 2022 in mobility area 2 2040.

External peering sessions between the designated switches of different mobility areas are fully-meshed. A designated switch essentially relays wireless client device control messages between its client-switches and designated switches in other mobility areas. For example, in FIG. 20, external peering sessions between the designated switch 2014 and redundant designated switch 2016 of mobility area 2030 are fully-meshed with designated switch 2022 of mobility area 2040. Both designated switch 2014 and redundant designated switch 2016 relay wireless client device control messages between client switches 2018, 2020 in mobility area 1 2030 and designated switch 2022 in mobility area 2 2040. This way, if either the designated switch 2014 or redundant designated switch 2016 fails for some reason, the other switch can serve as an active backup and/or redundant designated wireless switch.

As shown in FIG. 20, the redundant designated switch 2016 also has internal peering sessions with clients 2018 and 2020, and also has an external peering session with designated switch 2022 (in mobility area 2 2040). The redundant designated switch 2016 receives control messages from client 2018 and relays to its client switches 2020 and 2019 as well as designated switch 2022. Designated switches 2014 and 2016 also have an external peering session with each other and therefore relay messages to each other. All duplicate messages received by any designated switch are discarded (in this scenario designated switch 2022 will receive duplicate messages from 2014 and redundant designated switch 2016).

To maintain backward compatibility and provide a migration path towards the Mobility-Relay model, designated switches establish external peering sessions with the older versions of switches (conventional switches) that do not have Mobility-Relay enabled. These conventional switches are not part of any mobility-area, do not have any designated switches configured on them, and are not be configured to operate as a designated switch for any mobility area.

Mobility Relay Operation

Figure 21:
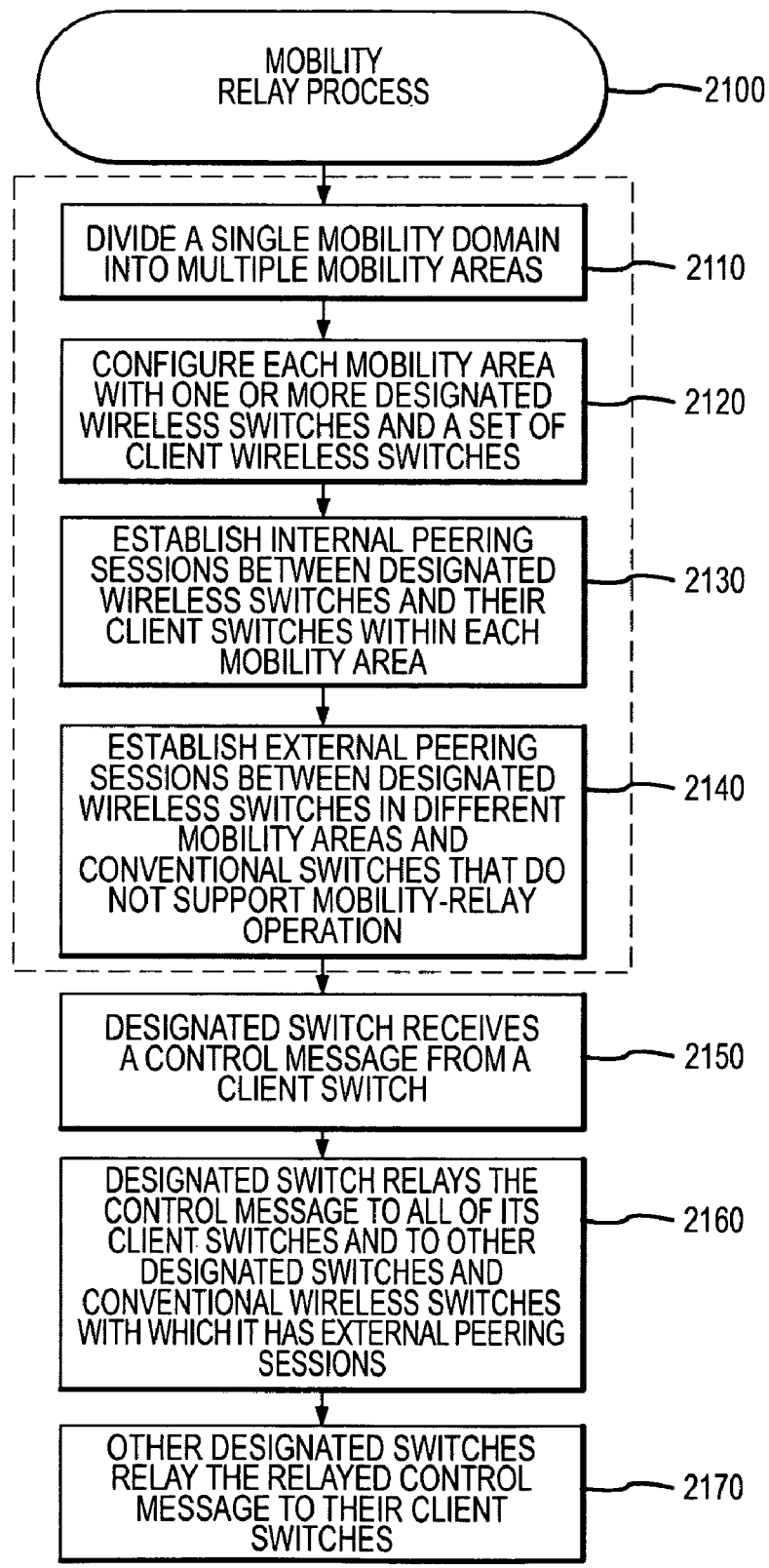
FIG. 21 is a flow chart showing a mobility relay process for use by a designated switch when relaying control messages received from its client switches and other designated switches according to another exemplary implementation.

FIG. 21 is a flow chart showing a mobility relay process 2150-2170 for use by a designated switch when relaying control messages received from its client switches and other designated switches according to another exemplary implementation. Steps 2110-2140 in the dotted-line rectangle show steps for subdividing a mobility domain into mobility areas. This helps alleviate the need for creating a full mesh between wireless switches in a single mobility domain.

At step 2110, a single mobility domain can be divided into multiple mobility areas. At step 2120, each mobility area can be configured with one or more designated wireless switches and a set of client wireless switches. At step 2130, within each mobility area, internal peering sessions are established between designated wireless switches and their client switches. At step 2140, each designated switch can establish external peering sessions between designated wireless switches in different mobility areas and conventional switches that do not support mobility-relay operation.

At step 2150, the mobility relay process begins, when a designated switch receives a control message from a client switch. When designated switch receives a control message from a client switch, at step 2160, the designated switch relays the control message to all of its client switches and to other designated switches (and conventional wireless switches) with which the designated wireless switch has external peering sessions. At step 2170, the other designated switches which receive the relayed control message over an external peering session can then relay the control message to all its client switches.

Query-Response Operation

When a wireless client device associates with a wireless switch, the first step is to identify whether the wireless client device is entering the mobility domain for the first time or if this is a wireless client device that has roamed from another switch to this wireless switch. To determine whether a wireless client device is entering the mobility domain for the first time or has roamed from another wireless switch, information is obtained by doing a lookup in the wireless client database (WCDb) using the wireless client device's MAC address. Thus, the wireless client database (WCDb) should have the complete set of all the wireless client devices currently associated with switches in the mobility domain. In other words, control plane messages describing the wireless client device state must be distributed to every other switch in the mobility domain to help ensure a consistent view of the wireless client database (WCDb) among all wireless switches in the mobility domain. Since every switch needs to be aware of the state of all the wireless client devices in the mobility domain, the size of the wireless client database (WCDb) can expand significantly in large networks that handle thousands of wireless client devices. The size of the database can become unmanageably large, especially in networks with large number of switches and mobile clients.

For data-forwarding purposes, it would suffice if the wireless switch has data about wireless client devices for which it is either the home wireless switch or the current wireless switch. The wireless switch just needs to be able to query some other entity in the network to obtain information on all other wireless client devices (for which it is not home wireless switch or current wireless switch). The downside to this is that the control plane traffic, as well as the time taken for a wireless client device to complete the association process and be "data-ready" significantly increases.

A mode of operation called the "Query-Response" model works in conjunction with the Mobility-Relay model to restrict the size of the wireless client database (WCDb) within the mobility-area to a significantly smaller subset. When the "Query-Response" model is combined with the Mobility-Relay model, wireless switches in a mobility-area distribute wireless client device information for all wireless client devices for which they are either home wireless switch or current wireless switch. The size of the wireless client database (WCDb) is dictated by the number of wireless switches and mobile clients associated with a mobility area.

Figure 22:
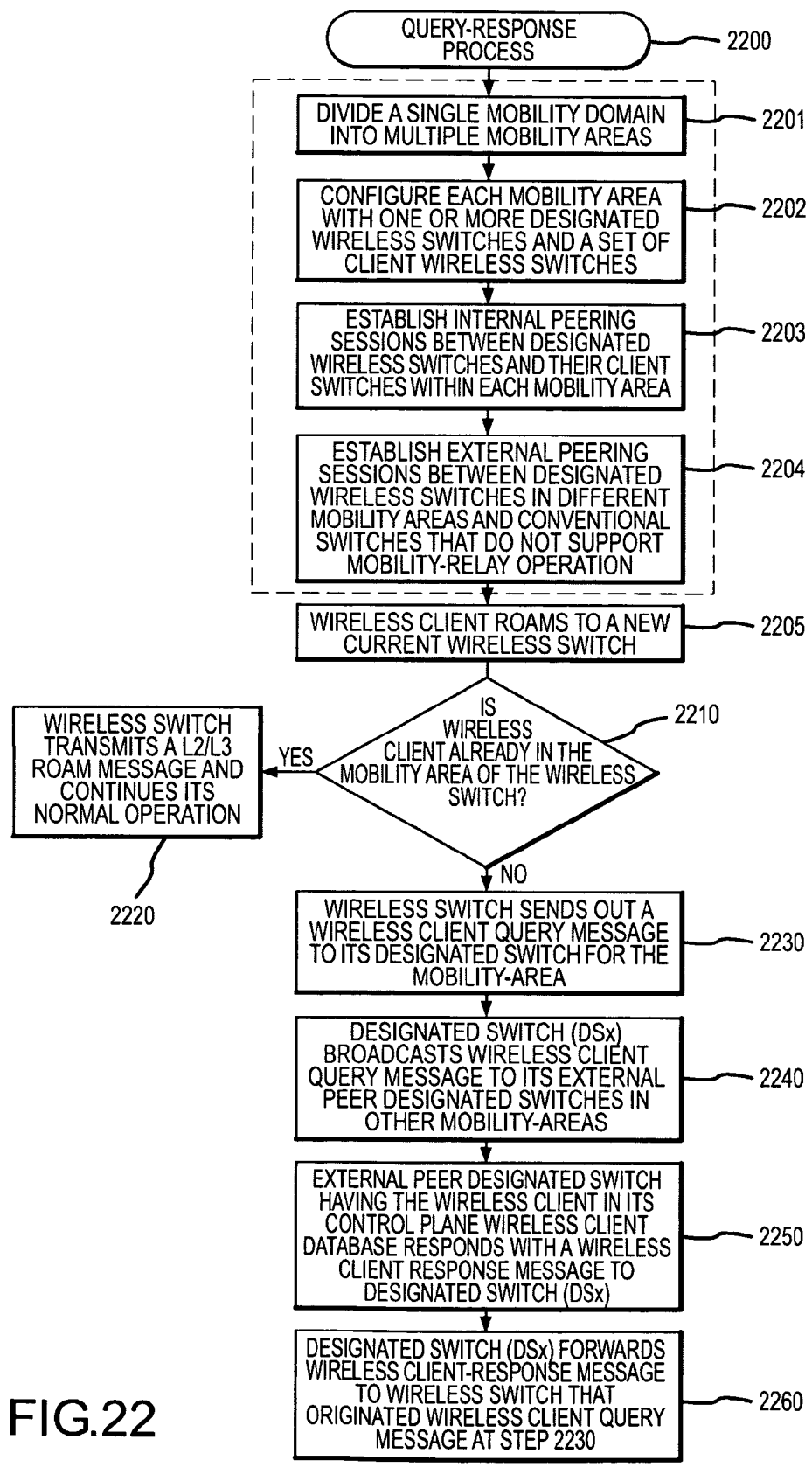
FIG. 22 is a flow chart showing a query-response process for querying a network entity to obtain information about other wireless client devices for which a wireless switch is not the home or the current wireless switch according to another exemplary implementation.

FIG. 22 is a flow chart showing a query-response process 2200 for querying a network entity to obtain information about other wireless client devices for which a wireless switch is not the home or the current wireless switch according to another exemplary implementation. Steps 2201-2204 in the dotted-line rectangle show steps for subdividing a mobility domain into mobility areas. This helps alleviate the need for creating a full mesh between wireless switches in a single mobility domain.

At step 2201, a single mobility domain can be divided into multiple mobility areas. At step 2202, each mobility area can be configured with one or more designated wireless switches and a set of client wireless switches. At step 2203, within each mobility area, internal peering sessions are established between designated wireless switches and their client switches. At step 2204, each designated switch can establish external peering sessions between designated wireless switches in different mobility areas and conventional switches that do not support mobility-relay operation.

At step 2205, the wireless client device roams to a new current wireless switch.

When a wireless client device associates with the new current wireless switch, at step 2210, the new current wireless switch checks its wireless client database (WCDb) to determine if the wireless client device is already in the mobility area of the new current wireless switch.

If the wireless client device is already present in the mobility area, then at step 2220, the wireless switch transmits a L2/L3 ROAM and continues its normal operation.

If the wireless client device is not already present in the mobility area, then at step 2230, the wireless switch sends out a wireless client device QUERY message to its designated switch for the mobility-area. The wireless client device QUERY message is a control plane message that is originated by the wireless switch (that needs to perform a lookup on the wireless client device that has just associated with the wireless switch). The wireless client device QUERY message comprises the MAC address of the wireless client device. The wireless client device QUERY message can have a timer associated with it during which a response must be received.

At step 2240, a designated switch (DSx) broadcasts wireless client device QUERY message to all its external peer designated switches in other mobility-areas.

At step 2250, an external peer designated switch having the wireless client in its CPWCDb responds to the wireless client device QUERY message with a wireless client device-RESPONSE message to the designated switch (DSx). The wireless client device RESPONSE message is a control plane message that is generated by a designated switch (or a conventional switch) in response to a wireless client device QUERY message. The wireless client device RESPONSE message comprises the wireless client device's home wireless switch, current wireless switch, and home wireless switch-VLAN information.

At step 2260, the designated switch (DSx) forwards the wireless client device RESPONSE message to the querying wireless switch. In other words, the wireless client device RESPONSE message is then relayed by the designated switch (DSx) to the wireless switch that originated the wireless client device QUERY message at step 2230.

Redundancy and High Availability

To meet high-availability requirements of large networks, large networks cannot afford to have a single point of failure. If a particular wireless switch fails for some reason, the rest of the network should be capable of detecting the failure and reorganizing itself by isolating the failed wireless switch to continue to operate and provide service with minimal impact.

Stateful Switchover

According to other embodiments, techniques for detecting wireless switch failure in different scenarios are provided, and other techniques for addressing those different wireless switch failure scenarios are provided. Fast detection mechanisms can be used to identify wireless switch failures either through an external switch-level redundancy module or via a failure detection module integrated with the L3 mobility subsystem.

Current Wireless Switch Redundancy:

When a wireless switch fails that is either the current wireless switch or both the current wireless switch and home wireless switch (e.g., when the wireless client has not yet roamed), all the wireless client devices associated with that wireless switch can lose connectivity to the network. Redundant current wireless switches can be provided in which an active or passive backup wireless switch is capable of transparently taking over control-plane and data-plane functions for the wireless client devices currently associated with the failed "current" wireless switch. According to this approach, the entire wireless client database (WCDb) (including all wireless client device parameters like WLAN information, ACLs, security credentials like encryption keys, L3 Mobility information, etc.) of the initial current wireless switch and the backup wireless switch(es) can be synchronized.

Figure 23:
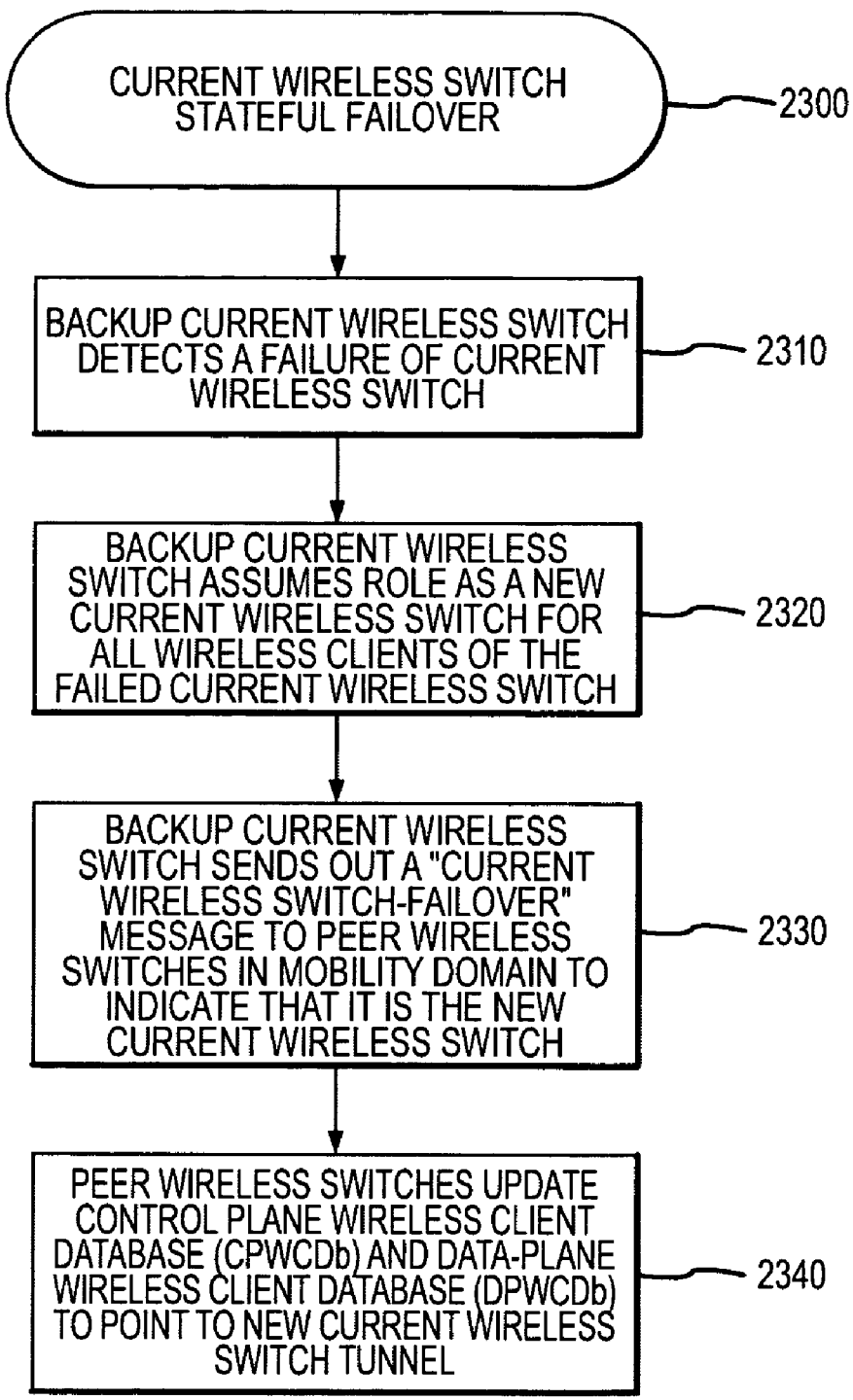
FIG. 23 is a flow chart showing a current wireless switch stateful failover process according to an exemplary implementation.

FIG. 23 is a flow chart showing a backup current wireless switch stateful failover process 2300 according to an exemplary implementation. The backup current wireless switch stateful failover process 2300 allows a back-up wireless switch to take over control-plane and data-plane functions for all the wireless client devices currently associated with a failed current wireless switch.

At step 2310, a backup current wireless switch detects a failure of the current wireless switch.

When a failure of the current wireless switch is detected by the backup current wireless switch, at step 2320, the backup current wireless switch assumes or "takes-over" the responsibility of serving as the current wireless switch for all wireless client of the "failed" current wireless switch. In other words, the backup current wireless switch can serve as a new current wireless switch for all the wireless client devices of the failed current wireless switch. For example, the backup current wireless switch can transparently adopt the APs associated with the failed current wireless switch, and activate all the wireless client device associations belonging to the failed current wireless switch. The backup current wireless switch can also assume the L3 Mobility functionality of the initial current wireless switch. As a part of this process, the backup current wireless switch can review the wireless client database (WCDb), and update the IP address of the current wireless switch to its own IP address for all the wireless client devices for which the failed wireless switch was initially the current wireless switch.

At step 2330, the backup current wireless switch then sends out a "current wireless switch-FAILOVER" message to all of its peer wireless switches in the mobility domain to indicate that the backup current wireless switch is the new current wireless switch. The current wireless switch-FAILOVER message comprises the IP address of the old current wireless switch and the IP address of the new current wireless switch.

At step 2340, the peer wireless switches update the control plane wireless client database (CPWCDb) and possibly their data-plane wireless client database (DPWCDb) to point to a tunnel for the new current wireless switch.

Home Wireless Switch-Redundancy

When a home wireless switch (that is not also the current wireless switch) fails, then all the wireless client devices that have roamed using the L3 Mobility functionality are affected. The wireless client devices lose connectivity to the wired subnet to which those wireless clients were originally "homed" since all data to and from the wireless client device would have to be forwarded by the failed home wireless switch.

Figure 24:
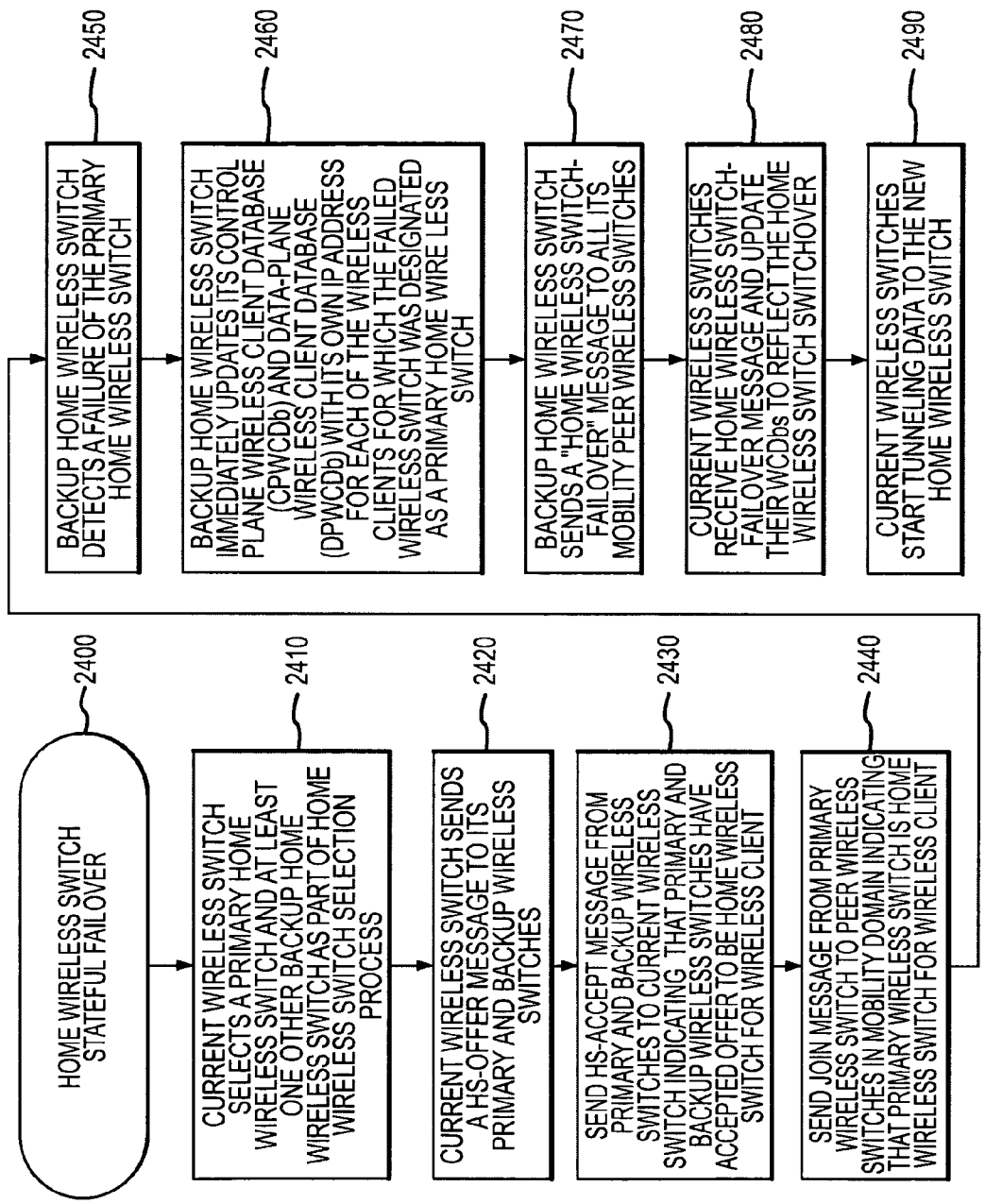
FIG. 24 is a flow chart showing a home wireless switch stateful failover process according to an exemplary implementation.

FIG. 24 is a flow chart showing a home wireless switch stateful failover process 2400 according to an exemplary implementation. The process 2400 can be used to recover from failure of a home wireless switch in a network of wireless switches which includes an initial home wireless switch of at least one wireless client device in a first mobility domain, a backup home wireless switch in the first mobility domain, and other peer wireless switches in the first mobility domain. The home wireless switch stateful failover process 2400 can be used by a new home wireless switch to take over control-plane and data-plane functions for all the wireless client devices currently associated with a failed home wireless switch.

Wireless client devices associate with a current wireless switch as soon as they enter the mobility domain. At step 2410, the current wireless switch chooses a an initial or primary home wireless switch and at least one other backup home wireless switch for the wireless client device using a load-balancing home wireless switch-selection algorithm such as that described above.

At step 2420, the current wireless switch sends a home switch offer (HS-OFFER) message to the initial home wireless switch and the backup home wireless switch.

At step 2430, the initial home wireless switch and the backup home wireless switch can send a home switch "accept" (HS-ACCEPT) message to the current wireless switch indicating that they have accepted the offer to be the initial home wireless switch and the backup home wireless switch for the wireless client device, respectively.

At step 2440, the initial home or "primary" wireless switch can send a join (JOIN) message to its peer wireless switches in the mobility domain of the initial home wireless switch indicating that it is the home wireless switch for the wireless client. The wireless client device is initially homed with the "initial" home wireless switch.

At step 2450, one of the backup home wireless switches detects failure of the initial home wireless switch.

When a backup home wireless switch detects a failure of the primary home wireless switch, at step 2460, the backup home wireless switch immediately updates its control plane wireless client database (CPWCDb) and data-plane wireless client database (DPWCDb) with its own IP address (i.e., IP address of the backup wireless switch) for each of the wireless clients for which the failed wireless switch was designated as a primary home wireless switch. For instance, in one implementation, the control plane wireless client database (CPWCDb) and the data-plane wireless client database (DPWCDb) of the backup home wireless switch can be updated by replacing the IP address of the initial home wireless switch with the IP address of the backup home wireless switch for each of the wireless client devices for which the failed home wireless switch was the initial home wireless switch (but not the current wireless switch) to reflect that the backup home wireless switch has assumed responsibility as the new home wireless switch for the wireless client devices previously homed to the home wireless switch.

At steps 2470 and 2480, the WCDb of the backup home wireless switch can then be synchronized to wireless client databases (WCDbs) of the peer wireless switches so that the WCDb of each wireless switch in the first mobility domain has the IP address of the backup home wireless switch associated with the wireless client devices.

At step 2470, the backup home wireless switch sends a "home wireless switch-failover" message to all its peer current wireless switches of the backup home wireless switch (e.g., those peer wireless switches which are current wireless switches in its mobility domain). The home wireless switch-failover message indicates that the original home wireless switch is no longer the home wireless switch and that the backup home wireless switch has now assumed this role (e.g., that the backup home wireless switch is the new home wireless switch for the wireless client devices for which the failed home wireless switch was the initial home wireless switch and not the current wireless switch). In other words, the home wireless switch-failover message indicates that the backup home wireless switch has assumed responsibility for the wireless client devices previously homed to the home wireless switch and that the initial home wireless switch is no longer the home wireless switch.

Each of the wireless client devices has a current wireless switch. Upon receiving the home wireless switch-failover message, at step 2480, the current peer wireless switches can update their respective wireless client databases (WCDbs) to reflect the home wireless switch switchover.

At step 2490, the current wireless switches start tunneling data packets to the new home wireless switch over GRE-over-IP tunnels between the current wireless switches and the new home wireless switch. In other words, application data packets which originate from the wireless client devices (and which are destined to other wireless client devices or wired devices on the network) can be tunneled from current wireless switches to the backup home wireless switch over the GRE-over-IP tunnels between the backup wireless switch and the current wireless switches.

Although not shown in FIG. 24, in a similar manner, application data packets which originate from other wireless client devices or wired devices on the network, and are destined for the wireless client devices, can be tunneled to these current wireless switches from the backup home wireless switch over GRE-over-IP tunnels between the backup wireless switch and the current wireless switches.

Hitless Restart

Typically when the control plane of a wireless switch restarts (without the hitless restart mechanism), peer wireless switches shut down and then restart their peering sessions with the restarting switch and as a result discard all wireless client device information learned from the wireless switch.

Techniques and technologies are provided for restarting a first wireless switch when the first wireless switch fails. In this example, the first wireless switch comprises a control plane comprising a control plane layer 3 (L3) mobility module and a control plane wireless client database (CPWCDb), and a data plane comprising a data-forwarder module and a data plane wireless client database (KWCDb). The CPWCDd and the KWCDb are separated from each other and function independently of each other so that failure of one does not affect the other. As a result, the failure of one module does not affect the other.

The KWCDb comprises information for each of the wireless client devices for which the first wireless switch was either the home wireless switch and/or the current wireless switch before failing. The KWCDb includes entries for wireless client devices indexed by their MAC address. The information about each particular wireless client device comprises mobility related parameters that can be used to distinguish between new wireless client devices entering the mobility domain and existing wireless client devices roaming within the mobility domain. The mobility related parameters for each particular wireless client device comprise: a MAC address of the particular wireless client device, an IP-address of the particular wireless client device, an IP address of the home wireless switch (HS) for the particular wireless client device, an IP address of the current wireless switch (CS) for the particular wireless client device, and a VLAN identifier of the home wireless switch (HS) for the particular wireless client device.

With hitless restart support, the peer wireless switches retain old wireless client information, while the failed switch restarts and a control plane in the restarting wireless switch re-establishes peering sessions and builds a new WCDb. The control plane restarts at the restarting switch and begins to re-establish peering sessions with all its configured peers. The peers also exchange their HWCDb with each other and thus build a WCDb that consists of all the wireless clients in the mobility domain. The control plane then updates the KWCDb with the latest wireless client info learned from its peers.

Figure 25:
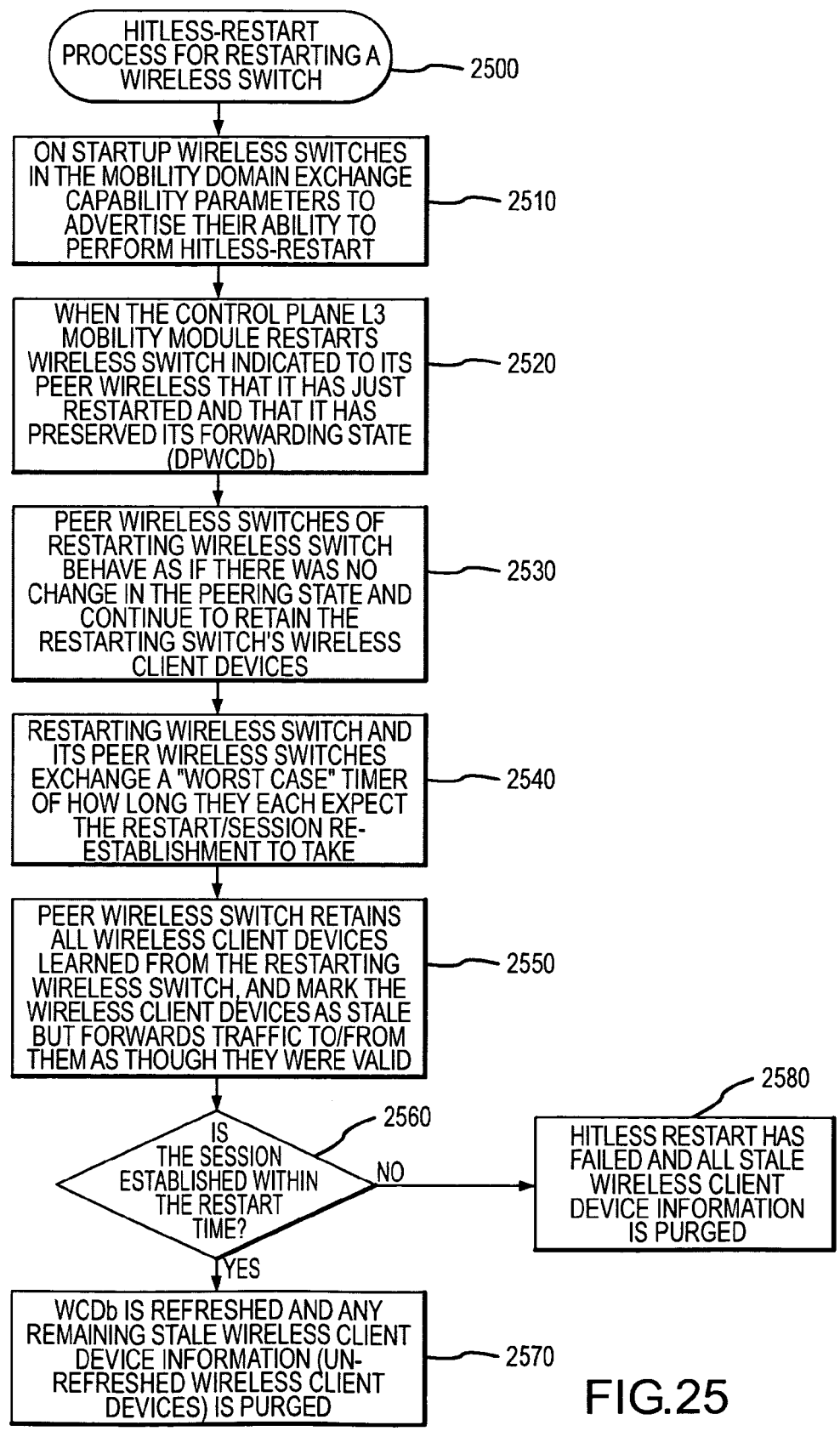
FIG. 25 is a flow chart of a hitless-restart process for restarting a wireless switch according to an exemplary implementation.

While this is happening, the data-forwarder of the data plane continues to forward information (e.g., data packets) until the synchronization between the control and data planes is performed. Thus wireless client devices never experience a down-time. Data packet forwarding on a wireless switch is provided by a kernel packet-driver or "data-forwarder module" using a basic wireless client device table (BWCT) containing all wireless client device parameters including security, VLAN mappings, etc., and a data plane or "kernel" wireless client database (KWCDb) that contains L3 L3-mobility related information. For instance, in one implementation, the data-forwarder module uses the MAC addresses of the wireless client devices to forward packets to/from the wireless client devices. The data-forwarder module continues to forward information to/from the wireless client devices while the first wireless switch is in the process of re-establishing peering sessions between the first peer wireless switch and the peer wireless switches of the first wireless switch. Similarly, the data-forwarder module continues to receive information from the wireless client devices while the first wireless switch is in the process of re-establishing peering sessions between the first peer wireless switch and the peer wireless switches of the first wireless switch. The data-forwarder module continues forwarding information to/from the wireless client devices until the CPWCDd and the KWCDb are synchronized FIG. 25 is a flow chart of a hitless-restart process 2500 for restarting a wireless switch according to an exemplary implementation. Upon failure of the L3 Mobility control plane module, the separation of the CPWCDb and KWCDb is important for the correct functioning of the hitless-restart feature. The CPWCDb and KWCDb are described in FIG. 8. Whereas the control plane re-establishes peering sessions and builds a new WCDb, the data plane continues to forward traffic until the synchronization between the control and data planes is performed.

On startup at step 2510, wireless switches in the mobility domain exchange capability parameters to advertise their ability to perform hitless-restart. For example, prior to the first wireless switch failing, each wireless switch in the first mobility domain exchanges a hitless-restart capability message when the wireless switches originally begin a peering session. The hitless-restart capability message indicates capability to perform hitless-restart. If all peer wireless switches support hitless-restart capability, then a complete hitless-restart of the wireless switch can be accomplished. If all peer wireless switches do not support hitless-restart capability, there will only be a partial hitless restart.

When the control plane L3 mobility module restarts, at step 2520, the wireless switch indicates to its peer wireless that the wireless switch has just restarted and that it has preserved its forwarding state (KWCDb).

According to one implementation of these techniques, after the first wireless switch fails, the control plane L3 mobility module restarts and the first wireless switch transmits a restart message to peer wireless switches of the first wireless switch to announce that the first wireless switch has restarted and to begin re-establishing peering sessions with peer wireless switches. When the control plane L3 mobility module restarts, the first wireless switch resets its home wireless client database (HWCDb) with the information from the KWCDb. The first wireless switch can reset its home wireless client database (HWCDb) with the information from its data plane wireless client database (KWCDb) by scanning the KWCDb, discarding entries in its CPWCDb, and updating its HWCDb with the information from its KWCDb.

When the hitless-restart is taking place, at step 2530, the peer wireless switches of the restarting wireless switch behave as if there was no change in the peering state and continue to retain the restarting switch's wireless client devices. This behavior is acceptable as long as the data plane is independent and preserved on the restarting switch, allowing traffic to continue to flow through it.

The first wireless switch can then transmit a first message which comprises the updated information in its HWCDb to its peer wireless switches. The first message indicates that the first wireless switch has restarted and comprises the updated information in its HWCDb thereby allowing information to/from wireless client devices and to/from a wired network to continue to flow through the first wireless switch.

At step 2540, the restarting wireless switch and its peer wireless switches exchange a "worst case" timer of how long they each expect the restart/session re-establishment to take. For example, in one implementation, every wireless switch in the network sends a timer which specifies its restart period to each of its peer wireless switches when it first establishes peering sessions. For example, the first wireless switch can specify a restart period of the first wireless switch. This restart period starts whenever the peer wireless switches receive a restart message from the first wireless switch.

When the peer wireless switches receive a restart message, the peer wireless switches behave as if there was no change in the peering state (e.g., peer wireless switches act as if the peering session never went down and then came back up). During this restart period, at step 2550, the peer wireless switch retains all wireless client devices learned from the restarting wireless switch, and marks the wireless client devices as stale but forwards traffic to/from them as though they were valid. During the restart period, the first wireless switch and the peer wireless switches continue to retain the information about the wireless client devices. When the peer wireless switches receive the information in the HWCDb of the first wireless switch, the peer wireless switches store the information from the HWCDb in respective CPWCDbs of the peer wireless switches, and initially mark the wireless client devices in the respective CPWCDbs as stale entries.

At step 2560, the restarting wireless switch determines if the session is established within the restart time.

If the session with the first wireless switch can be re-established before the expiry of the restart period, then at step 2570, the WCDb is refreshed and any remaining stale wireless client device information (un-refreshed wireless client devices) is purged.

For example, in one implementation of step 2570, each of the wireless switches exchanges information from respective home wireless client databases (HWCDbs) with the first wireless switch (and other peer wireless switches) as a peering session is established between the first wireless switch and that peer wireless switch. Each respective HWCDb comprises the set of wireless client devices for which the particular peer wireless switch is the home wireless switch. As such, each wireless switch eventually has a wireless client database (WCDb) comprising each of the wireless client devices in the mobility domain.

The first wireless switch refreshes its CPWCDb and its KWCDb with updated information about each of the wireless client devices in the mobility domain such that its CPWCDb and KWCDb are synchronized with information from the respective HWCDbs of the peer wireless switches. For instance, in one implementation, the first wireless switch receives the information about wireless client devices from the respective HWCDbs of the peer wireless switches, and updates its CPWCDd with the information about each of the wireless client devices in the mobility domain. The first wireless switch also updates its KWCDb with the information from its CPWCDd, and determines ones of the stale entries in the KWCDd which are updated with information in the respective HWCDbs of the peer wireless switches. The first wireless switch replaces the ones of the stale entries in the KWCDb with the updated information from the respective HWCDbs of the peer wireless switches, and removes any remaining stale entries from the KWCDb of the first wireless switch. The first wireless switch transmits its updated HWCDb to the peer wireless switches.

The peer wireless switches can then use the updated information from the updated HWCDb of the first wireless switch to refresh at least some of the stale entries in their respective CPWCDbs. For example, the peer wireless switches can remove remaining stale entries from their respective CPWCDds and KWCDbs. The remaining stale wireless client devices comprise ones of the stale entries originally learned by the peer wireless switches from the first wireless switch and not re-learned again from the first wireless switch after the peering sessions are re-established between the first wireless switch and the peer wireless switches. At this point, the respective CPWCDb and the respective KWCDb of each peer wireless switch are synchronized with the updated HWCDb of the first wireless switch.

If the session is not established within the restart time, then at step 2580, the Hitless restart has failed and all stale wireless client device information is purged. In other words, the peer wireless switches can discard the information about the wireless client devices.

The restarting switch also adopts a similar process to refresh its KWCDb from the re-learned CPWCDd. As above, there would be a timeout period associated with the preserved forwarding state, which gets cleaned up if the control plane module has not refreshed.

Thus, numerous embodiments have been disclosed which defining a new architecture that allows wireless client devices to roam across IP subnets. Data is transparently forwarded to the new location of the mobile unit so that existing transport layer connections can be retained and applications are not interrupted. These techniques can be used to support layer 3 (L3) IP roaming and allow a client to keep its original, pre-roam IP address and TCP/IP connection from its home subnet when the client undergoes a layer 3 (L3) roam to a new subnet. These techniques can help reduce the likelihood of dropped calls or sessions. Moreover, a side benefit of the disclosed embodiments is that changes or modifications to the wireless client device (or software running thereon) are not required as is the case with other solutions such as Mobile IP.

In environments with large numbers of wireless switches and wireless client devices, the concepts of mobility domains and mobility areas can allow this architecture to scale by subdividing the network into smaller sub-networks so as to limit the number of peer switches and mobile units a single switch needs to handle.

As the network size grows, the amount of operator configuration required grows exponentially-leading to increased possibility of errors. To reduce the amount of operator configuration, the disclosed architecture implements auto discovery techniques provide a mechanism for switches to automatically discover their peer switches residing on different IP subnets to form a web across which the mobile units can roam freely.

In addition, in environments where wireless client devices tend to associate with a switch at a particular location such as a gate of a university campus, the disclosed architecture implements automatic load balancing techniques for reducing a heavy load on a single switch by distributing the wireless client devices evenly across all switches in the network.

This architecture can handle non-IP traffic (e.g., Microsoft® applications), multicast traffic, and/or broadcast traffic carried in typical networks.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

Furthermore, words such as "connect" or "coupled to" used in describing a relationship between different elements do not imply that a direct physical connection must be made between these elements. For example, two elements may be connected to each other physically, electronically, logically, or in any other manner, through one or more additional elements, without departing from the scope of the invention. Thus, to the extent the description refers to certain features being "connected" or "coupled" together, unless expressly stated otherwise, "connected" or "coupled" means that one feature is directly or indirectly connected or coupled to another feature, and not necessarily mechanically. Although drawings depict exemplary arrangements of elements, additional intervening elements, devices, features, or components may be present in an actual embodiment assuming that the functionality of the circuit is not adversely affected. The connecting lines shown in the various figures represent example functional relationships and/or physical couplings between the various elements. Many alternative or additional functional relationships or physical connections may be present in a practical embodiment or implementation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, while the techniques and technologies described above have been described in the context of WLANs which in include wireless switches and access points (APs), it will be appreciated that these techniques and technologies can also be applied in environments were wireless switches are not utilized or where the functionality of the wireless switch is implemented within the AP. For instance, these techniques and technologies can be applied in a network which does not include wireless switches—this case is identical to a Wireless switch with one AP merged together.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should also be understood that various changes can be made in the function and arrangement of elements without departing from the scope of the invention as set forth in the appended claims and the legal equivalents thereof. Thus, the present invention is not intended to be limited to the embodiments shown herein but is to be accorded the widest scope consistent with the principles and novel features disclosed herein.

What is claimed is:

1. A method for restarting a first wireless switch when the first wireless switch fails, wherein the first wireless switch comprises a control plane comprising a control plane layer 3 (L3) mobility module and a control plane wireless client database (CPWCDb), and a data plane comprising a data-forwarder module and a data plane wireless client database (KWCDb), the method comprising:

restarting the control plane L3 mobility module of the first wireless switch, when the first wireless switch fails, and transmitting a restart message from the first wireless switch to the peer wireless switches of the first wireless switch to announce that the first wireless switch has restarted and to begin re-establishing peering sessions with peer wireless switches of the first wireless switch;

resetting a home wireless client database (HWCDb) of the first wireless switch with the information from the KWCDb, and transmitting a first message from the first wireless switch to peer wireless switches of the first wireless switch, wherein the first message comprises the information in the HWCDb of the first wireless switch;

receiving, at the peer wireless switches, information in the HWCDb of the first wireless switch, storing the information from the HWCDb of the first wireless switch in respective CPWCDbs of the peer wireless switches, and initially marking the wireless client devices in the respective CPWCDbs of the peer wireless switches as stale entries;

exchanging information from respective home wireless client databases (HWCDbs) of each peer wireless switch with the first wireless switch as a peering session is established between the first wireless switch and that peer wireless switch, wherein each respective HWCDb comprises the set of wireless client devices for which the particular peer wireless switch is the home wireless switch;

refreshing the CPWCDb of the first wireless switch and the KWCDb of the first wireless switch with updated information about each of the wireless client devices in the mobility domain such that the CPWCDb of the first wireless switch and the KWCDb of the first wireless switch are synchronized with information from the respective HWCDbs of the peer wireless switches, and transmitting the updated HWCDb of the first wireless switch to the peer wireless switches; and refreshing stale entries in the respective CPWCDbs of the peer wireless switches with the updated information from the updated HWCDb of the first wireless switch such that the respective CPWCDb of the each peer wireless switch and the respective KWCDb of each peer wireless switch are synchronized with the updated HWCDb of the first wireless switch.

2. A method according to claim 1, wherein resetting a home wireless client database (HWCDb) of the first wireless switch with the information from the data plane wireless client database (KWCDb), comprises:

scanning the KWCDb at the first wireless switch, wherein the KWCDb comprises information for each of the wireless client devices for which the first wireless switch was either the home wireless switch and/or the current wireless switch before failing;

discarding the CPWCDb at the first wireless switch; and updating the home wireless client database HWCDb of the first wireless switch with the information from the KWCDb of the first wireless switch.

3. A method according to claim 1, wherein transmitting a first message from the first wireless switch to peer wireless switches of the first wireless switch, wherein the first message comprises the information in the HWCDb of the first wireless switch, comprises:

transmitting a first message from the first wireless switch to peer wireless switches of the first wireless switch when the control plane L3 mobility module restarts, wherein the first message indicates that the first wireless switch has restarted and comprises the information in the HWCDb of the first wireless switch thereby allowing information to/from wireless client devices and to/from a wired network to continue to flow through the first wireless switch.

4. A method according to claim 1, wherein exchanging information from HWCDbs of each wireless switch with other wireless switches, comprises:

exchanging information from HWCDbs of each wireless switch with other wireless switches such that each wireless switch eventually has a wireless client database (WCDb) comprising each of the wireless client devices in the mobility domain, wherein each HWCDb comprises the set of wireless client devices for which the particular wireless switch is the home wireless switch.

5. A method according to claim 1, wherein refreshing the CPWCDb of the first wireless switch and the KWCDb of the first wireless switch with updated information about each of the wireless client devices in the mobility domain if the session is re-established within the restart period, comprises:

receiving, at the first wireless switch, the information about wireless client devices from the respective HWCDbs of the peer wireless switches, and updating the CPWCDb of the first wireless switch with the information about each of the wireless client devices; and updating the KWCDb of the first wireless switch with the information about each of the wireless client devices in the mobility domain with information from the CPWCDb of the first wireless switch, determining ones of the stale entries in the KWCDb which are updated with information in the respective HWCDbs of the peer wireless switches and replacing the ones of the stale entries in the KWCDb with the updated information from the respective HWCDbs of the peer wireless switches, and removing any remaining stale entries from the KWCDb of the first wireless switch.

6. A method according to claim 1, wherein refreshing stale entries in the respective CPWCDbs of the peer wireless switches with the updated information from the updated HWCDb of the first wireless switch, comprises:

removing remaining stale entries from the respective CPWCDbs and the respective KWCDbs of the peer wireless switches, wherein the remaining stale wireless client devices comprise ones of the stale entries originally learned by the peer wireless switches from the first wireless switch and not re-learned again from the first wireless switch after the peering sessions are re-established between the first wireless switch and the peer wireless switches.

7. A method according to claim 1, wherein the CPWCDb and the KWCDb function independently of each other so that failure of one does not affect the other.

8. A method according to claim 1, further comprising:

exchanging a hitless-restart capability message between each wireless switch in a mobility domain when the wireless switches originally begin a peering session, wherein the hitless-restart capability message indicates capability to perform hitless-restart, wherein the hitless-restart capability message from the first wireless switch specifies a restart period of the first wireless switch, wherein the restart period starts when the peer wireless device receives the restart message from the first wireless switch, and wherein the first wireless switch and the peer wireless switches continue to retain the information about the wireless client devices during the restart period.

9. A method according to claim 8, further comprising:

determining, at the peer wireless switches, if a session with the first wireless switch is re-established within the restart period.

10. A method according to claim 1, further comprising:

forwarding information, from/to the data-forwarder module of the first wireless switch, to/from the wireless client devices while the first wireless switch is in the process of re-establishing peering sessions between the first peer wireless switch and the peer wireless switches of the first wireless switch.

11. A method according to claim 10, wherein the data-forwarder module of the first wireless switch continues forwarding information to/from the wireless client devices until the CPWCDb and the KWCDb are synchronized.

12. A method according to claim 1, wherein for each particular wireless client device, the information about the wireless client device comprises mobility related parameters to distinguish between new wireless client devices entering the mobility domain and existing wireless client devices roaming within the mobility domain.

13. A method according to claim 12, wherein the mobility related parameters for each particular wireless client device comprise:
a MAC address of the particular wireless client device,
an IP-address of the particular wireless client device,
an IP address of the home wireless switch (HS) for the particular wireless client device,
an IP address of the current wireless switch (CS) for the particular wireless client device, and
a VLAN identifier of the home wireless switch (HS) for the particular wireless client device.

14. A network of peer wireless switches in a first mobility domain, comprising:
a first wireless switch in the first mobility domain, wherein the first wireless switch comprises:
a first processor comprising a control plane layer 3 (L3) mobility module configured to restart after the first wireless switch fails;
a first transmitter configured to transmit a restart message to the peer wireless switches of the first wireless switch to announce that the first wireless switch has restarted and to begin re-establishing peering sessions with the peer wireless switches;
a first database comprising a first control plane wireless client database (CPWCDb), a first data plane wireless client database (KWCDb), and a first home wireless client database (HWCDb) configured to store a set of wireless client devices for which the first wireless switch is the home wireless switch, wherein the first HWCDb is reset with the information from the first KWCDb upon restart of the first wireless switch,
wherein the transmitter is configured to transmit a first message to the peer wireless switches, wherein the first message comprises the information in the first HWCDb after it is reset;
a first receiver;
wherein each peer wireless switch comprises:
a respective receiver configured to receive information in the HWCDb of the first wireless switch;
a respective control plane wireless client database (CPWCDb) configured to store the information from the HWCDb of the first wireless switch, and initially mark the wireless client devices in the respective CPWCDb as stale entries;
a respective processor;
a respective home wireless client database (HWCDb) configured to store a set of wireless client devices for which the particular peer wireless switch is the home wireless switch;
a respective transmitter configured to transmit information from the respective HWCDb to the first wireless switch and any other peer wireless switches when a peering session is established between the first wireless switch and that particular peer wireless switch;
wherein the respective receiver is configured to receive information from the respective HWCDbs of each the other peer wireless switches and the first wireless switch, wherein each respective HWCDb comprises the set of wireless client devices for which the particular peer wireless switch is the home wireless switch
a respective data plane wireless client database (KWCDb); and
wherein the first receiver is configured to receive information from the respective HWCDbs of each the other peer wireless switches, and wherein the first CPWCDb and the first KWCDb are configured to be refreshed with updated information about each of the wireless client devices in the mobility domain such that the first CPWCDb and the first KWCDb are synchronized with information from the respective HWCDbs of the peer wireless switches, and wherein the first transmitter is configured to transmit the updated HWCDb of the first wireless switch to the peer wireless switches; and
wherein each of the respective receivers is configured to receive the information in the first HWCDb after it is reset, and the information from the respective HWCDbs of each the other peer wireless switches;
wherein each of the respective processors is configured to refresh stale entries in its respective CPWCDb with the updated information from the first HWCDb such that the respective CPWCDb and the respective KWCDb are synchronized with the first HWCDb.

15. A network according to claim 14, wherein the first processor resets the first HWCDb with the information from the first KWCDb by scanning the first KWCDb, wherein the first KWCDb comprises information for each of the wireless client devices for which the first wireless switch was either the home wireless switch and/or the current wireless switch before failing; discarding the first CPWCDb, and updating the first HWCDb with the information from the first KWCDb.

16. A network according to claim 14, wherein the first transmitter transmits the restart message when the control plane L3 mobility module restarts, wherein the restart message indicates that the first wireless switch has restarted and information to/from wireless client devices and to/from a wired network can continue to flow through the first wireless switch.

17. A network according to claim 14, wherein the first receiver is configured to receive the information about wireless client devices from the respective HWCDbs of the peer wireless switches, and wherein the first processor is configured to update the first CPWCDb with the information about each of the wireless client devices, and to update the first KWCDb with the information about each of the wireless client devices in the mobility domain with information from the first CPWCDb, and to determine ones of the stale entries in the first KWCDb which are updated with information in the respective HWCDbs of the peer wireless switches, and to replace the ones of the stale entries in the first KWCDb with the updated information from the respective HWCDbs of the peer wireless switches, and to remove any remaining stale entries from the first KWCDb.

18. A network according to claim 14, wherein each respective processor is configured to remove remaining stale entries from the respective CPWCDbs and the respective KWCDbs, wherein the remaining stale wireless client devices comprise ones of the stale entries originally learned by the peer wireless switches from the first wireless switch and not re-learned again from the first wireless switch after the peering sessions are re-established between the first wireless switch and the peer wireless switches.

19. A network according to claim 14, wherein the first CPWCDb and the first KWCDb function independently of each other so that failure of one does not affect the other.

20. A network according to claim 14, wherein the first processor further comprises: a data-forwarder module configured to forward/receive information to/from the wireless client devices while the first wireless switch is in the process of re-establishing peering sessions between the first peer wireless switch and the peer wireless switches of the first wireless switch, wherein the data-forwarder module continues forwarding information to/from the wireless client devices until the first CPWCDb and the first KWCDb are synchronized.

* * * * *

UNITED STATES PATENT AND TRADEMARK OFFICE
CERTIFICATE OF CORRECTION

PATENT NO. : 7,613,150 B2  Page 1 of 1
APPLICATION NO. : 11/490298
DATED : November 3, 2009
INVENTOR(S) : Nagarajan et al.

It is certified that error appears in the above-identified patent and that said Letters Patent is hereby corrected as shown below:

ON THE TITLE PAGE

On Page 2, in Field (56), under "OTHER PUBLICATIONS", in Column 1, Line 3, delete "PCT/SU2007/073917," and insert -- PCT/US2007/073917, --, therefor.

On Page 2, in Field (56), under "OTHER PUBLICATIONS", in Column 2, Line 46, delete "ITEF," and insert -- IETF, --, therefor.

On Page 2, in Field (56), under "OTHER PUBLICATIONS", in Column 2, Line 57, delete "Engineernig" and insert -- Engineering --, therefor.

In Column 2, Lines 17-18, delete "implementation" and insert -- implementation; --, therefor.

In Column 6, Line 50, delete "(I3)" and insert -- (L3) --, therefor.

In Column 13, Line 23, delete "t-he" and insert -- the --, therefor.

In Column 14, Line 4, delete "layer L 3 (L L3)" and insert -- layer 3 (L3) --, therefor.

In Column 30, Line 64, delete "WLANx" and insert -- $WLAN_x$ --, therefor.

In Column 32, Line 25, delete "header" and insert -- header. --, therefor.

In Column 40, Line 15, delete "synchronized" and insert -- synchronized. --, therefor.

In Column 48, Line 3, in Claim 14, delete "switch" and insert -- switch; --, therefor.

Signed and Sealed this

Sixteenth Day of February, 2010

David J. Kappos
*Director of the United States Patent and Trademark Office*